US 6,693,748 B1

(12) United States Patent
Fujimoto et al.

(10) Patent No.: US 6,693,748 B1
(45) Date of Patent: *Feb. 17, 2004

(54) LENS ARRAY UNIT, METHOD OF MANUFACTURING LENS ARRAY UNIT, AND OPTICAL DEVICE USING THE LENS ARRAY UNIT

(75) Inventors: Hisayoshi Fujimoto, Kyoto (JP); Toshihiko Takakura, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/937,566

(22) PCT Filed: Mar. 30, 2000

(86) PCT No.: PCT/JP00/02055

§ 371 (c)(1),
(2), (4) Date: Sep. 27, 2001

(87) PCT Pub. No.: WO00/58762

PCT Pub. Date: Oct. 5, 2000

(30) Foreign Application Priority Data

| Mar. 31, 1999 | (JP) | 11-92212 |
| Apr. 2, 1999 | (JP) | 11-96422 |
| Apr. 5, 1999 | (JP) | 11-97935 |
| Apr. 5, 1999 | (JP) | 11-97936 |
| Apr. 6, 1999 | (JP) | 11-98706 |
| Apr. 30, 1999 | (JP) | 11-124064 |
| May 12, 1999 | (JP) | 11-130772 |
| May 13, 1999 | (JP) | 11-132227 |
| May 17, 1999 | (JP) | 11-135601 |
| Jun. 11, 1999 | (JP) | 11-165317 |

(51) Int. Cl.⁷ .............................................. G02B 27/10
(52) U.S. Cl. ..................................... 359/621; 359/623
(58) Field of Search ............................. 359/618, 619, 359/620, 621, 622, 623, 455, 459; 264/1.7, 2.5

(56) References Cited

U.S. PATENT DOCUMENTS

| 6,057,538 A | * 5/2000 | Clarke ....................... 250/208.1 |
| 6,373,635 B1 | * 4/2002 | Fujimoto et al. ............. 359/619 |
| 6,449,099 B2 | * 9/2002 | Fujimoto et al. ............. 359/621 |

FOREIGN PATENT DOCUMENTS

| JP | 01-229201 | 9/1989 | ............. G02B/3/00 |
| JP | 03-056932 | 3/1991 | ......... G02F/1/1335 |
| JP | 04-326655 | 11/1992 | .......... H04N/1/028 |
| JP | 05-072456 | 3/1993 | ............. G02B/7/00 |
| JP | 09-274177 | 10/1997 | ......... G02F/1/1335 |
| JP | 10-146852 | 6/1998 | ........... B29C/43/02 |
| JP | 10-253920 | 9/1998 | ........... G02B/27/18 |

\* cited by examiner

Primary Examiner—Georgia Epps
Assistant Examiner—Alicia M. Harrington
(74) Attorney, Agent, or Firm—Michael D. Bednarek; Shaw Pittman LLP

(57) ABSTRACT

A lens array unit (U1) comprises a first and a second lens arrays (1, 2). The first and the second lens arrays (1, 2) include respectively a plurality of lenses (11, 21), each serving as a convex lens, for formation of a non-inverted, non-magnified image. In each of the lens arrays, the lenses (11, 21) and supports (10, 20) which hold the lenses are formed integrally of a translucent resin. Therefore, manufacture of the lens array is easy.

43 Claims, 48 Drawing Sheets

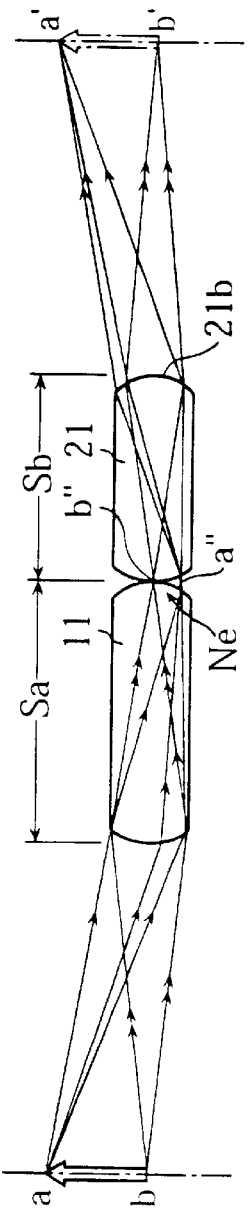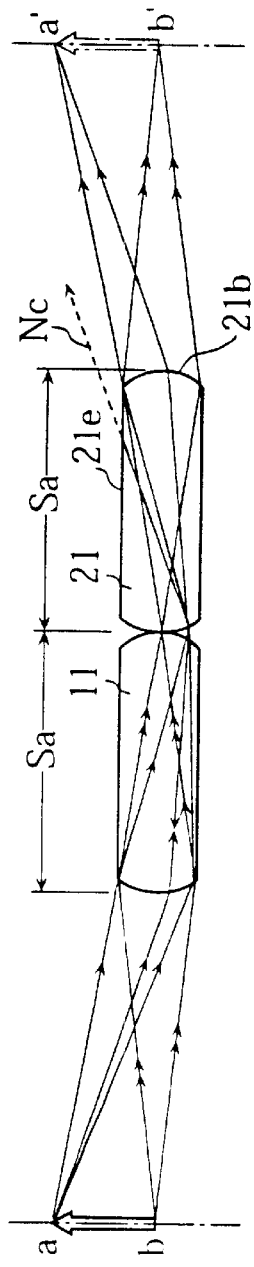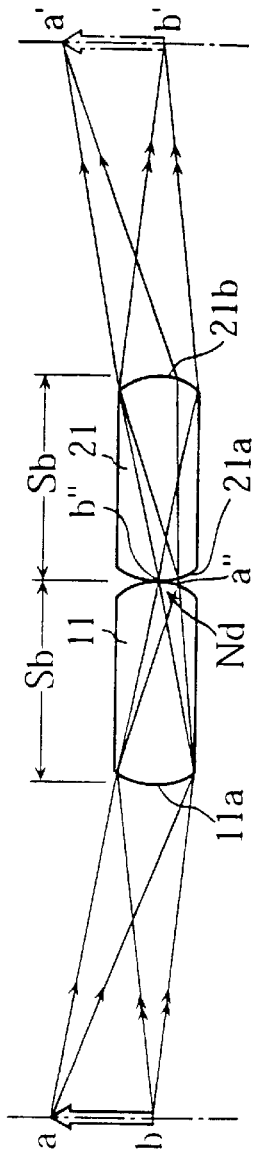
FIG.22a PRESENT INVENTION
FIG.22b COMPARATIVE EXAMPLE 1
FIG.22c COMPARATIVE EXAMPLE 2

LENS ARRAY UNIT, METHOD OF MANUFACTURING LENS ARRAY UNIT, AND OPTICAL DEVICE USING THE LENS ARRAY UNIT

TECHNICAL FIELD

The present invention relates to a lens array unit utilized in e.g. an image reading device. Further, the present invention relates to a method of manufacturing a lens array as part of the lens array unit, and to an optical device incorporating the lens array unit.

BACKGROUND ART

In an image reading device incorporated in a facsimile machine or a scanner, often, an image of the document is read without inversion nor magnification, by utilizing a plurality of light receiving elements disposed in a row. In this arrangement, the image of the document must be focused on the light receiving elements without inversion nor magnification, by utilizing a lens array provided by a plurality of image formation lenses. Conventionally for example, this is achieved by a lens array 9 as shown in FIG. 51 and FIG. 52, in which a plurality of lenses 91 are held by a resin support 90.

The lenses 91 are provided by a plurality of columnar selfoc lenses (rod lenses), each having a pair of flat lens surfaces 91a, 91b. However, each lens 91 has a unique optical characteristic that its refractive index varies in accordance with the distance from its axial center. As a result, as shown in FIG. 52, light which passes through the lens 91 takes a snaky route, and an object (a→b) is projected in an non-inverted, non-magnified image (a'→b').

In the prior art, in order to manufacture the lens array 9, the lenses 91 are manufactured first. Next, by means of an insertion molding, the lenses 91 are embedded into the support 90 when the support is molded from resin.

However, the prior art has the following problem.

Specifically, first, since the lens 91 is a selfoc lens which has the unique optical characteristic as described above, manufacturing the lens is not an easy task. Without a special facility for making the selfoc lens, manufacture of the lens 91 is very difficult, which has increased manufacturing cost of the lens array 9.

Further, according to the above prior art, manufacturing of the lenses 91 is a separate process from the forming of the support 90. Thus, production efficiency of the lens array 9 has been low, increasing further the manufacturing cost of the lens array 9.

DISCLOSURE OF THE INVENTION

An object of the present invention is to provide a lens array unit and an optical device using the same, capable of eliminating or reducing the problems described above.

Another object of the present invention is to provide a method for appropriately manufacturing the lens array as a component part of the lens array unit.

A lens array unit provided by a first aspect of the present invention comprises: a first lens array including a plurality of first lenses each serving as a convex lens, and a first support holding the first lenses. The first lenses and the first support are formed integrally of a translucent resin. The lens array unit further comprises a second lens array including a plurality of second lenses each serving as a convex lens, and a second support holding the second lenses. The second lenses and the second support are formed integrally of a translucent resin. The first and the second lens arrays are placed, one on the other, with each of the first lenses in alignment with a corresponding one of the second lenses on a same axis, for formation of a non-inverted, non-magnified image.

The lens array unit having such an arrangement can be suitably used as a replacement of the prior art selfoc lens array, for application of forming a non-inverted, non-magnified image. Since each of the first and the second lenses is provided by a convex lens, unlike the selfoc lens, there is no need to vary the refractive index inside the lens. According to the present invention, each of the lenses in the first and the second lens arrays and the supports therefor can be easily formed by means of an ordinary resin injection molding technique. As a result, production efficiency of the lens array unit according to the present invention is high, making it possible to lower a cost of manufacture than in the lens array unit that uses the prior art selfoc lens.

Preferably, at least the first lens array, of the first and the second lens arrays, is provided with separating means for optical separation of the lenses from each other.

According to such an arrangement, it becomes possible to prevent a problematic crossing of light (optical cross talk) between the first lenses when the light passes through the first lens array. This makes it possible to form a clear image. When using the lens array unit according to the present invention, if an arrangement is made so that the light will first enter the first lens array, comes out of the first lens array and then enters the second lens array, the optical cross talk in the second lens array can be reduced to a certain extent even if the second lens array is not provided with the separating means, and this is already demonstrated.

Preferably, the separating means is provided only in the first lens array.

According to such an arrangement, manufacture of the lens array unit can be facilitated to the extent that the second lens array is not provided with the separating means.

Preferably, the separating means includes a light shield isolating the first lenses from each other.

According to such an arrangement, the light shield appropriately prevents the light from crossing each other between the first lenses.

Preferably, the light shield is capable of absorbing light received.

According to such an arrangement, it becomes possible to prevent light which has reached the light shield from being reflected back by the light shield, making it more desirable for forming a clear image.

Preferably, the light shield includes at least one recess provided in the first support for the isolation of the first lenses from each other.

According to such an arrangement, it becomes possible to prevent light from traveling between the first lenses, by the recess or the surface that defines the recess.

Preferably, the light shield further includes a dark material covering the surface which defines the recess. The word dark herein means a black color preferably, although this does not necessarily limit the present invention.

According to such an arrangement, the dark material appropriately blocks and absorbs the light which otherwise will get out of the first lens and then into an adjacent one.

Preferably, the first support includes a first surface, and a second surface away from the first surface at a distance in a direction of the axis's of the first lenses and faced to the second lens array. Further, the recess is provided in at least one of the first and the second surfaces, without penetrating the first support.

Preferably, the recess is provided in each of the first and the second surfaces.

According to such an arrangement, even if the depth of the recess is relatively shallow, it is still possible to sufficiently prevent the optical cross talk between the first lenses. Therefore, the present arrangement is suitable when the recess cannot be made very deep.

Preferably, the recess is provided only in one of the first and the second surfaces.

According to such an arrangement, as compared with the above case in which the recess is provided in each of the first and the second surface, the number of the recesses can be smaller. This can facilitate an operation for forming the recesses.

Preferably, the separating means further includes a light shielding member covering the first surface of the first support.

According to such an arrangement, the light shielding member also offers the effect of preventing the optical cross talk between the first lenses. Further, this arrangement prevents light unnecessary for the image formation from entering the first lens array via the first surface. Therefore, it becomes possible to form a clearer image.

Preferably, the separating means further includes a light shielding member covering the second surface of the first support.

According to such an arrangement, it becomes possible to prevent light, which is unnecessary for the image formation, from entering the second lens array from the second surface. Further, this arrangement prevents such a phenomenon that light coming from one of the first lenses unwontedly enters a diagonal one of the second lenses. Therefore, it becomes possible to form a clearer image.

Preferably, each of the first lenses has an outer circumferential surface rising from the first support, and the light shield includes a dark material covering the outer circumferential surface.

According to such an arrangement, it becomes possible to reduce light, which is unnecessary for the image formation, from entering the first lens. Further, since the light within the first lens does not pass through the outer circumferential surface, it also is possible to reduce the optical cross talk between the first lenses.

Preferably, each plurality of the first and the second lenses are disposed in a straight row. Such an arrangement is suitable for an application of forming a line image.

Preferably, each plurality of the first and the second lenses are disposed in a plurality of rows having a narrow width and extending in a predetermined direction.

According to such an arrangement, too, a line image can be formed. In this case, as compared with the case in which there is only one row in each of the first and the second lenses, a greater amount of light can be introduced to an image formation region, and a brighter image can be obtained.

Preferably, the separating means includes a first recess provided in the first support for separation of the first lenses from each other in the predetermined direction. The separating means further includes a second recess provided in the first support for separation of the first lenses from each other in a direction across the predetermined direction, and a dark material covering surfaces which respectively define the first and the second recesses.

According to such an arrangement, the optical cross talk between the first lenses can be appropriately prevented in both of the predetermined direction and the direction across the predetermined direction.

Preferably, the first and the second recesses communicate with each other.

According to such an arrangement, it becomes possible to facilitate an operation of coating the surfaces that defines the first and the second recesses with the dark material.

Preferably, the first recess has a depth axially of the first lenses, deeper than a depth of the second recess.

According to such an arrangement, the first recess can block a greater amount of light than the second recess. This allows to achieve the following advantage that the amount of light that passes the first and the second lens arrays and then reaches the image formation region is smaller in the predetermined direction, but larger in a direction across the predetermined direction. With such a capability, it becomes possible to form a clear, well-focused image in the predetermined direction, whereas in the direction across the predetermined direction, it becomes possible to form a bright image. Therefore, as a total, it becomes possible to obtain a well-focused and bright image.

Preferably, the second support is provided with means for optical separation of the second lenses from each other only in the predetermined direction.

According to such an arrangement, again, it becomes possible to achieve the advantage that the amount of light that passes the first and the second lens array and then reaches the image formation region is smaller in the predetermined direction, but larger in the direction across the predetermined direction. Therefore, a similar effect can be achieved as achieved by the first arrangement in which the first recess is made deeper than the second recess.

Preferably, each plurality of the first and the second lenses are disposed in a matrix, for formation of an image having a predetermined area.

According to such an arrangement, the lens array can be suitably utilized in an application of forming an area of non-inverted, non-magnified image.

Preferably, the separating means includes at least one recess surrounding each of the first lenses, and a dark material covering a surface which defines the recess.

According to such an arrangement, if the first lenses for example are disposed in a matrix, it becomes possible to prevent the optical cross talk between octagonal pairs of the first lenses.

Preferably, the first and the second lens arrays are provided with at least one pair of recess and projection, and the first and the second lens arrays are fitted together by the pair of recess and projection.

According to such an arrangement, an operation of assembling the first and the second lens arrays in mutual alignment is facilitated.

Preferably, the first lenses have a longer axial length than the second lenses.

According to such an arrangement, when light that has passed the first lens comes to the lens surface of the second lens and enters the second lens, a greater amount of the light that travels in the second lens can reach the other lens surface of the second lens, to the extent that the second lens is made shorter. Therefore, it becomes possible to increase the amount of light that comes out of the second lens, making it more desirable to form a bright image. Further, by increasing the length of the first lens, it becomes possible to obtain a clear image. Specifically, the first and the second lenses each serving as a convex lens can give a non-inverted, non-magnified image of an object because light from the object is first received by the lens surfaces of the first lens and formed into an inverted, reduced image, and then this inverted, reduced image is increased and inverted back by the lens surfaces of the second lens. In such an arrangement, if the length of the first lens is increased, it becomes possible to obtain the inverted, reduced image at an image formation point closer to the lens surface of the first lens. Therefore, according to the present embodiment, unlike the case in which an inverted, reduced image reduced at a large reduction rate is magnified at a large magnification rate and inverted, the finally obtained image that is not inverted nor magnified is better protected from adverse effect such as lens surface distortion.

Preferably, the second lenses have a larger diameter than the first lenses.

Preferably, each of the first lenses includes a first lens surface and a second lens surface away from the first lens surface, and each of the second lenses includes a third lens surface closely facing the second lens surface and a fourth lens surface away from the third lens surface. Further, the second lens surface has a larger diameter than the first lens surface, the third lens surface has a diameter equal to or larger than that of the second lens surface, and the fourth lens surface has a larger diameter than the third lens surface.

According to such an arrangement, when light that has passed the first lens enters the second lens, it becomes possible to increase the amount of light that finally comes out of the fourth lens surface of the second lens toward the image formation region. Thus, it becomes possible to form a bright image.

Preferably, the fourth lens surfaces are connected together.

Such an arrangement is advantageous in increasing the diameter of the fourth lens surface and the amount of light coming out of the lens surface.

Preferably, the second lens array is provided with a recess isolating the fourth lens surfaces from each other.

According to such an arrangement, when light finally comes out of the fourth lens surface toward the image formation region, it becomes possible to efficiently prevent the optical cross talk between the second lenses, by using the recess.

A method of manufacturing a lens array provided by a second aspect of the present invention comprises a resin-body forming step of forming a resin component block of a translucent resin. The resin component block integrally includes a plurality of rows of lenses and supports holding the lenses. The method further comprises a dividing step of dividing the resin component block into a plurality of lens arrays each including a row of the lenses.

According to the lens array manufacturing method with such an arrangement, it becomes possible to efficiently mass produce the first and the second lens arrays of the lens array unit offered by the first aspect of the present invention. Further, since an overall size of the resin component block is larger than an individual lens array which is obtained finally, a cavity of the mold used for the formation of the resin component block can be make large. Therefore, when molten resin is injected into the cavity, the molten resin can flow smoothly making it possible for example to appropriately form a precision portion such as the lens.

Preferably, the resin component block has an outer edge surrounding a region formed with the lenses, and the outer edge has at least a portion thicker than the region formed with the lenses.

According to such an arrangement, when the resin component block is formed by means of the injection molding, it becomes possible to allow the molten resin to flow smoothly in a portion of the cavity that corresponds to the outer edges. This makes it easy to let the resin fill the entire cavity in the mold, and possible to perform more appropriately the formation of the resin component block.

Preferably, the method further comprises a light shield forming step of providing a light shield isolating the lenses from each other.

According to such an arrangement, it becomes possible to obtain a lens array capable of preventing the optical cross talk among the lenses.

Preferably, the light shield forming step includes a step of providing a recess isolating the lenses from each other in the resin component block, and a coating step of coating a surface which defines the recess, with a dark material.

Preferably, the recess is formed in the resin-body forming step.

Such an arrangement eliminates the need to perform a separate operation for providing the recess in the resin component block, making it possible to reduce the number of steps necessary for the manufacture of the lens array.

Preferably, the recess is formed by a mechanical machining performed to the resin component block.

Such an arrangement eliminates the need for providing a projection necessary for forming the recess. Therefore, it becomes possible to reduce a cost of the mold. Further, the arrangement also makes it possible to precisely machine the recess.

Preferably, the recess is formed by a laser machining performed to the resin body.

According to such an arrangement, essentially the same effect is achieved, as achieved in the above case of providing the recess by mechanical machining. Moreover, the laser machining allows more precise machining than in the mechanical machining, making it possible for example to form a narrower width of the recess than by the mechanical machining.

Preferably, the coating step includes: a step of applying a dark paint to the surface of the resin body which defines the recess and a lens surface adjacent to the recess, of each lens; and a step of removing the paint from the lens surface before the paint applied to the lens surface dries and hardens.

Such an arrangement facilitates an operation of coating the other portion of the resin component block than the lens surface.

Preferably, each lens has an outer circumferential surface rising from the first support.

Such an arrangement provides a height difference between the lens surface and the support, facilitating the paint removing operation from the lens surface.

An optical device offered by a third aspect of the present invention comprises image forming means which forms an image of an object at a predetermined place by focusing light from the object, and is characterized that the image forming means is provided by a lens array unit. Further, the lens array unit comprises: a including a plurality of first lenses each serving as a convex lens, and a first support holding the first lenses, the first lenses and the first support being formed integrally of a translucent resin; and a second lens array including a plurality of second lenses each serving as a convex lens, and a second support holding the second lenses, the second lenses and the second support being formed integrally of a translucent resin; and is characterized that the first and the second lens arrays are placed, one on the other, with each of the first lenses in alignment with a corresponding one of the second lenses on a same axis, for formation of a non-inverted, non-magnified image.

The optical device with such an arrangement offers the same effect as achieved by the lens array unit offered by the first aspect of the present invention.

Preferably, the optical device further comprises: a light source for illuminating a document; and a plurality of light receiving elements each having a photoelectric transfer capability. Further, in this device, the image of the document is formed on the light receiving elements by having light reflected by the document focus through the lens array unit.

According to such an arrangement, the image of the document can be appropriately read without inversion nor magnification by the light receiving elements.

Preferably, the light receiving elements are disposed in a row in a predetermined direction, and each plurality of the first and the second lenses are disposed in a plurality of rows in the predetermined direction. Further, a path to the lens array unit from a place where the document is placed is intersected by a divergent lens diverging light from the document in a direction across the predetermined direction.

According to such an arrangement, flux of the light which travels from the document toward the lens array unit has a narrow angle (angle of view) in the direction across the predetermined direction. As a result, it becomes possible to give the first and the second lenses a greater depth of focus, leading to such an advantage that the image is less prone to becoming out of focus. And of course, a bright image can be obtained by a plurality of arrays of the first and the second lenses.

Preferably, the optical device further comprises a transparent plate capable of guiding the document, and the transparent plate is formed integrally with the divergent lens.

According to such an arrangement, it becomes possible to reduce increase in the number of parts.

Preferably, the optical device further comprises a divergent lens disposed between the lens array unit and the light receiving elements for divergence of light having passed the lenses of the lens array in a direction across the predetermined direction.

According to such an arrangement, it becomes possible to narrow the angle of focusing flux of the light which travels from the lens array unit toward the light receiving elements. Therefore, even if there is a distance error between the lens array unit and the light receiving elements due to an assembling error of the optical device, it is still possible to form a well-focused image.

Preferably, the optical device comprises: at least one image display disposed in front of the lens array unit;
    a translucent screen disposed behind the lens array unit; and an auxiliary lens disposed between the screen and the lens array unit. An image displayed in the image display is enlarged or reduced into a non-inverted image on the screen by the lens array unit and the auxiliary lens.

According to such an arrangement, an enlarged non-inverted image or reduced non-inverted image of the image displayed in the image display can be displayed on the screen.

Preferably, the optical device comprises a plurality of the image displays, and further, the auxiliary lens is provided by a divergent lens, whereby images displayed in the respective image displays are enlarged into an integrated non-inverted image on the screen.

According to such an arrangement, it becomes possible to form a desired enlarged view on the screen, without projecting an image of the region where the image displays are connected together.

Preferably, the screen is provided by a color filter including a filter element for each color of red, green and blue.

According to such an arrangement, it becomes possible to obtain an image having a high contrast on the screen. Specifically, unlike the above arrangement, if a white screen is used, it is difficult to clearly present the color black because the background color of the image projected is white. On the contrary, according to the above arrangement, a variety of colors can be created by a color additive process of red, green and blue, and further, these colors are not presented on a white background. Therefore, it is possible to increase contrast of the image.

Preferably, a surface of the screen away from the auxiliary lens is convex or concave.

According to such an arrangement, the surface of the screen on which the image is displayed becomes visible from an octagonal direction of the screen, making it possible to display at a wide angle of view.

Other characteristics and advantages of the present invention will become clearer from the following description of embodiments to be presented with reference to the accompanying drawings.

BRIEF DESCRIPTION OF THE DRAWINGS

FIG. 22a is a diagram illustrating a function of the lens array unit shown in FIG. 1 through FIG. 22b; FIG. 21b is a diagram illustrating a function of Comparative Example 1 as with the present invention; and FIG. 22c is a diagram illustrating a function of Comparative Example 2 as with the present invention.

FIG. 33 is a sectional view taken in lines XXXIII—XXXIII in FIG. 32a.

BEST MODE FOR CARRYING OUT THE INVENTION

Hereinafter, preferred embodiments of the present invention will be described specifically, with reference to the attached drawings.

Throughout these drawings, identical or similar elements are indicated by the same reference codes respectively.

FIG. 1 through FIG. 4 show a first embodiment of the lens array unit according to the present invention.

Figure 1:
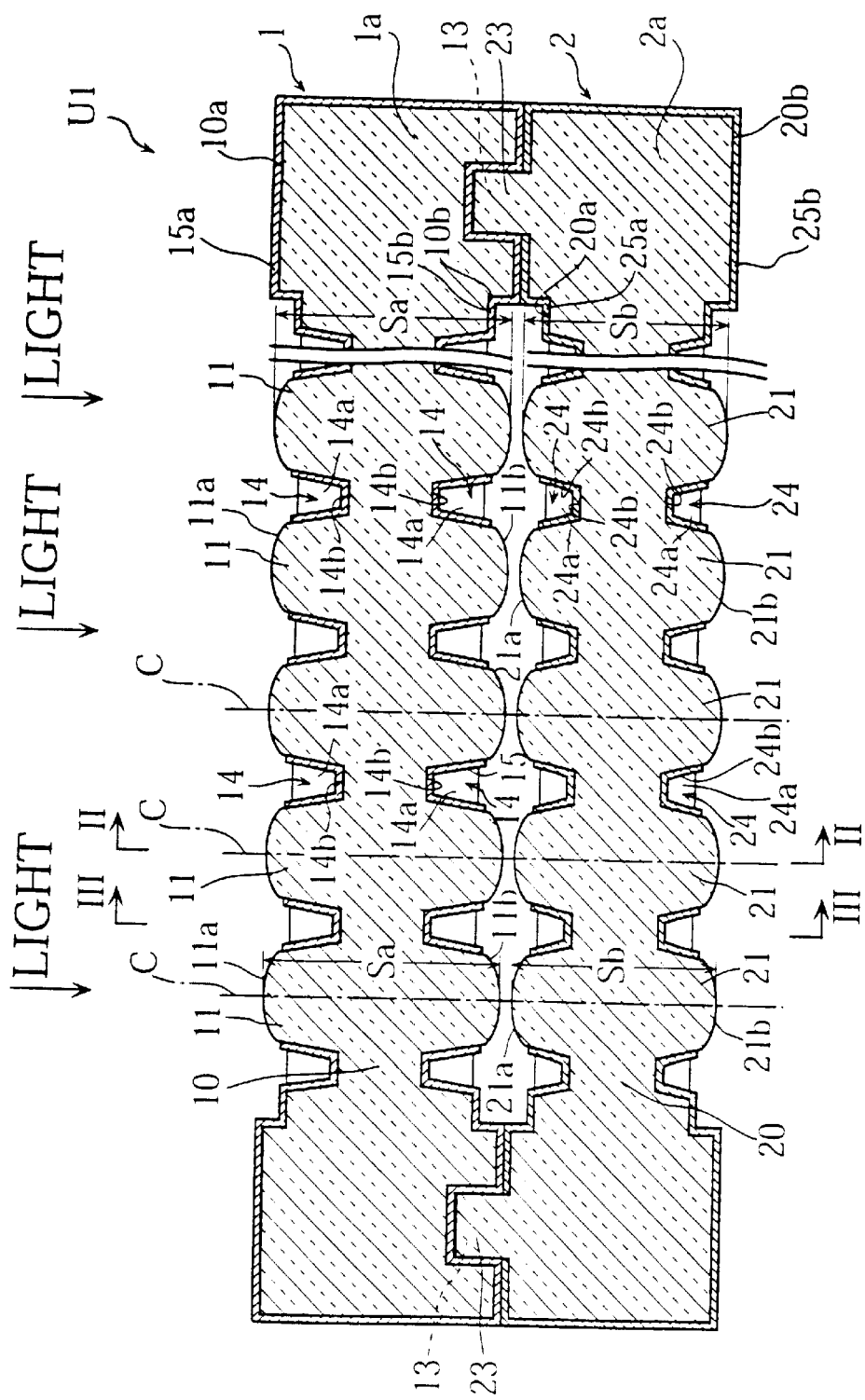
FIG. 1 is a sectional view of a first embodiment of the lens array unit according to the present invention.
Figure 2:
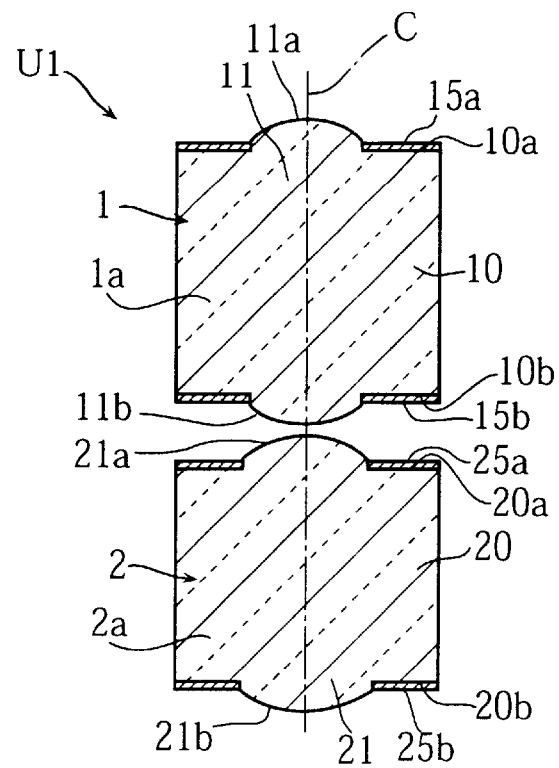
FIG. 2 is a sectional view taken in lines II—II in FIG. 1.
Figure 3:
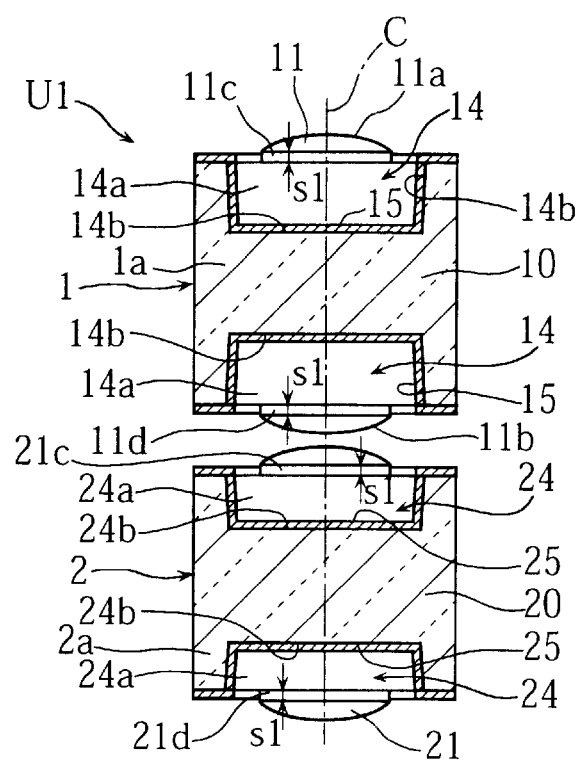
FIG. 3 is a sectional view taken in lines III—III in FIG. 1.
Figure 4:
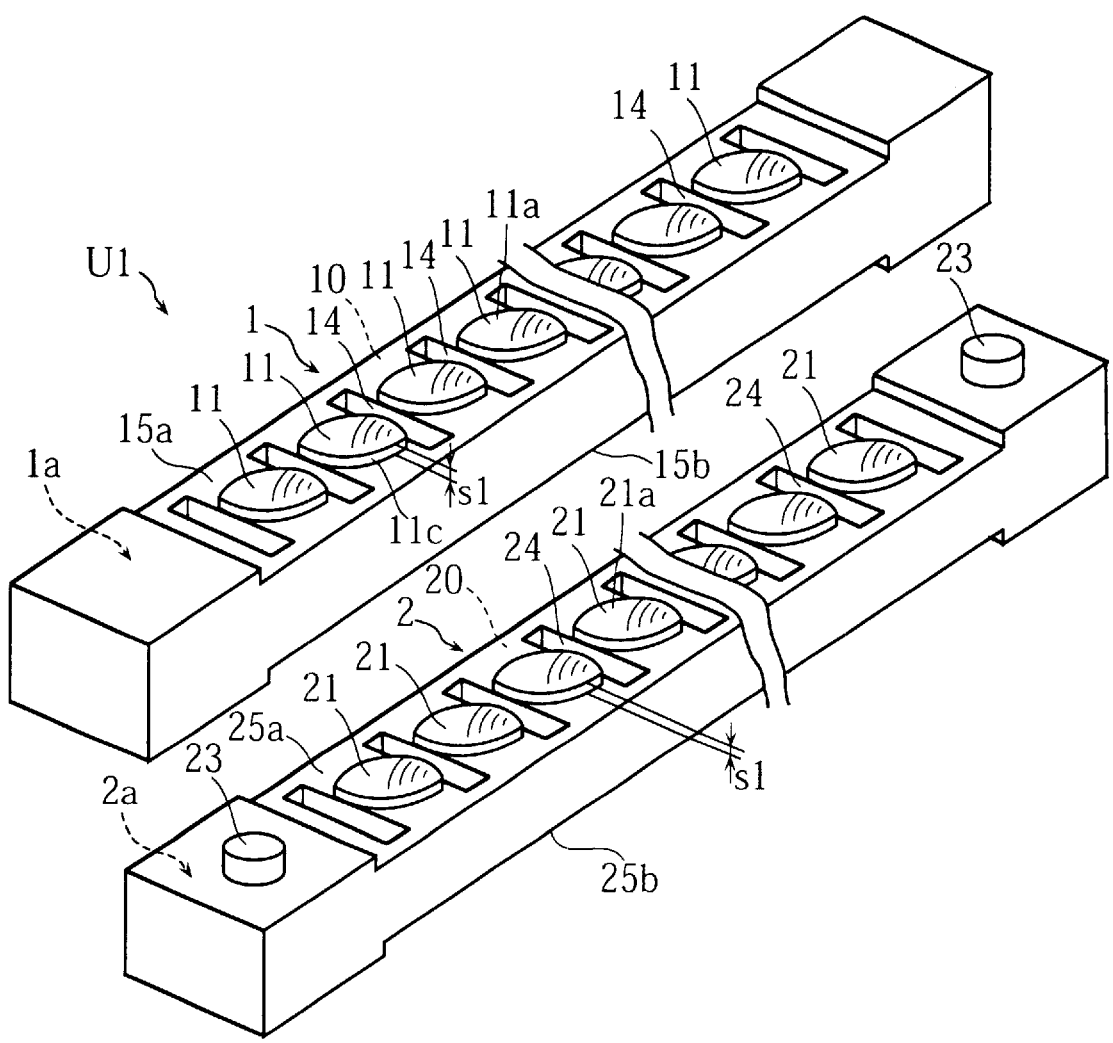
FIG. 4 is an exploded perspective view of the lens array unit shown in FIG. 1.

As clearly shown in FIG. 1, the lens array unit U1 according to the present embodiment comprises a first lens array 1 and a second lens array 2.

The first lens array 1 includes a main body 1a, which includes a plurality of first lenses 11 spaced at an interval in a straight row, and a first support 10 formed integrally with the first lenses 11. The second lens array 2 has an essentially the same structure as of the first lens array 1, including a main body 2a, which includes a plurality of second lenses 21 spaced at an interval in a straight row, and a second support 20 formed integrally with the second lenses 21.

Each of the main bodies 1a, 2a is like block-like, extends in a predetermined direction, and is made of a transparent synthetic resin. The transparent synthetic resin is provided for example by PMMA (poly methyl methacrylate (methacrylic resin)) or PC (polycarbonate).

At each longitudinal end portion of the main bodies, there is provided a pair of a recess 13 (on the back surface or the lower surface of the main body 1a) and a projection 23 (on the top surface or the upper surface of the main body 2a). In each pair, the recess 13 and the projection 23 mate each other, putting the first and the second lens arrays 1, 2 into an assembly, in which an axis C of each of the first lenses 11 is in alignment with an axis C of a corresponding one of the second lenses 21.

Each of the first lenses 11 has a first and a second lens surfaces 11a, 11b at a distance from each other in the direction of the axis C. Each of the lens surfaces 11a, 11b has a convex surface, and thus the first lens 11 is a biconvex lens having a predetermined length Sa. As shown clearly in FIG. 3 and FIG. 4, the first lens 11 has outer circumferential surfaces 11c, 11d rising respectively from an upward facing surface 10a and a downward facing surface 10b of the first support 10, by an appropriate height of s1.

Each of the second lenses 21 has a third and a fourth lens surfaces 21a, 21b at a distance from each other in the direction of the axis C. The third lens surface 21a is closely faced to the second lens surface 11b. Each of the lens surfaces 21a, 21b also has a convex surface, and thus the second lens 11, too is a biconvex lens, having a predetermined length Sb. However, the respective lengths Sa, Sb of the first and the second lenses 11, 21 are different from each other, and more specifically has a relationship of Sa>Sb. The second lens 21 has outer circumferential surfaces 21c, 21d rising respectively from an upward facing surface 20a and a downward facing surface 20b of the second support 20, by an appropriate height of s1.

Each of the first, the second, the third and the fourth lens surfaces 11a, 11b, 21a, 21b has a curvature capable of creating a non-inverted, non-magnified image as will be described later. Each of the lens surfaces may be spherical or aspherical. If all the lens surfaces are spherical, manufacture of the lenses will become easy. On the other hand if the lens surfaces are aspherical, it becomes possible to reduce aberration. Each of the lens surfaces 11a, 11b, 21a, 21b has a diameter of about 0.6 mm for example. The first and the second lenses 11, 21 are disposed at a pitch of 0.75–1 mm for example.

The longitudinal ends of the first support 10 are thicker than a longitudinally intermediate portion. The first support 10 is provided with a plurality of light shields 14 and light shielding films 15a, 15b serving as means for optically separating the lenses from each other. The light shields 14 include a plurality of recesses 14a alternated with the first lenses 11 in each of the surfaces 10a, 10b of the first support 10, and black coatings 14b coating a plurality of wall surfaces that define the recesses 14a. Each of the recesses 14a has a depth not penetrating the first support 10, and extending widthwise of the first support 10 providing separation between two adjacent first lenses 11. The light shielding films 15a, 15b are provided by applying a black coating on the entire or most of the surfaces 10a, 10b. The light shielding films 15a, 15b and the coatings 14b can be provided by a same coating process as will be described later. However, these may be proved in different processes.

The second support 20 is provided with a plurality of light shields 24 and light shielding films 25a, 25b. These are the same as the light shields 14 and light shielding films 15a, 15b respectively of the first support 10. The light shields 24 are provided by a plurality of recesses 24a formed in each of surfaces 20a, 20b, with black coatings 24b coating a plurality of wall surfaces that define the recesses 24a. The light shielding films 25a, 25b are provided by applying a black coating on the entire or most of the respective surfaces 20a, 20b. It should be noted however, that according to the present invention, the second lens array 2 may not be provided with the light shields 24 and the light shielding films 15a, 15b as will be described later. Like in the first support, the second support 20 also has its longitudinal ends thicker than its longitudinally intermediate portion.

Next, a method of manufacturing the first and the second lens arrays 1, 2 will be described with reference to FIG. 5 through FIG. 14. The description will cover only a method of manufacturing the first lens array 1 as a representative example, since the first and the second lens arrays 1, 2 have essential structures in common.

In order to manufacture the first lens array 1, first, a rectangular, sheet-like or plate-like resin component block 1' is manufactured. The resin component block 1' is translucent, and its shape essentially represents a plurality of main bodies 1a lined side by side into a single block. Therefore, the resin component block 1' includes a total of e.g. ten rows of an integral components including the first lenses 11, portions corresponding to the first supports 10, the recesses 14a, and the recesses 13.

The resin component block 1' has outer edges 19a, 19b, 19c, 19d surrounding a region formed with the first lenses 11. These outer edges are thicker than the region formed with the first lenses 11. Rows of regions each representing the first support 10 are partitioned by belt regions 19e extending in the direction of the rows of the first lenses 11. Each of the belt region 19e also is thicker than the region formed with the first lenses 11.

Figure 8:
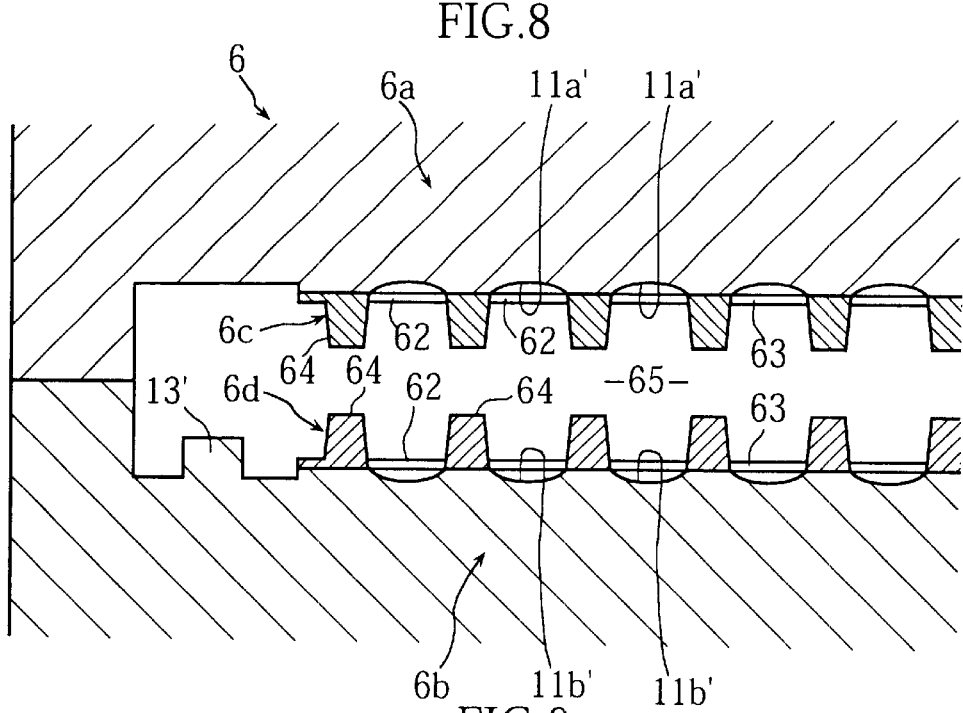
FIG. 8 is a sectional view of a metal mold used in formation of the resin component block.
Figure 9:
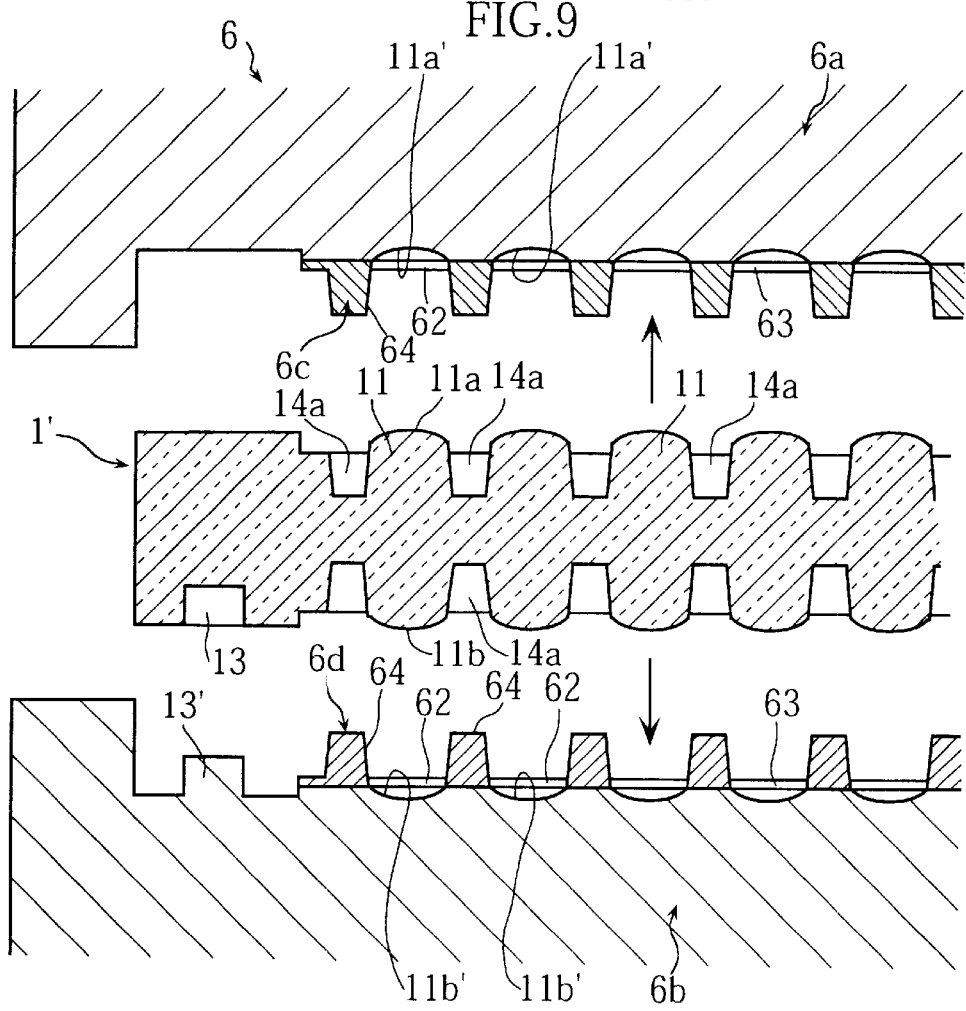
FIG. 9 is a sectional view showing a formation step of the resin component block.
Figure 10:
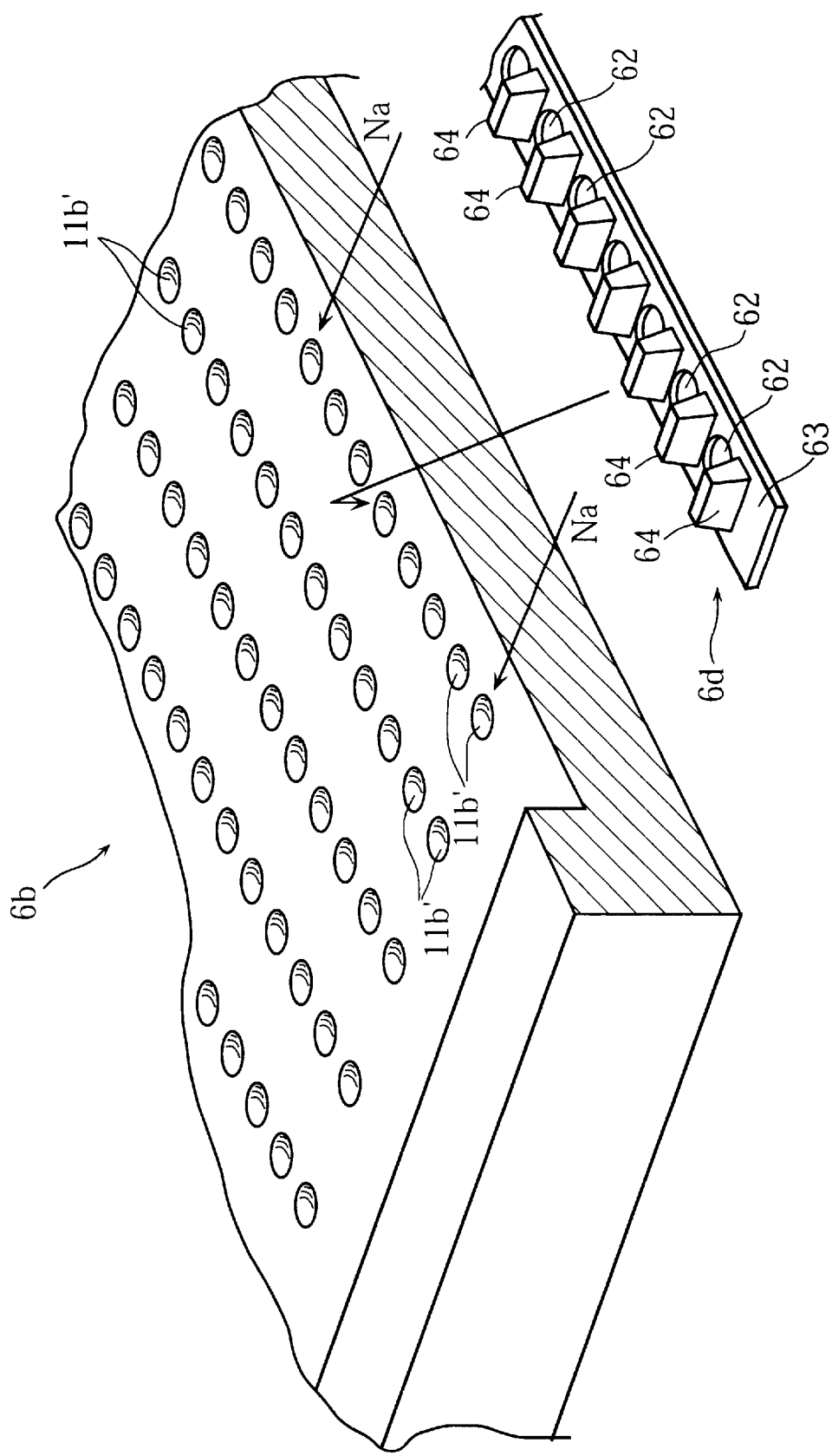
FIG. 10 is an exploded perspective view of a principal portion of the mold shown in FIG. 8.

As shown in FIG. 8 and FIG. 9 for example, formation of the resin component block 1' is made by means of a metal mold 6. The mold 6 includes an upper mold 6a, a lower mold 6b and a pair of auxiliary molds 6c, 6d. The upper mold 6a and the lower mold 6b have surfaces that form a cavity 65. These surfaces are provided with a plurality of recesses 11a', 11b' corresponding to the first and the second lens surfaces 11a, 11b respectively, and a plurality of projections 13' corresponding to the recesses 13. As will be understood from FIG. 10 in which the auxiliary mold 6d is illustrated, each of the auxiliary molds 6c, 6d includes a strip member 63 formed with a plurality of through holes 62 and a plurality of projections 64 formed on a surface. The projections 64 are members for forming the recesses 14a. As shown in FIG. 8 and FIG. 9, these auxiliary molds 6c, 6d are attached to the upper mold 6a and the lower mold 6b respectively, with the through holes 62 aligned with the corresponding recesses 11a, 11b.

A translucent synthetic resin is injected into the cavity 65 of the mold 6. This molding process yields the resin component block 1'. Each of the through holes 62 in the auxiliary molds 6c, 6d serves to form the outer circumferential surfaces 11c, 11d of the first lenses 11 shown in FIG. 3 and FIG. 4. As compared with the first lens array 1 which will be obtained finally, the resin component block 1' has a larger overall size, which allows the cavity 65 to be given a large volume. Therefore, when the molten resin is injected into the cavity 65, the molten resin can flow easily in the cavity 65, making it possible to properly form each detail of the resin component block 1'. In particular, the cavity 65 has large hollows for formation of the thick outer edges 19a, 19b, 19c, 19d and the border belt regions 19e. These hollows allow the molten resin to flow smoothly and to fill the entire cavity 65. The resin should preferably be supplied into the cavity 65 in a direction indicated by Arrow Na in FIG. 10, along the rows of projections 64. Such an arrangement makes it possible for the resin to flow without being blocked very much by the projections 64.

Figure 11:
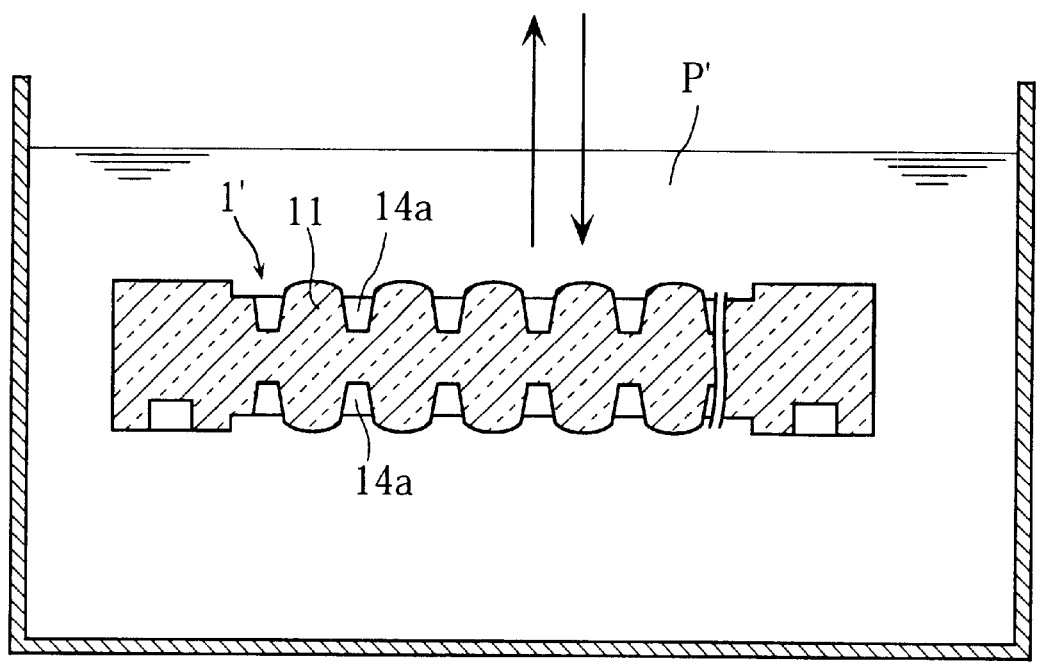
FIG. 11 is a sectional view illustrating a step of applying a coating to the resin component block.

After the manufacture of the resin component block 1', a coating process is performed. The process is preformed as shown in FIG. 11 for example, by immersing the resin component block 1' into a black paint P'. In this process, the entire surface of the resin component block 1' is covered by a black coating. According to the present invention, alternatively to such a method, an inkjet printer for example may be used for spraying a black ink to the entire surface of the resin component block 1'. In this arrangement, there is no problem if the ink makes a pool in each of the recesses 14a. As will be understood from this, according to the present invention, another method may be employed as the means for coating the surface that defines the recess 14a with a dark material. Specifically, alternatively to the means for applying a coating to each of the recess 14a, use may be made of means for stuffing each of the recess 14 with a dark material.

Figure 12:
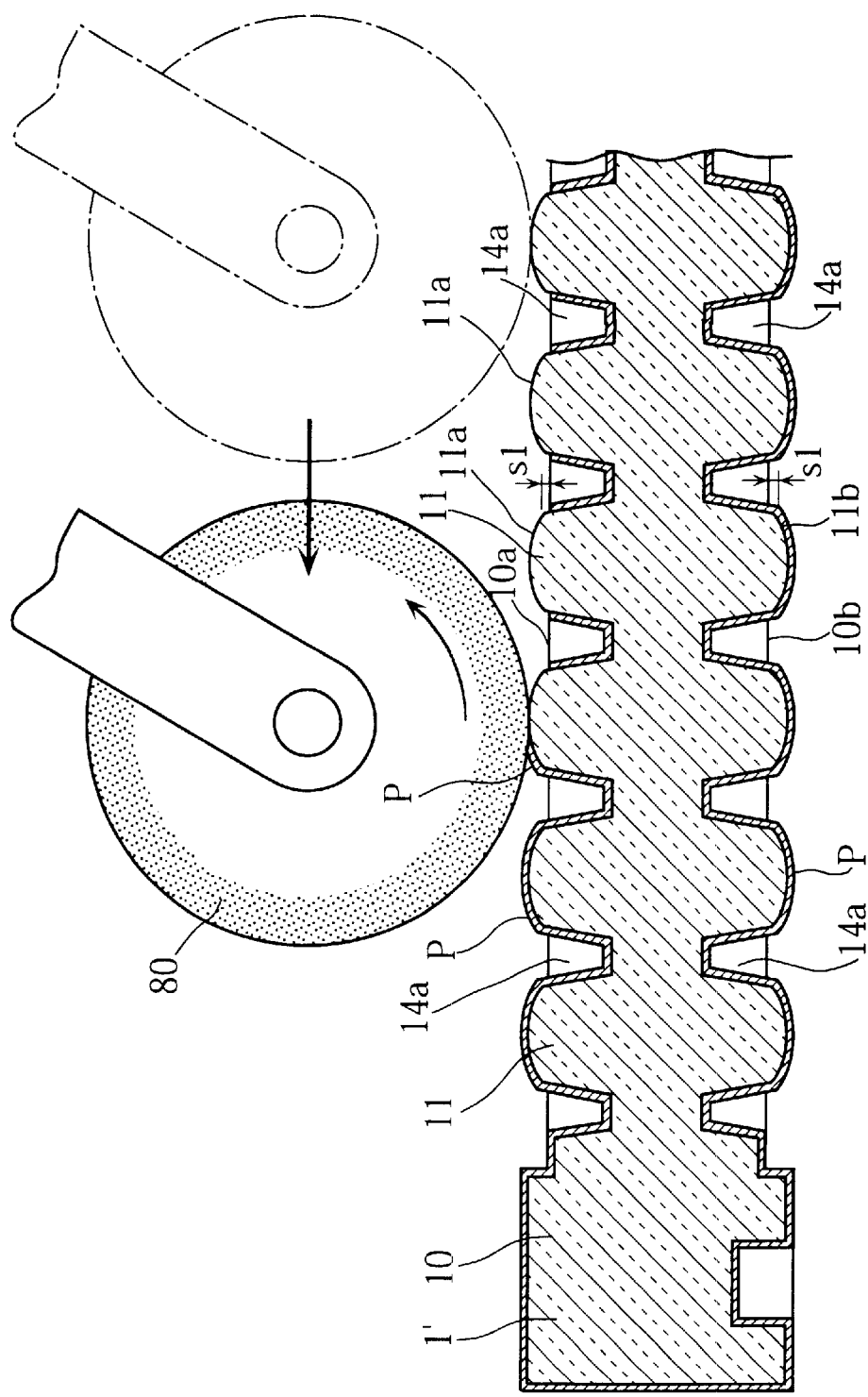
FIG. 12 is a sectional view illustrating a step of removing a part of the coating from the resin component block.
Figure 13:
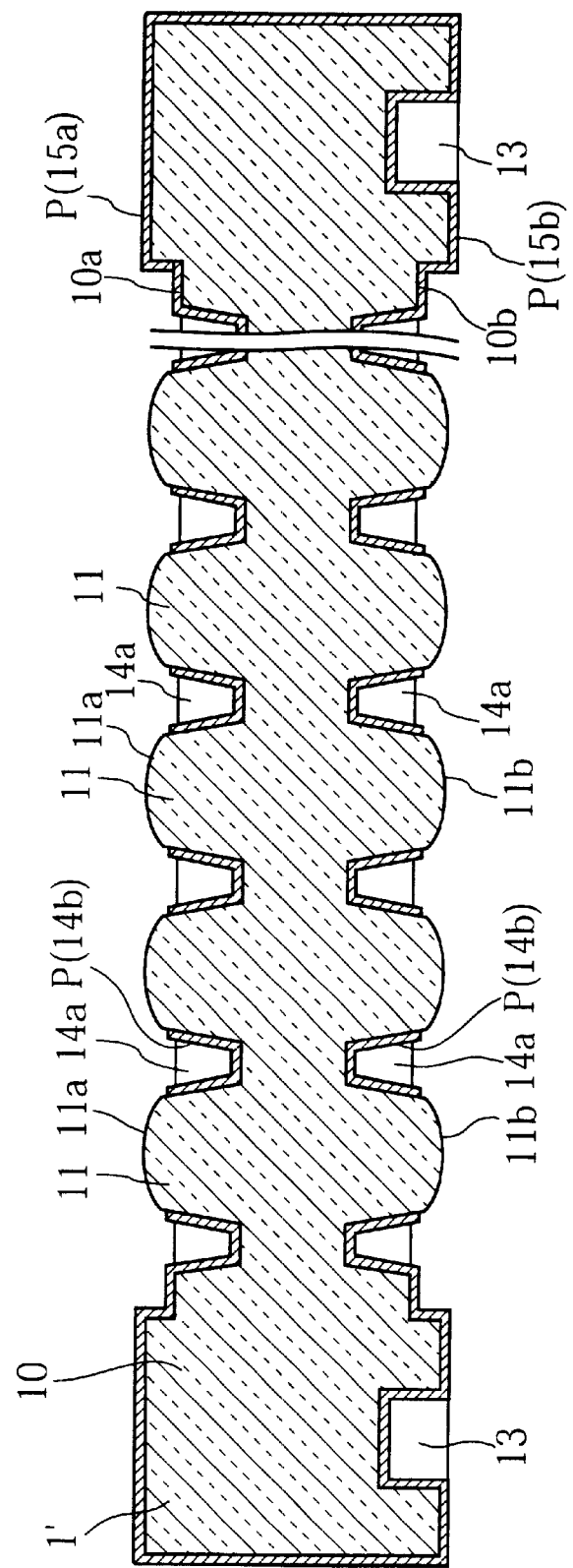
FIG. 13 a sectional view showing a state in which a coating process of the resin component block is completed.

After the black coating process, as shown in FIG. 12, a process of removing the paint P from the first and the second lens surfaces 11a, 11b of the resin component block 1' is performed. This process is performed before the paint P has dried and hardened, by absorbing the paint P with a water-absorbing roller 80. Since the first and the second lens surfaces 11a, 11b are higher than the surfaces 10a, 10b of the first support 10 by the height s1, it is easy to remove the paint P on the first and the second lens surfaces 11a, 11b, while leaving the paint P on the surfaces 10a, 10b. As shown in FIG. 13, the paint P which is not removed from the resin component block 1' is allowed to dry and harden to become the light shields 14 and light shielding films 15a, 15b described earlier. According to the present invention, alternatively to the above described coating means, different means may be employed. For example, the first and the second lens surfaces 11a, 11b are masked, then the black coating is applied to the entire resin component block 1', and thereafter the masking is removed from the first and the second lens surfaces 11a, 11b.

Figure 14:
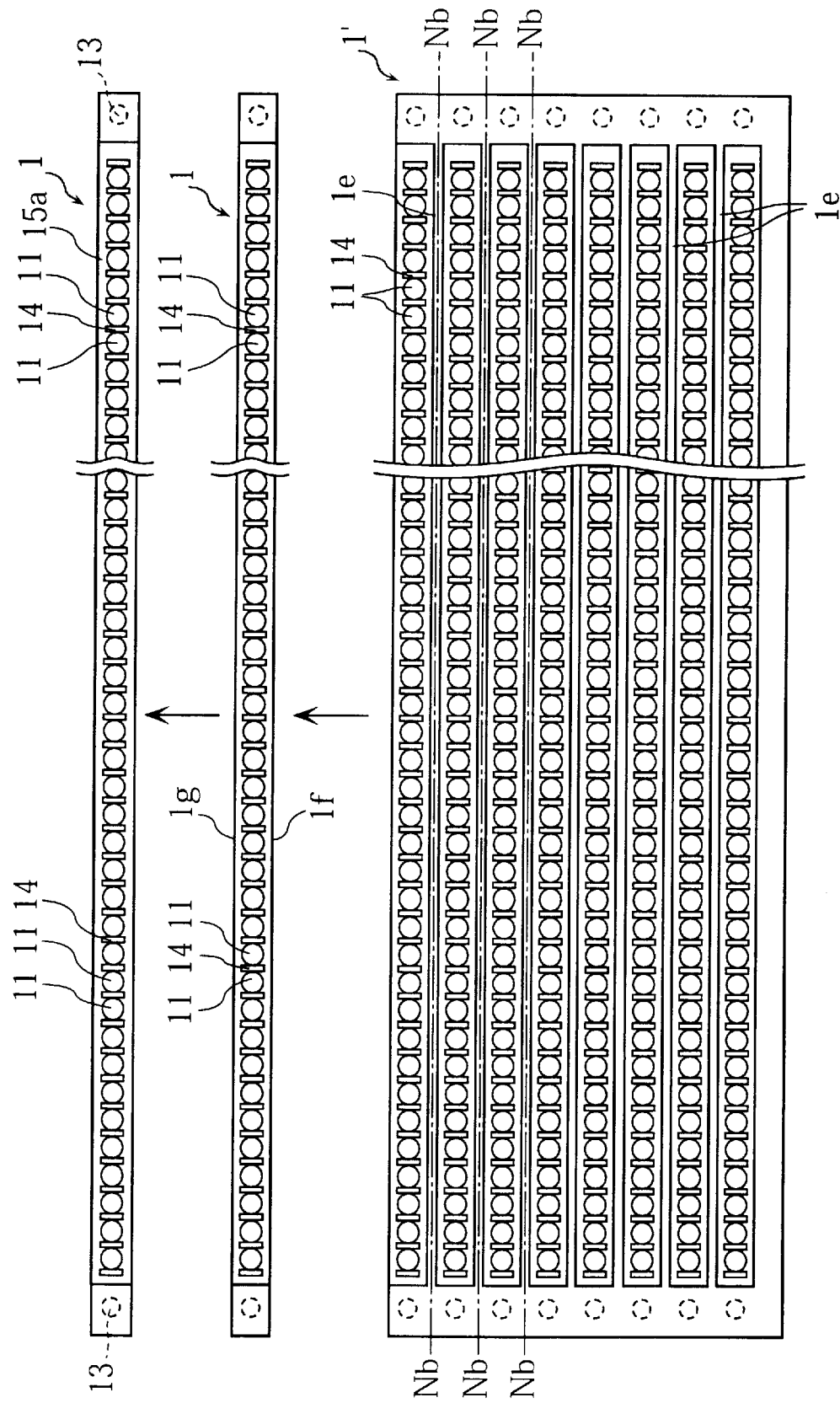
FIG. 14 a plan view illustrating a step of dividing the resin component block.

Next, as shown in FIG. 14, the resin component block 1' is divided. The dividing operation is performed by cutting the resin component block 1' on a plurality of imaginative cutting lines indicated by references codes Nb-Nb. Each cutting lines passes through one of the belt regions 19e, and the cutting is made sequentially or simultaneously. Means for the cutting can be mechanical, such as a combination of a lathe and a cutting tool, or can be any others such as a laser. The cutting operation yields a plurality of the first lens arrays 1. Each of these first lens arrays 1 has side surfaces 1f, 1g created by the cutting, which are not covered by the coating. As necessary, the side surfaces 1f, 1g are applied with a black coating.

According to the above method of manufacture, the resin component block 1' can be easily formed by means of an ordinary resin molding process using a metal mold. Further, it is possible to obtain a plurality of the first lens arrays 1 from a single resin component block 1'. Therefore, productivity of the first lens array 1 is high. Further, since the black coating to many of the first lens arrays 1 is achieved in a single coating operation performed to the resin component block 1', the productivity is further increased. The second lens array 2 can also be manufactured efficiently by essentially the same method as described above. After manufacturing the first and the second lens arrays 1, 2, their respective recesses 13 and projections 23 are mated with each other, whereby a lens array unit U1 can be easily assembled. As has been exemplified, manufacture of the lens array unit U1 is easy, and it is possible to manufacture at a low cost.

The first and the second lens array 1, 2 can be manufactured by using a method different from the above. A specific example of such an alternative will be described, with reference to FIG. 15 through FIG. 18.

Figure 15:
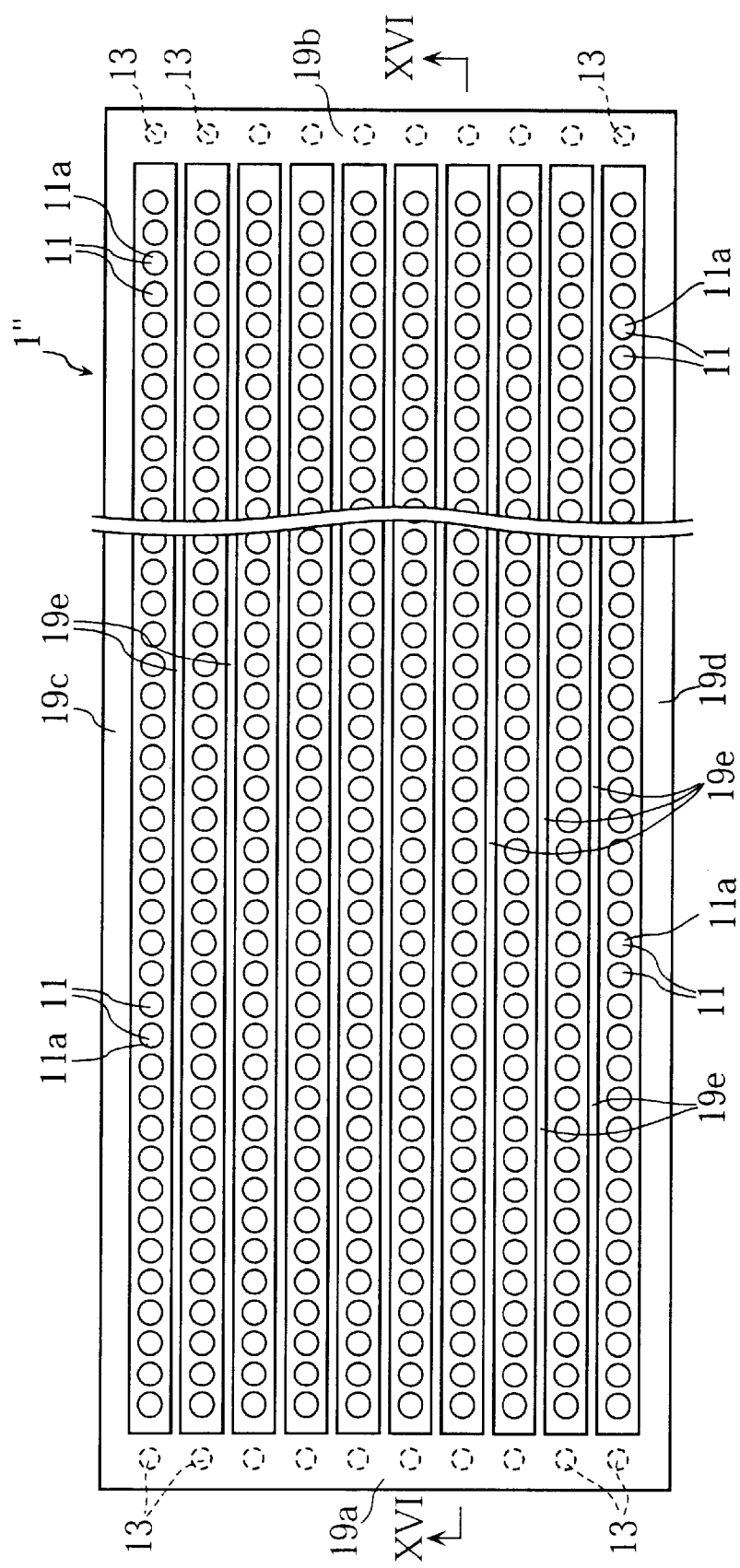
FIG. 15 is a plan view showing another example of the resin component block.
Figure 16:
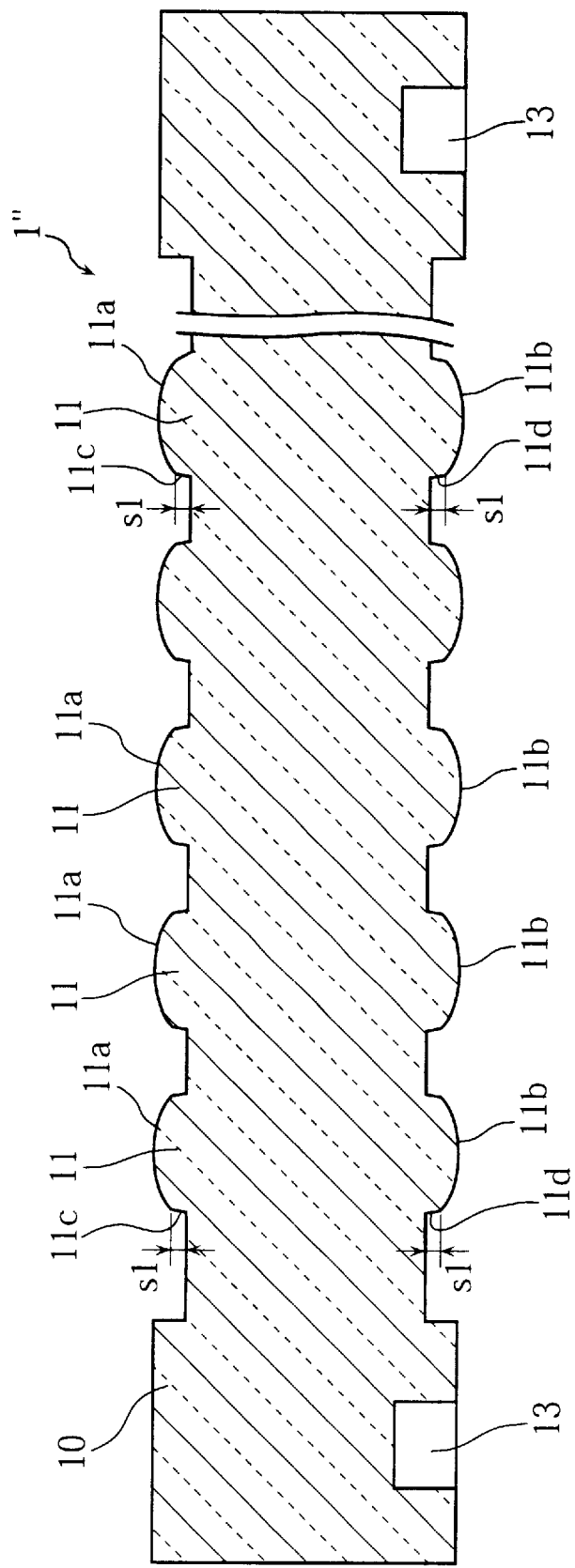
FIG. 16 is a sectional view of the resin component block shown in FIG. 15.
Figure 17:
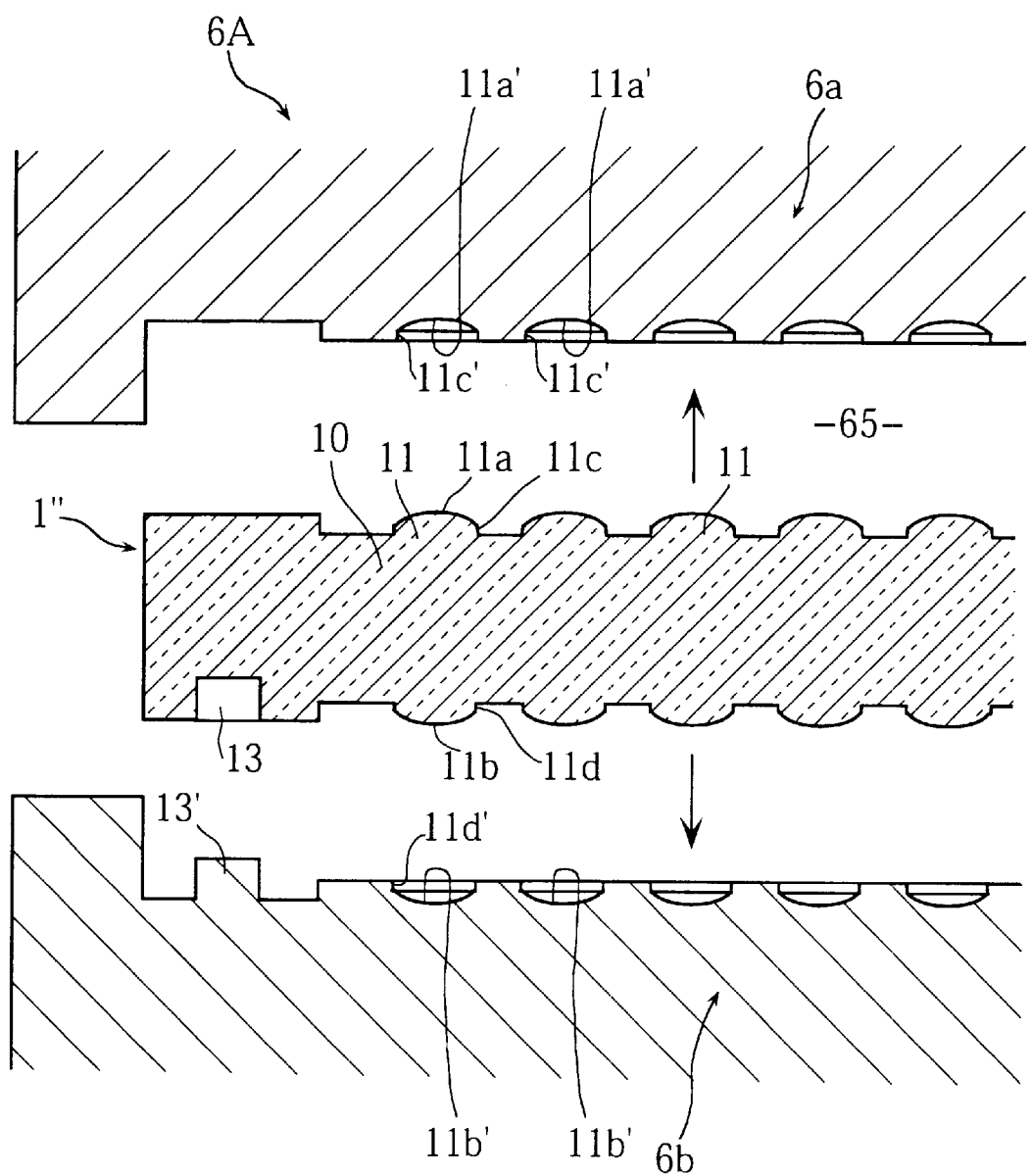
FIG. 17 is a sectional view illustrating a formation step of the resin component block shown in FIG. 15 and FIG. 16.

In order to manufacture the first lens array 1, first, a resin component block 1" as shown in FIG. 15 and FIG. 16 is manufactured. The resin component block 1" is not yet formed with a plurality of recesses 14a. Therefore, a mold 6A as shown in FIG. 17 for example, which has a simple structure not formed with a plurality of projections that correspond to the recesses 14a, can be used for forming the resin component block 1". The outer circumferential surfaces 11c, 11d of the first lenses 11 can be formed by providing a plurality of corresponding recesses 11c', 11d' in the upper die 6a and the lower die 6b. With such an arrangement, the auxiliary molds 6c, 6d shown in FIG. 8 through FIG. 10 need not be used.

Figure 18:
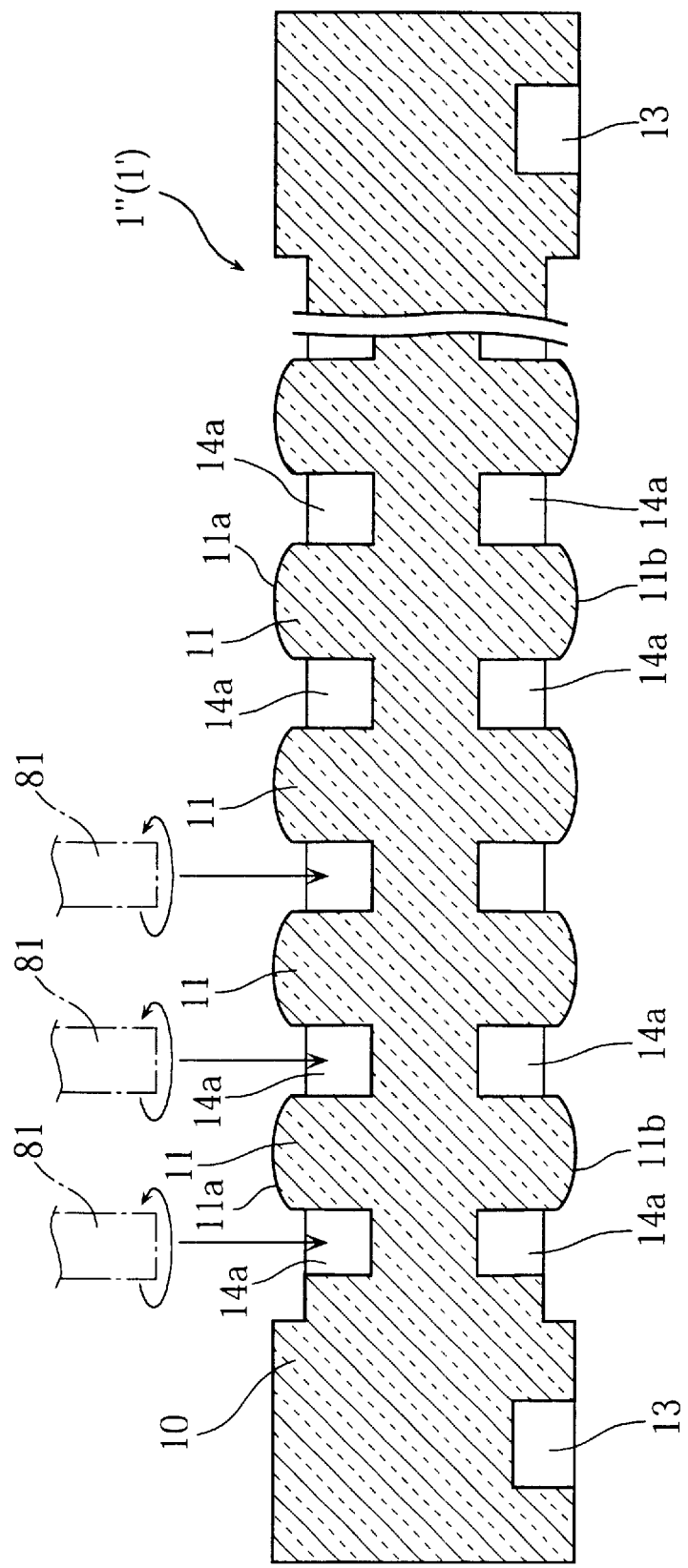
FIG. 18 is a sectional view illustrating a step of forming recesses in the resin component block.

After the manufacture of the resin component block 1", as shown in FIG. 18, a plurality of the recesses 14a are formed.

Figure 5:
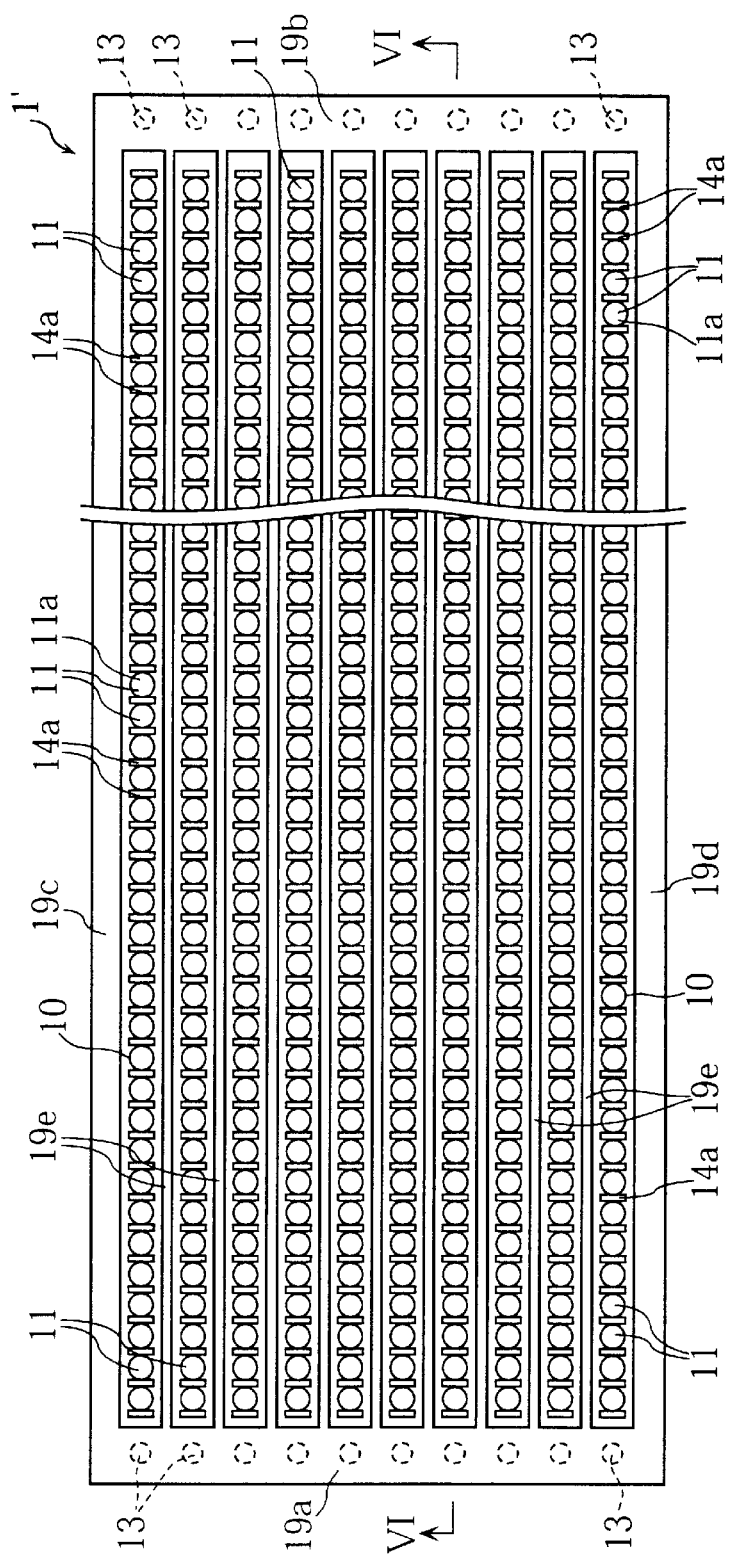
FIG. 5 is a plan view of a resin component block used in manufacture of the lens array unit shown in FIG. 1 through FIG. 4.
Figure 6:
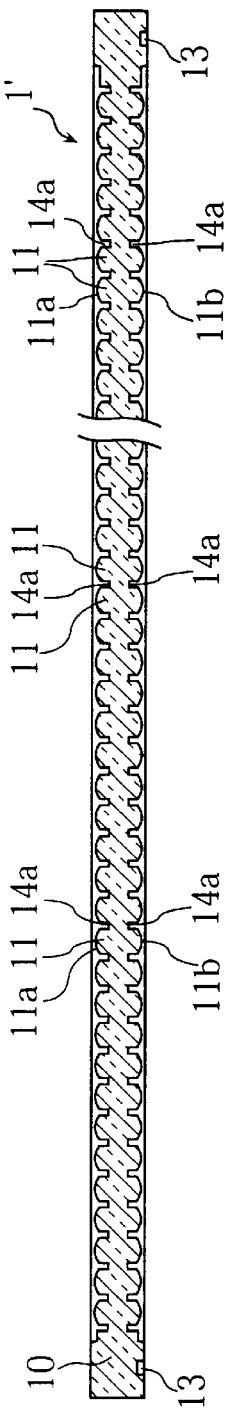
FIG. 6 is a sectional view taken in lines VI—VI in FIG. 5.
Figure 7:
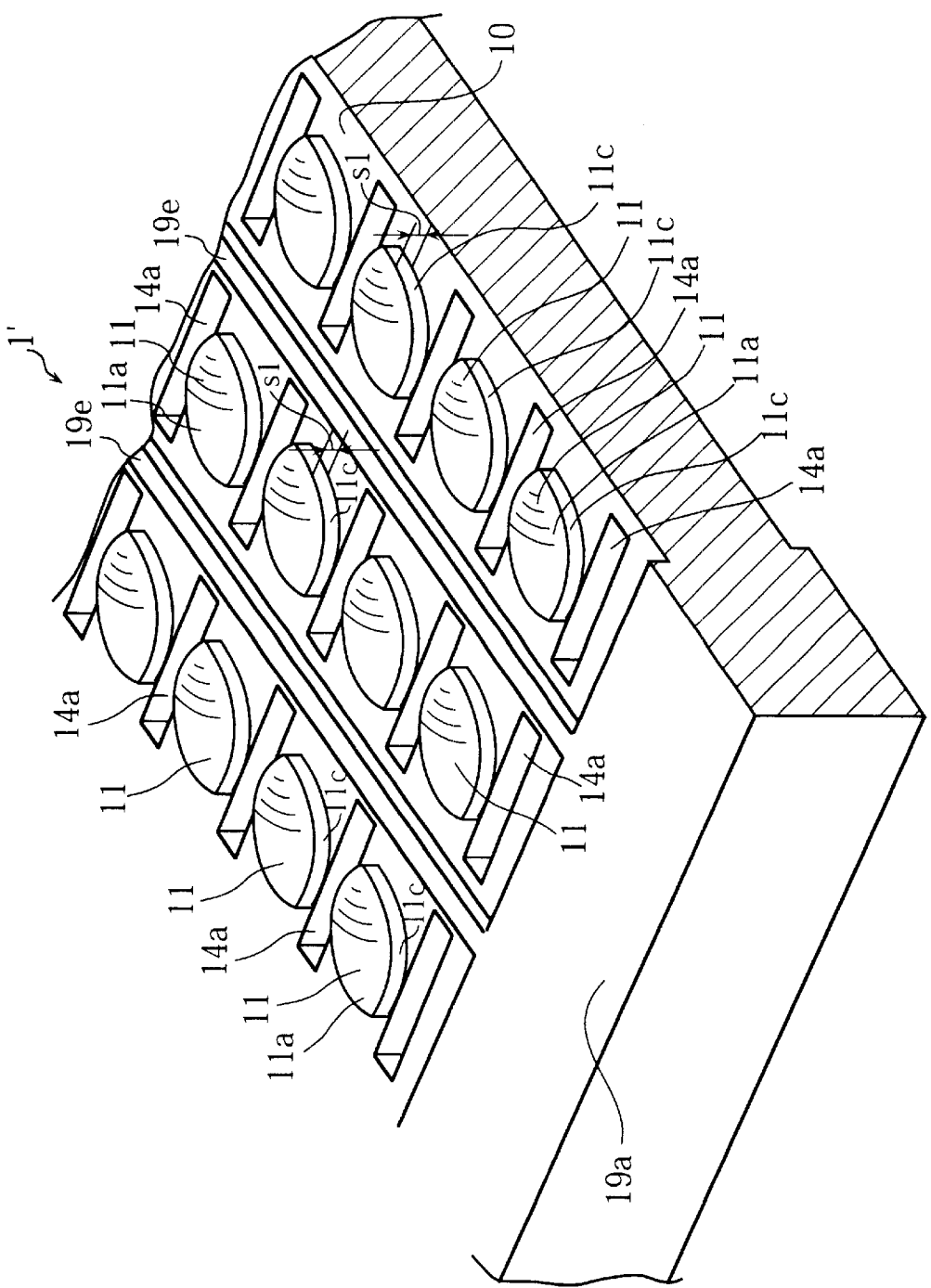
FIG. 7 is a perspective view, with partial section, of the resin component block shown in FIG. 5.

Through this process, a resin component block which is the same, or generally the same as the resin component block 1' shown in FIG. 5 through FIG. 7 can be obtained. The recesses 14a can be formed by mechanical means such as a multiple-spindle milling machine (not illustrated) provided with a plurality of end mills 81. A multiple-spindle milling machine allows simultaneous machining of a plurality of the recesses 14a, making it possible to increase operation efficiency. Preferably, the machining is performed while pouring water onto the resin component block 1", or to the resin component block 1" submerged in cooling water. With such an arrangement, portions being machined are protected from excessive temperature rise, and therefore it becomes possible to protect the first and the second lens surfaces 11a, 11b from being deformed due to the heat. By using the mechanical means, the recesses 14a can be made narrower than in the case where the recesses 14a are formed by injection molding using the mold. With the narrower recesses 14a, the first lenses 11 can be pitched at a finer interval accordingly. This is preferable in increasing resolution of the lens array unit U1 and in increasing brightness of image formed by the lens array unit U1.

The recesses 14a may also be formed by means of laser. Preferably, this laser means is provided by a laser capable of performing photochemical operation, such as an excimer laser and pulse $CO_2$ laser. The photochemical operation as used herein is not a function offered by thermal energy of the laser beam, but an optical action capable of unbinding or breaking a molecular complex of the object material. By using a laser that can offer the photochemical capability, temperature rise at a portion under the laser treatment can be reduced, and the first lenses 11 can be protected from thermal damage. The laser can provide precision machining, making it possible to further narrower the recesses 14a, than by mechanical machining.

Figure 19:
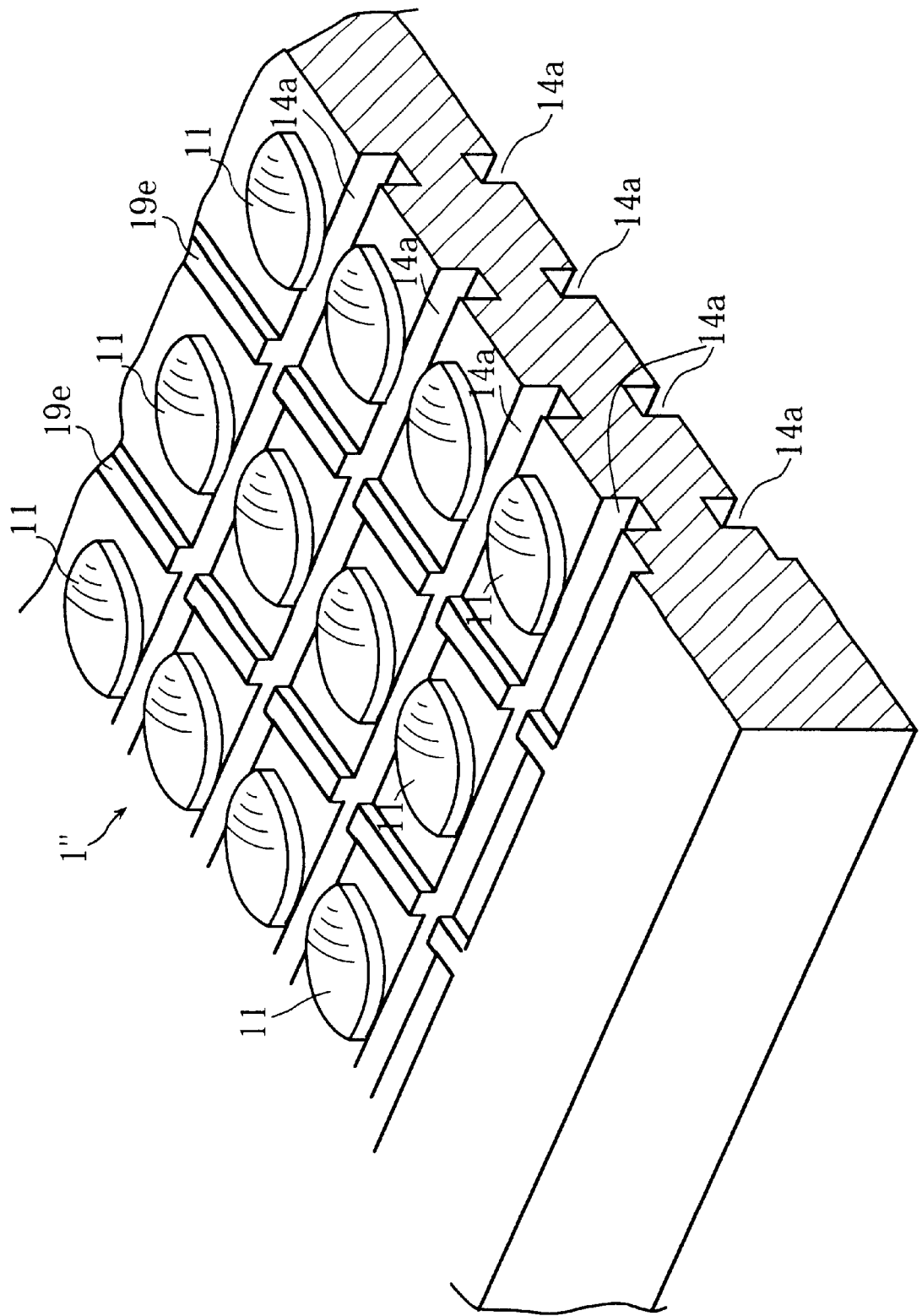
FIG. 19 is a perspective view, with partial section, showing another example of the recesses formed in the resin component block.
Figure 20:
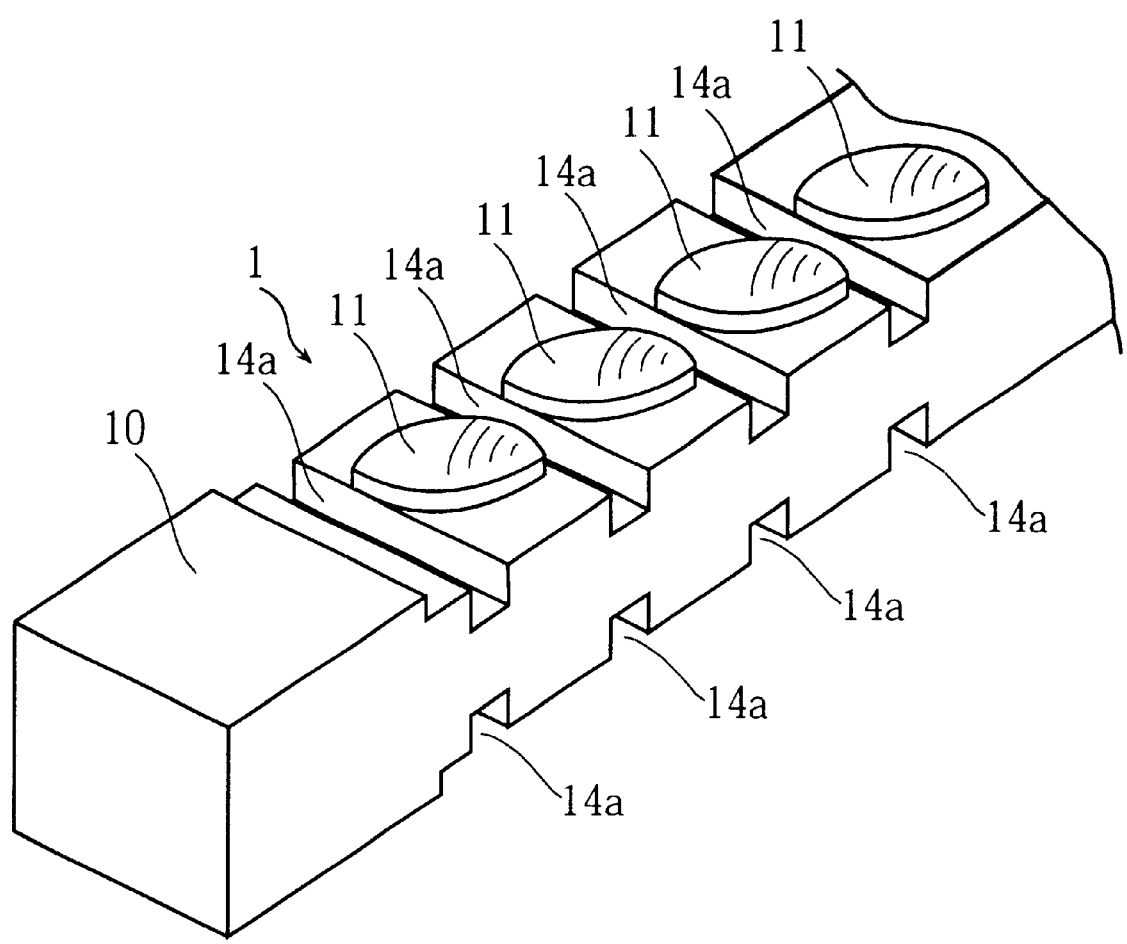
FIG. 20 is a perspective view showing a principal portion of a lens array manufactured from the resin component block shown in FIG. 19.

When forming a plurality of recesses 14a in the resin component block 1", as shown in FIG. 19 for example, each of the recesses 14a may be formed continuously. By forming in such a way, the first lens array 1 obtained finally by dividing the resin component block 1' has the recesses 14a as shown in FIG. 20, each extending over the entire width of the first support 10. According to the present invention, the recesses 14a may be formed as such.

As will be understood from the above method of manufacture, in forming the main body 1a of the first lens array 1, it is efficient to first make and then divide a resin component block which essentially represents a plurality of the main bodies 1a. However, the method of manufacturing a lens array according to the present invention is not limited to this. For example, the main body 1a may be formed as a single piece in a mold by an injection molding process.

Next, a function of the lens array unit U1 will be described with reference to FIG. 21 and FIG. 22.

Figure 21:
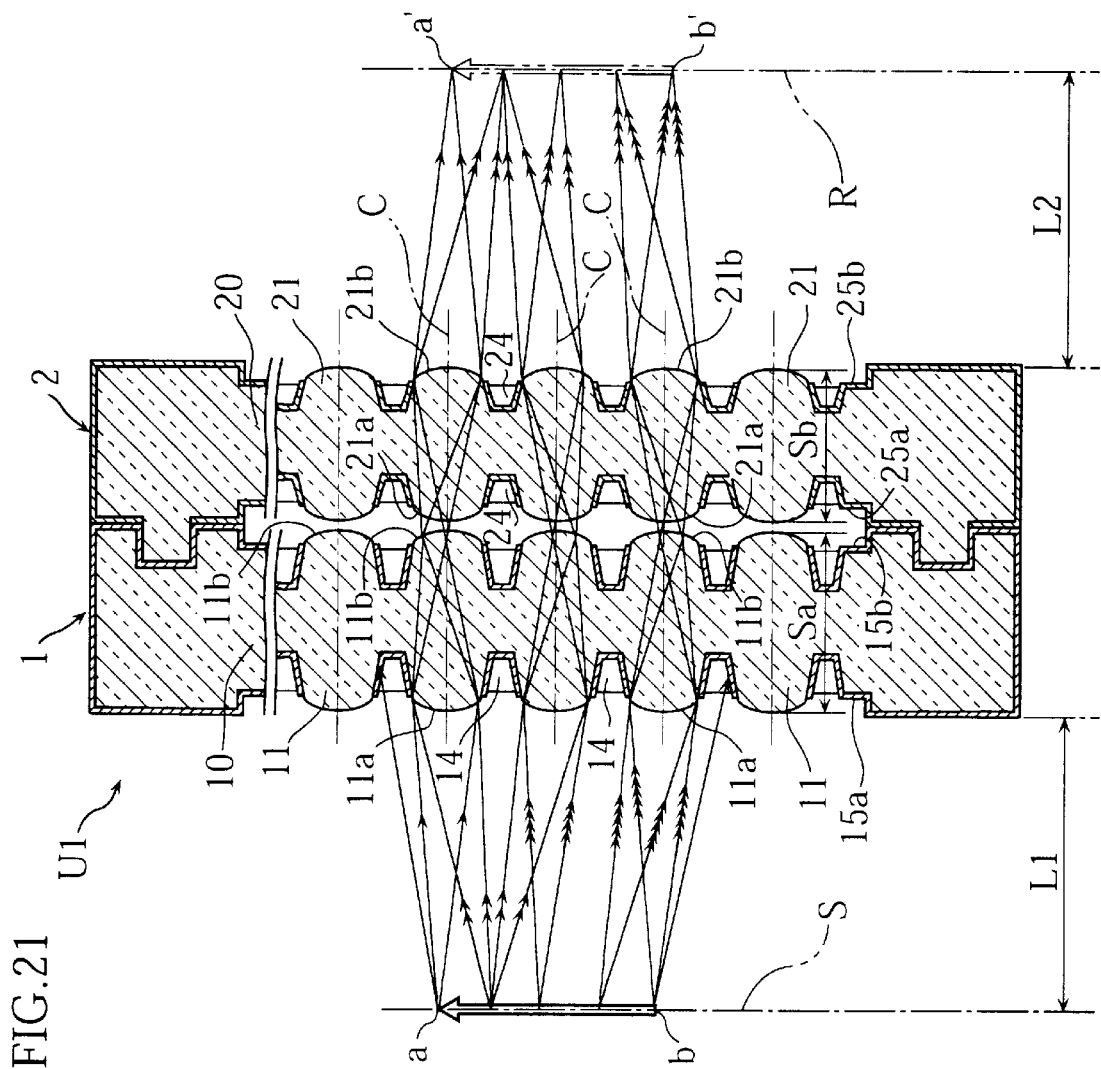
FIG. 21 is a diagram illustrating a function of the lens array unit shown in FIG. 1 through FIG. 4.

As shown in FIG. 21, when using the lens array unit U1, the first lens array 1 is faced to an object (a→b) placed at a starting point S. Light which starts from the starting point S passes each of the first lenses 11, then a corresponding one of the second lenses 21, and reaches an image formation point R. In this process, refraction of the light in passing the first, the second, the third and the fourth surfaces 11a, 11b, 11c, 11d takes generally the same snaky pattern as observed in the prior art selfoc lens. This phenomenon makes it possible to form, at the image formation point R, a non-inverted, non-magnified image (a'→b') of the object (a→b) which is placed on the starting point S. In other words, such a phenomenon can be stated as follows: Specifically, the first lens surface 11a forms an inverted, reduced image of the object. The inverted, reduced image is formed closely to the second lens surface 11b and before the third lens surface 21a. Then, the inverted, reduced image is magnified and inverted by the third and the fourth lens surfaces 21a, 21b, resulting in the non-inverted, non-magnified image created at the image formation point R. Since the first and the second lenses 11, 21 are provided as an array, the non-inverted, non-magnified image (a'→b') of the object is formed in a linear region at the image formation point R.

According to the optical system shown in FIG. 21, light from the starting point S which travels toward the surface 10a of the first support 10 is blocked by the light shielding film 15a. Therefore, an appropriate incidence of light is achieved in that the light which enters the first lens 11 can only make the entrance through the first lens surface 11a. Further, the light shielding film 15a does not allow the light from the starting point S to pass through the first support 10 directly thickness-wise. The light shielding film 15b prevents unnecessary light from coming out of any other place than the second lens surface 11b of the first lens array 1, toward the second lens array 2. The light shields 14 block and absorb light that would otherwise come out of the first lens 11 and enter an adjacent one of the first lens 11. Therefore, the light shields 14 effectively prevent the optical cross talk between the first lenses 11. According to this lens array unit U1, the recesses 14a are provided in each of the two surfaces 10a, 10b of the first support 10. Therefore, even if each recess 14a is made relatively shallow, a sufficient cross-talk prevention can be achieved. If the depth of the recess 14 can be made shallow, when forming the recesses 14 by injection molding for example, the projections formed in the mold correspondingly to the recesses can be given a shorter height. With such an arrangement, it becomes possible to manufacture the mold more easily. Further, by reducing the height of projections, it also becomes possible to let the molten resin flow more smoothly in the cavity of the mold, making it also possible to reduce the rate of defective product in the injection molding of the main body 1a.

The light shielding films 25a, 25b and the light shields 24 of the second lens array 2 play the same roles as the light shielding films 15a, 15b and the light shields 14 described above. Therefore, according to the lens array unit U1, despite the fact that both of the first and the second lens arrays 1, 2 are made of a translucent synthetic resin, it is possible to prevent unnecessary light from reaching the image formation point R, thereby obtaining a clear image.

According to the optical system described above, a distance L1 from the starting point S to the lens array unit U1, and a distance L2 from the lens array unit U1 to the image formation point R are dependent upon the curvature of the convex lens surfaces 11a, 11b, 21a, 21b. Therefore, according to the lens array unit U1, by varying the curvature of lens surfaces (by using a different mold), the distances L1, L2 can be varied arbitrary and easily.

In the lens array unit U1, the lengths Sa, Sb respectively of the first and the second lenses 11, 21 have a relationship expressed as Sa>Sb. This offers advantages, to be described next, not offered by an arrangement in which the lengths of the first and the second lens arrays 11, 21 are equal to each other. To elaborate on this point, reference will now be made to FIG. 22. FIG. 22a is a diagram illustrating a function of the lens array unit U1 as an application of the present invention. FIG. 21b and FIG. 21c are diagrams illustrating functions of Comparative Examples 1 and 2 respectively, with the present invention.

First, according to the Comparative Example 1 shown in FIG. 22, each of the first and the second lenses 11, 21 has a relatively long length Sa. According to such an arrangement, much of the light that enters the second lens 21 reaches a circumferential surface 21e of the second lens 21 (light indicated by reference code Nc). This means that only a small amount of light comes out of the fourth lens surfaces 21b, creating a dark image (a'→b'). On the contrary, according to the arrangement offered by the present embodiment shown in FIG. 22a, the second lens 21 is shorter than in Comparative Example 1, which allows more light that has entered the second lens 21 to reach the fourth lens surface 21b. According to the present embodiment shown in FIG. 22a, it is possible to allow the light as indicated by reference code Nc in FIG. 22c to reach the fourth lens surface 21b, and then let this light reach the image formation point R by the refraction of the fourth lens surface 21b. Therefore, according to the lens array unit U1 offered by the present embodiment, it becomes possible to increase the amount of light that comes out of the fourth lens surface 21b, thereby having a bright image created at the image formation point R.

Next, according to Comparative Example 2 shown in FIG. 22c, each of the first and the second lenses 11, 21 has a relatively short length Sb. According to such an arrangement, an inverted, reduced image (a"→b") of the object (a→b) is formed at a place (indicated by reference code Nd) which is spaced from the first lens surface 11a by a length generally equal to the length Sb. If the distance from the first lens surface 11a to the image formation point Nd of the inverted, reduced image (a"→b") is short, the rate of reduction of the inverted, reduced image is large, making the image substantially small. Thus, in order to increase the image back to the non-magnified state, the third and the fourth lens surfaces 21a, 21b must offer a large rate of magnification. In such an optical system, in which an inverted, reduced image reduced at a large reduction rate is magnified at a large magnification rate, even a very small distortion on the surfaces of any of the first and second lenses 11, 21 can blur the resulting image (a→b) formed at the image formation point. On the contrary, according to the present embodiment shown in FIG. 22a, an inverted, reduced image (a"→b") of the object (a→b) is formed at a place (indicated by reference code Ne) which is spaced from the first lens surface 11a by a length generally equal to the length Sa. In other words, the distance from the first lens surface 11a to the image formation point of the inverted, reduced image is longer than in Comparative Example 2 shown in FIG. 22c. Therefore, according to the present embodiment, the rate of reduction of the inverted, reduced image (a"→b") is small, and accordingly, the rate of magnification offered by the third and the fourth lens surfaces 21a, 21b can be small. As exemplified, according to the present embodiment, it is possible to achieve an optical system in which an inverted, reduced image reduced at a small reduction rate is magnified at a small magnification rate. For this reason, according to the lens array unit U1 offered by the present embodiment, it becomes possible as compared with Comparative Example 2 in FIG. 22c, to better protect visibility of the image (a'→b') from adverse effect of lens surface distortion of the first and the second lens surfaces 11, 21, making it more desirable in obtaining a clear image.

Figure 23:
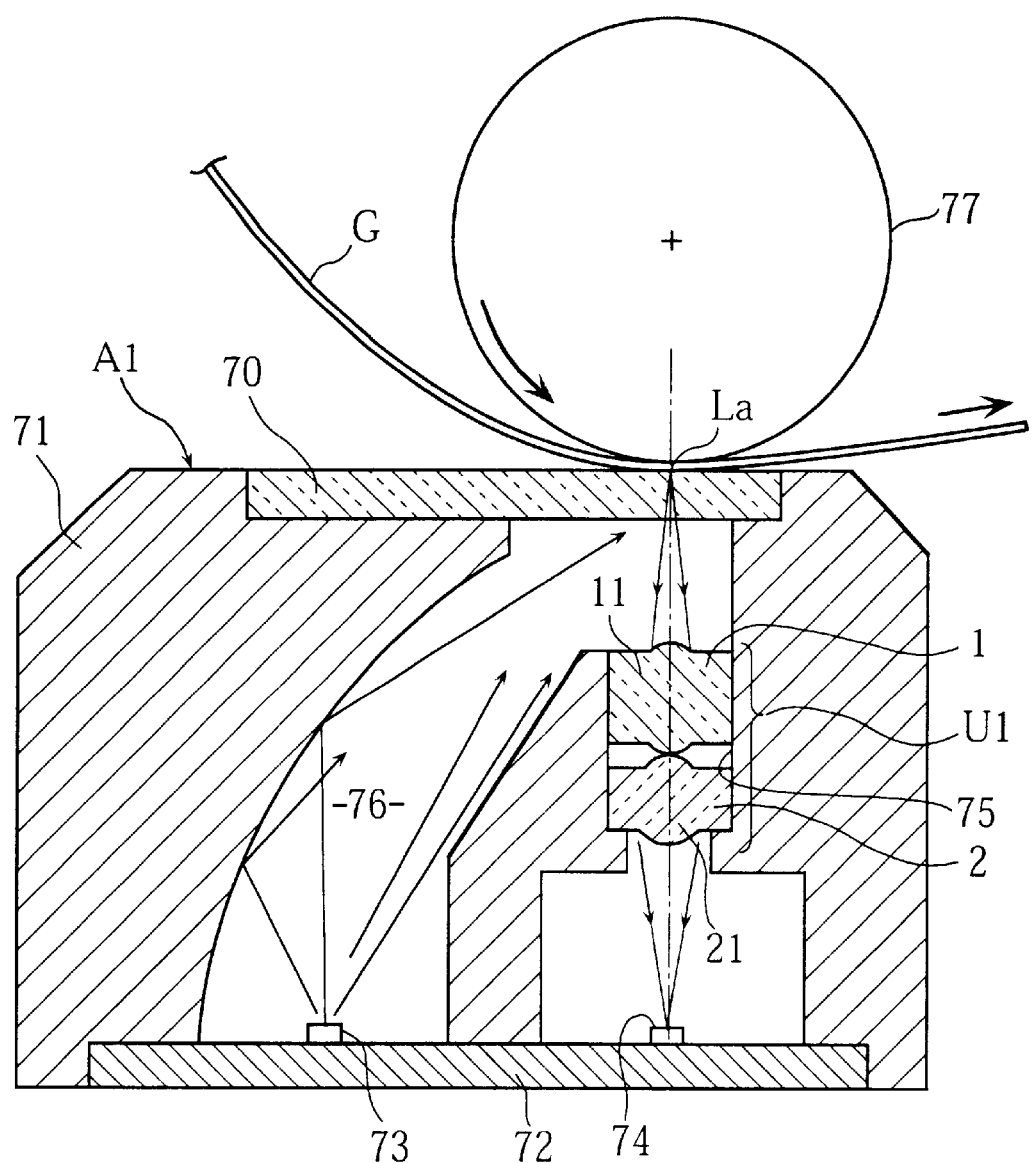
FIG. 23 is a sectional view of a first embodiment of the optical device according to the present invention.

FIG. 23 shows an optical device that utilizes the lens array unit U1 described above.

The optical device A1 shown in the figure includes a transparent plate 70, a case 71 having an upper portion that supports the transparent plate 70, and a substrate 72 assembled to a bottom of the case 71. The substrate 72 has a surface mounted with a plurality of light sources 73 disposed in a row in a main scanning direction (a direction perpendicular to a document surface) at an interval, and a plurality of light receiving elements 74 mounted in the same direction as in the light sources 73. Each of the light sources 73 is provided by a light emitting diode for example. Each of the light receiving elements 74 has a photoelectric transfer capability of outputting a signal (image signal) upon reception of light, at an output level corresponding to an amount of light received.

The lens array unit U1 is disposed between the transparent plate 70 and the light receiving elements 74. The lens array unit U1 is fitted into a groove 75 provided in the case 71, with the arrays of the first and the second lenses 11, 21 extending in the main scanning direction. The transparent plate 70 has a surface including a linear, image-reading region La which is a region faced by the first lenses 11. Light emitted from each of the light sources 73 travels through an illuminating light path 76 and illuminates the image reading region La. On the image reading region La, a platen roller 77 for transporting a document G is provided.

According to the optical device A1, the light emitted from each of the light sources 73 is introduced to the image reading region La, and illuminates the document G. The light, reflected by the document G travels toward the lens array unit U1. Then, due to the function described with reference to FIG. 21, a non-inverted, non-magnified image of a line of the document G at the image reading region La is formed on the light receiving elements 74. In response, the light receiving elements 74 output an image signal corresponding to an image in the line of the document G. Such a reading process is repeated for a plurality of times while the document G is transported by the platen roller 77 in a sub-scanning direction. The optical device A1 does not utilize the prior art selfoc lens array as the image forming means of the document, but utilizes the lens array unit U1 which can be manufactured at a lower cost. Therefore, the optical device A1 can also be manufactured at a lower cost.

Figure 24:
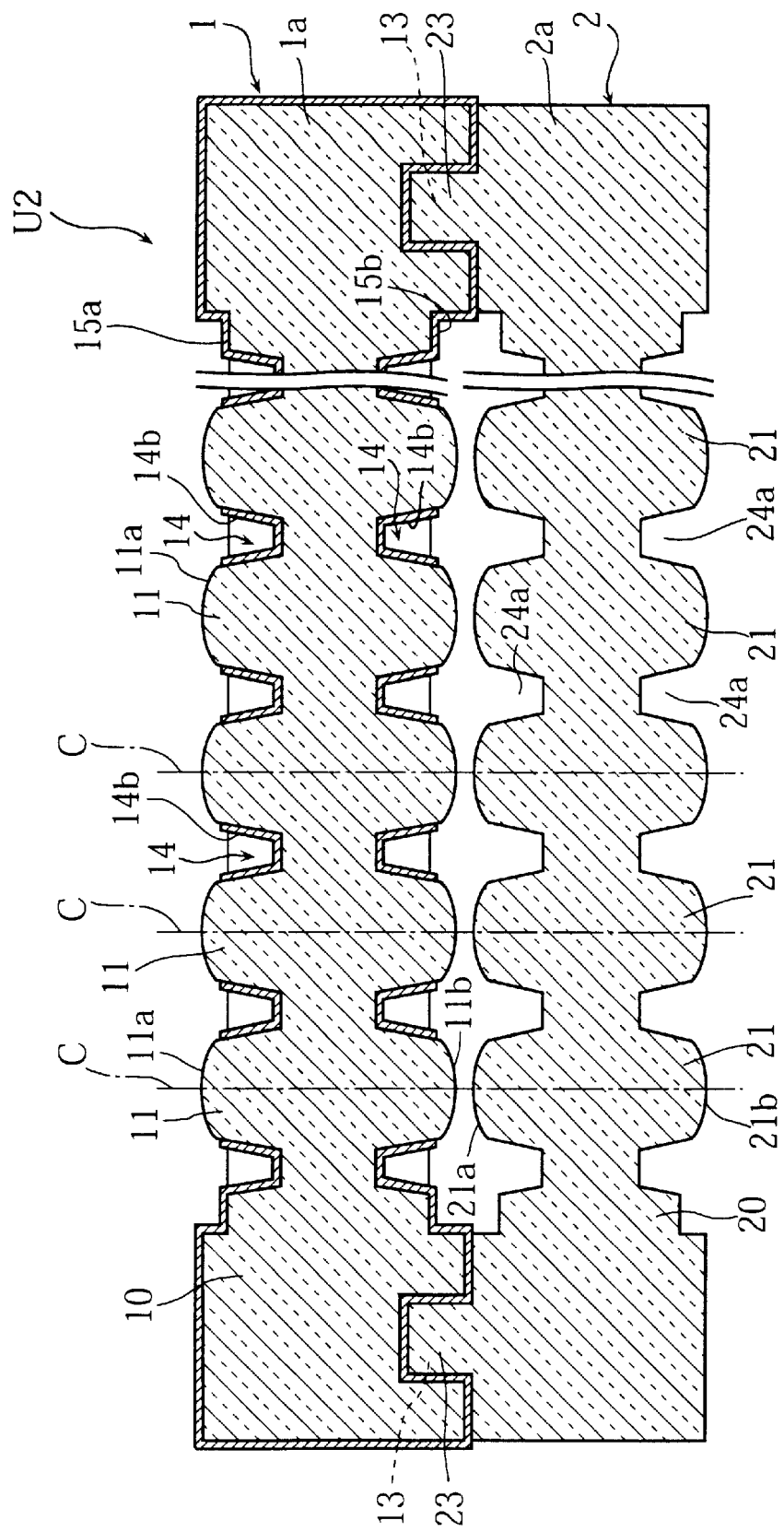
FIG. 24 is a sectional view of a second embodiment of the lens array unit according to the present invention.

FIG. 24 shows a second embodiment of the lens array unit according to the present invention.

A lens array unit U2 according to the present embodiment has its second lens array 2 not provided with the black coating. In other words, there is no means corresponding to the coating 14b and the light shielding films 15a, 15 (or the coating 24b and the light shielding films 25a, 25 of the second lens array 2 in the first embodiment).

According to this lens array unit U2, by appropriately setting the depth of each recess 14a of the first lens array 1, it becomes possible to prevent the optical cross talk between the second lenses 21, in addition to between the first lenses 11. This is possible because the light which can cause the optical cross talk between the second lenses 21 can be blocked in advance by the light shields 14 and the light shielding films 15a, 15b of the first lens array 1. According to this lens array unit U2, the coating step can be eliminated in the manufacturing process of the second lens array 2. Therefore, manufacturing cost can be further reduced. The second lens array 2 is formed with a plurality of recesses 24a. Alternatively however, according to the present invention, the second lens array 2 may not be provided with these recesses 24a. With such an arrangement, the shape of the second lens array 2 can be simplified, and the manufacture can be made easier.

Figure 25:
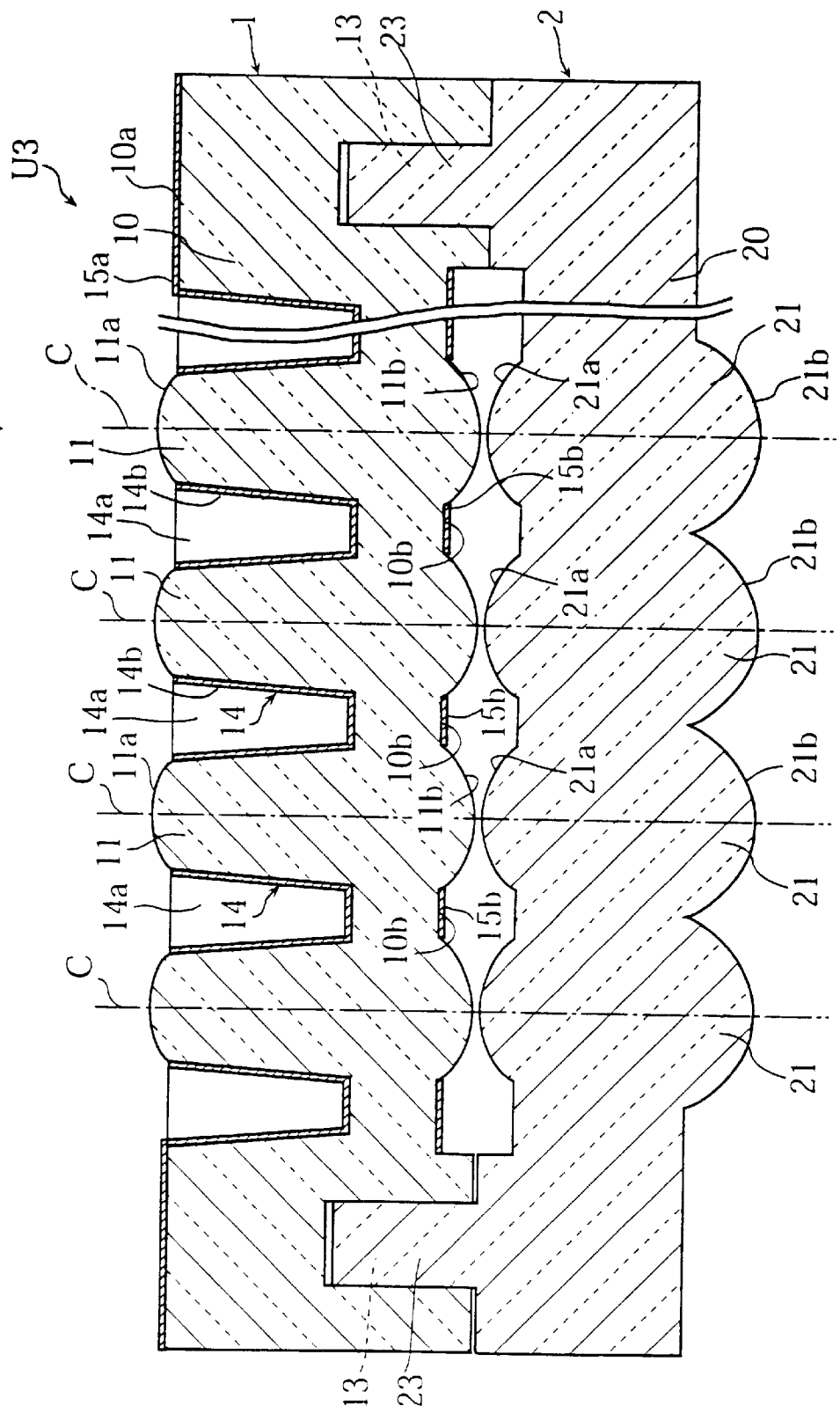
FIG. 25 is a sectional view of a third embodiment of the lens array unit according to the present invention.
Figure 26:
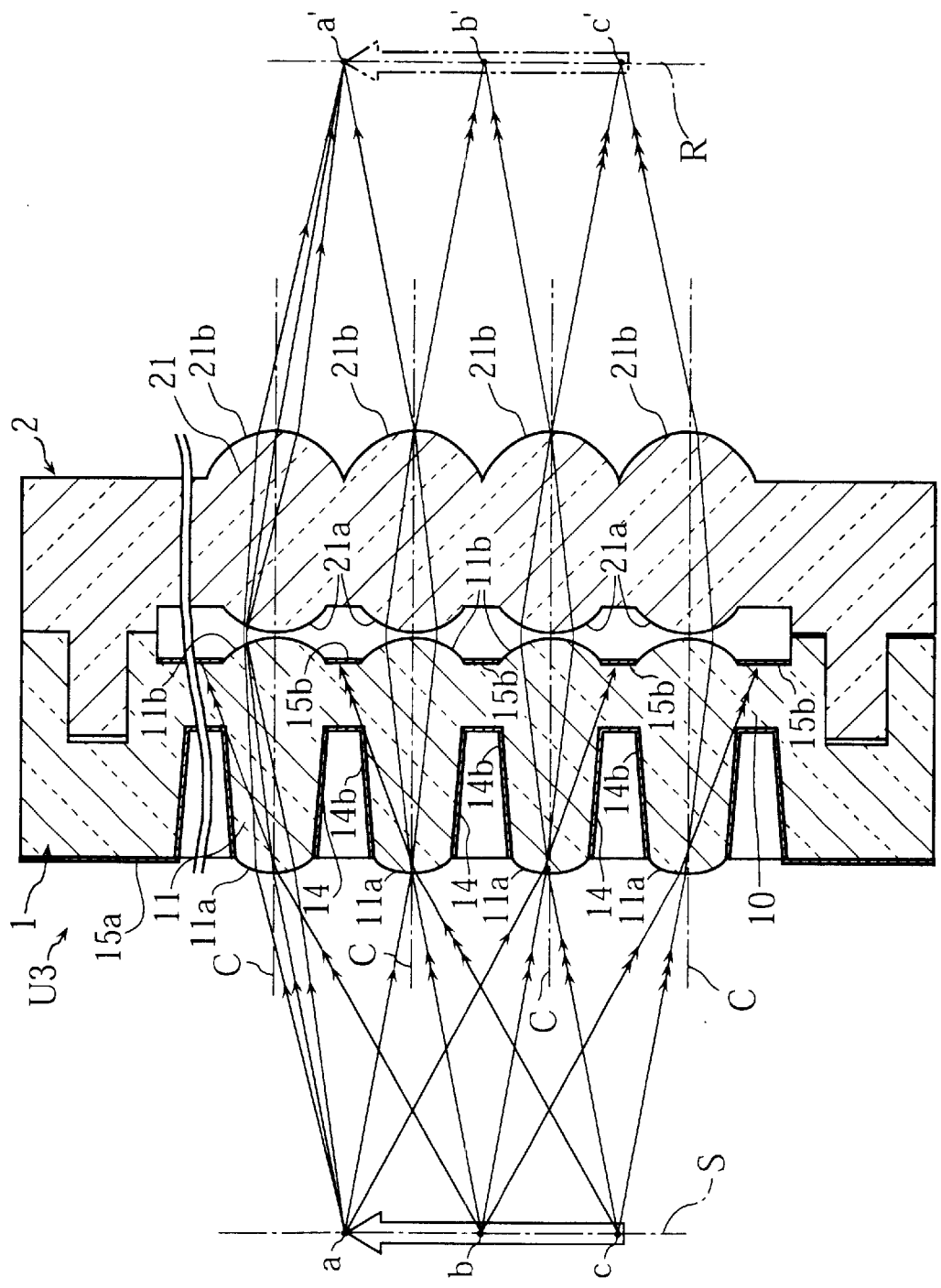
FIG. 26 is a diagram illustrating a function of the lens array unit shown in FIG. 25.

FIG. 25 and FIG. 26 show a third embodiment of the lens array unit according to the present invention.

In a lens array unit U3 according to the present embodiment, the recesses 14a are provided only in the surface 10a of the first support 10. Further, according to this lens array unit U3, the second lens surface 11b has a larger diameter than the first lens surface 11a. The third lens surface 21a has the same or greater diameter than the second lens surface 11b. The fourth lens surface 21b has its circumferential edge abutting on the circumferential edge of the adjacent one, and with this arrangement, the fourth lens surface 21b has a greater diameter than the third lens surface 21a. With these arrangements described above, the second lens 21 has, in essence, greater diameter than the first lens 11.

According to the lens array unit U3 again, as shown in FIG. 26, it is possible to form a non-inverted, non-magnified image (a'→b'→c') at the image formation point R, of an object (a→b→c) which is placed at the starting point S. The recesses 14a are formed only in one surface 10a of the support 10. However, by forming these recesses 14a deeper than the recesses 14a of the lens array units U1, U2 according to the first and the second embodiments, the optical cross talk between the first lenses 11 and between the second lenses 21 can be appropriately prevented. If the recesses 14a may only be formed in the surface 10a of the first support 10, a total number of the recesses 14a can be smaller than in the case where the recesses 14a are formed in each of the two surfaces 10a, 10b. Therefore, the number of machine operations can be reduced if the recesses 14a are formed by machining or by laser processing, making it possible to facilitate the manufacture of the lens array unit and to reduce time necessary for the manufacture.

Further, according to the lens array unit U3, the second lens 21, which is placed behind the first lens 11 which receives the light first, has a larger diameter. This allows more of the light which enters the first lens 11 to reach the fourth lens surface 21b. Thus, a greater amount of light comes out of the fourth lens surface 21b and then reaches the image formation point R, making bright the non-inverted, non magnified image (a'→b'→c')

In particular, according to the present embodiment, the second and the third lens surfaces 11b, 21a has a larger diameter than the first lens surface 11a, and further, the fourth lens surface 21b has an even larger diameter. This arrangement can allow much of the light that entered the first lens surface 11a to reach the fourth lens surface 21b. Alternatively however, according to the present invention, the following arrangement for example may be made. Specifically, the first and the second lens surfaces 11a, 11b have a same diameter, the third and the fourth lens surfaces 21a, 21b have a same diameter, and the diameter of the third and the fourth lens surfaces 21a, 21b is larger than that of the first and the second lens surfaces 11a, 11b. With such an arrangement too, the amount of light that comes out of the fourth lens surface 21b can be increased, thereby making the resulting image bright.

Figure 27:
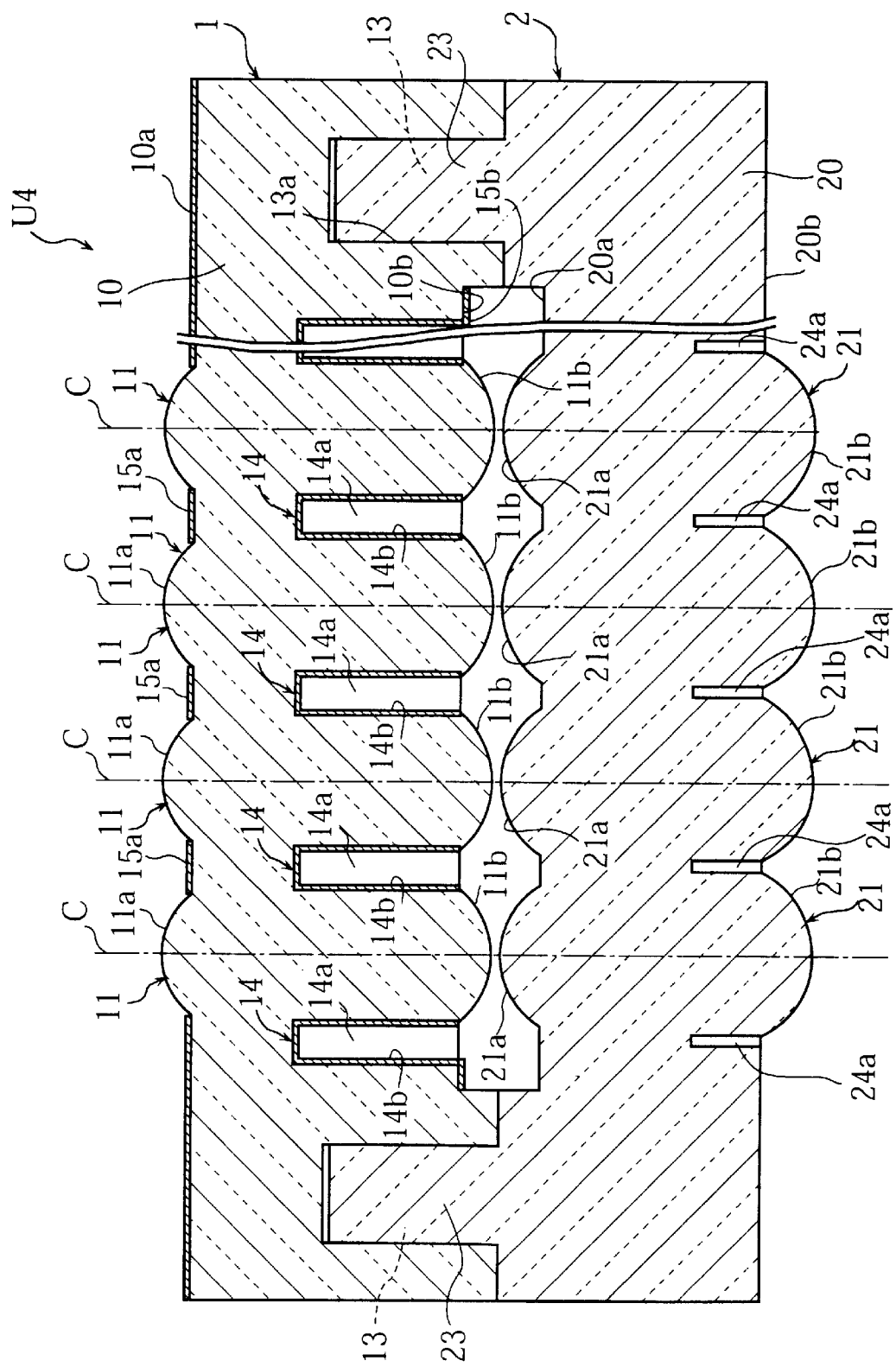
FIG. 27 is a sectional view of a fourth embodiment of the lens array unit according to the present invention.
Figure 28:
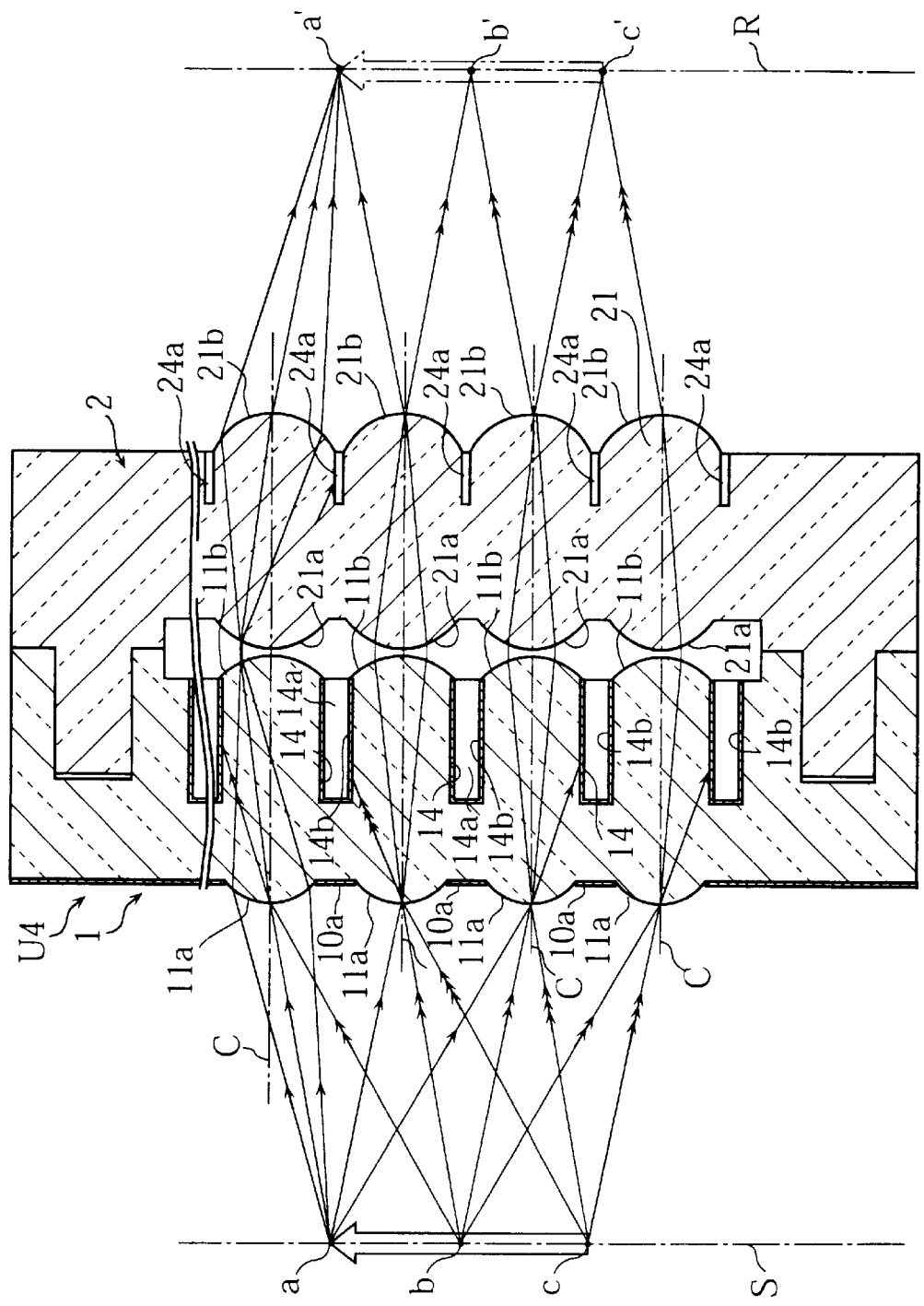
FIG. 28 is a diagram illustrating a function of the lens array unit shown in FIG. 27.
Figure 29:
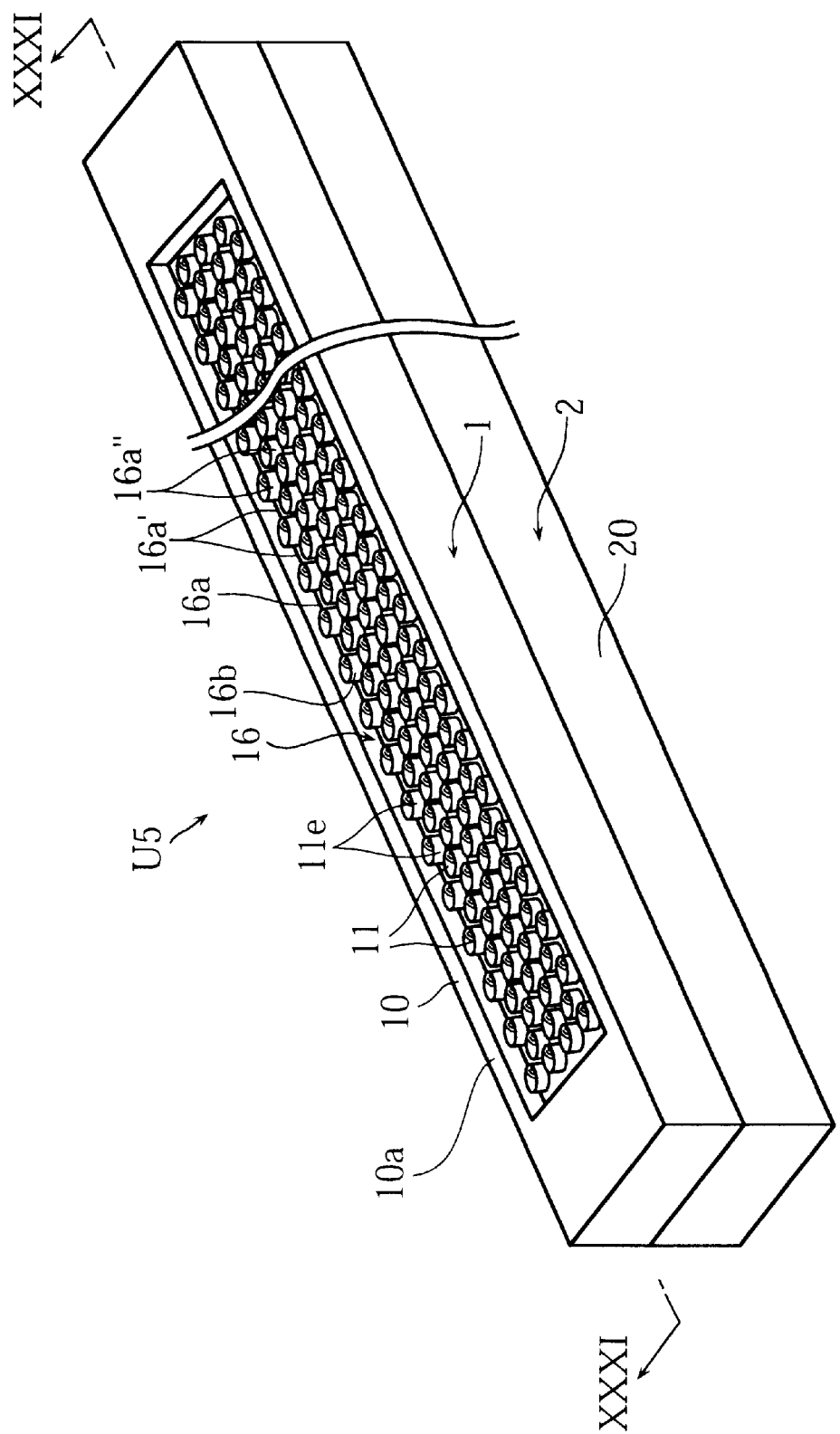
FIG. 29 is a perspective view of a fifth embodiment of the lens array unit according to the present invention.

FIG. 27 and FIG. 28 show a fourth embodiment of the lens array unit according to the present invention.

According to a lens array unit U4 offered by the present embodiment, the recesses 14a in the first lens array 1 is provided only in the surface 10b of the first support 10. The first, the second, the third, and the fourth lens surfaces 11a, 11b, 21a, 21b have their respective sizes in the same relationship as in the lens array unit U3 according to the third embodiment, with the fourth lens surface 21b having the largest diameter. A difference however, is that each of the fourth lens surface 21b does not contact with another, but is separated by the recesses 24a formed in the surface 20b of the second support 20. Each of the recesses 24a has a width of not greater than 0.2 mm, and can be formed by laser beam machining for example. Preferably, surfaces defining the recesses 24a are applied with a black coating. However, even without the black coating, it is still possible to have the surfaces defining the recesses 24a totally reflect the incident light, thereby preventing the optical cross talk between the lenses. This also applies to the recesses 14a, 24a in each of the embodiment described earlier.

As shown in FIG. 28, according to the lens array unit U4 again, by appropriately setting the depth of each recess 14a, it becomes possible to effectively eliminate or reduce the optical cross talk between the first lenses 11 and between the second lenses 21. Although the second support 20 is formed with the recesses 24a, since the recesses 24a are very narrow, it is possible to dispose the fourth lens surfaces closely at a very narrow interval. Therefore, it is possible to let a large amount of light come out of the fourth lens surface 21b. In addition, the recesses 24a effectively reduce the optical cross talk between the second lenses 21 when the light finally comes out of the lens array unit U4, and at the same time, prevents unnecessary light from coming out of the gap between the second lenses 21 toward the image formation point R. Therefore, it is possible to form a bright and clear non-inverted, non-magnified image at the image formation point R.

FIG. 29 through FIG. 33 show a fifth embodiment of the lens array unit according to the present invention.

According to a lens array unit U5 offered by the present embodiment, each plurality of the first and the second lenses 11, 21 are disposed in a plurality of rows. More specifically, as clearly shown in FIG. 32a, the first lenses 11 are disposed in a plurality of rows, i.e. in the first row $N_1$ through the seventh row $N_7$ each extending longitudinally of the first support 10. Of these rows $N_1$ through $N_7$, a row of an odd number and a row of an even number are offset each other by half a pitch. This arrangement allows the rows of the first lenses 11 to be disposed as close together as possible without interfering each other perpendicularly to the direction of rows.

Figure 30:
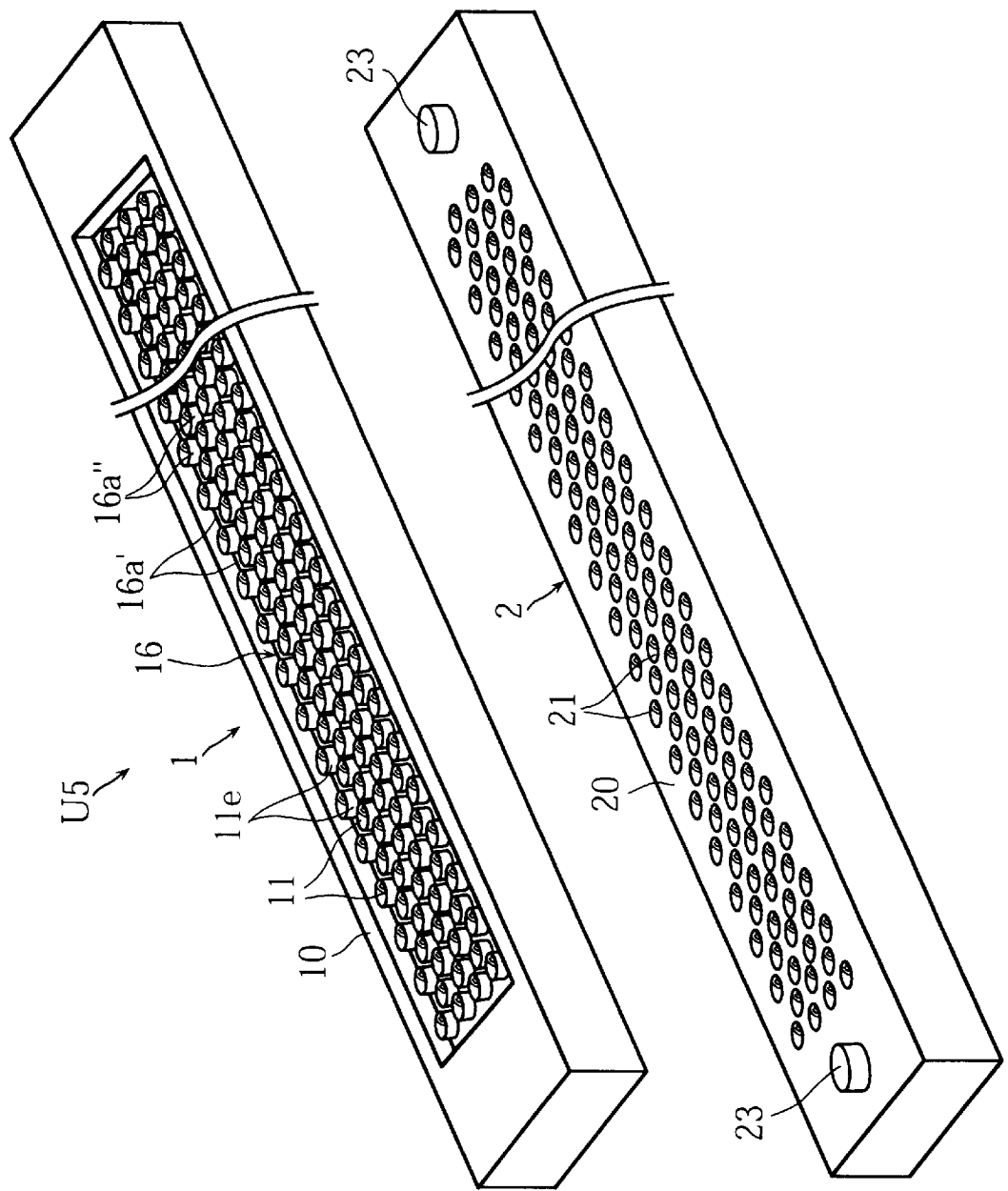
FIG. 30 is an exploded perspective view of the lens array unit shown in FIG. 29.
Figure 31:
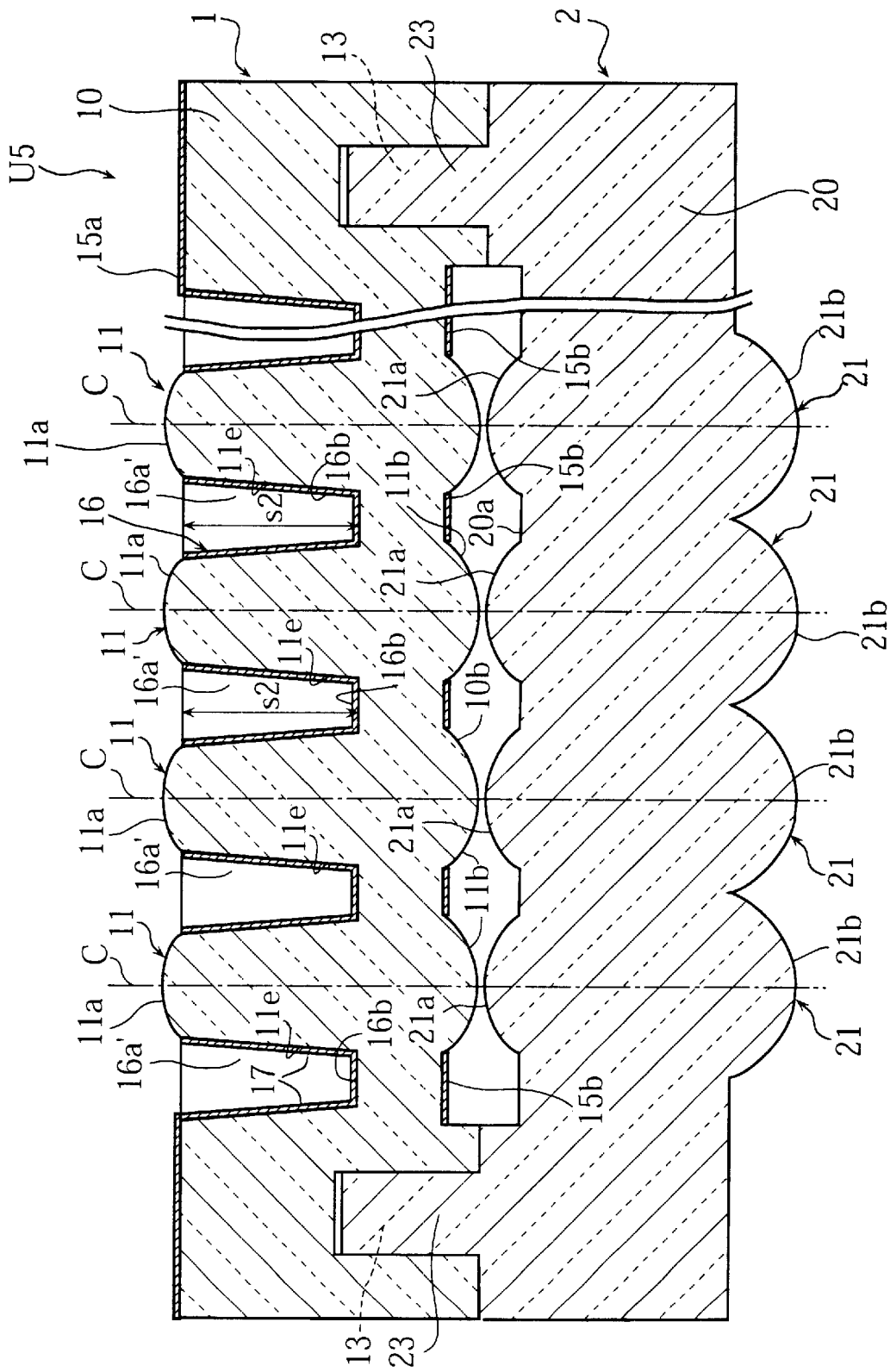
FIG. 31 is a sectional view taken in lines XXXI—XXXI in FIG. 29.
Figure 32A:
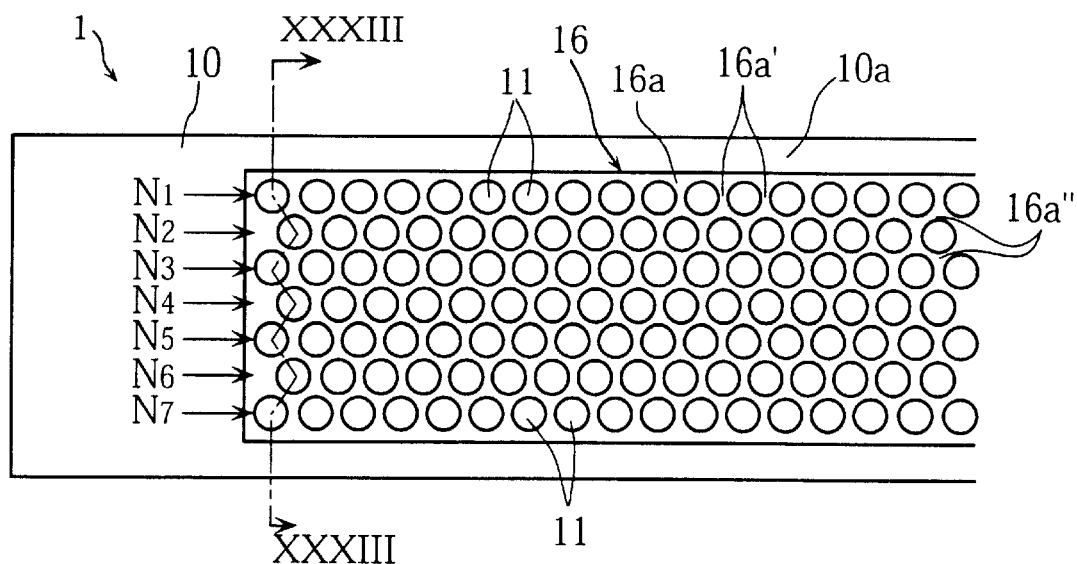
FIG. 32a and FIG. 32b are plan views showing a principal portion of the lens array unit shown in FIG. 29.
Figure 32B:
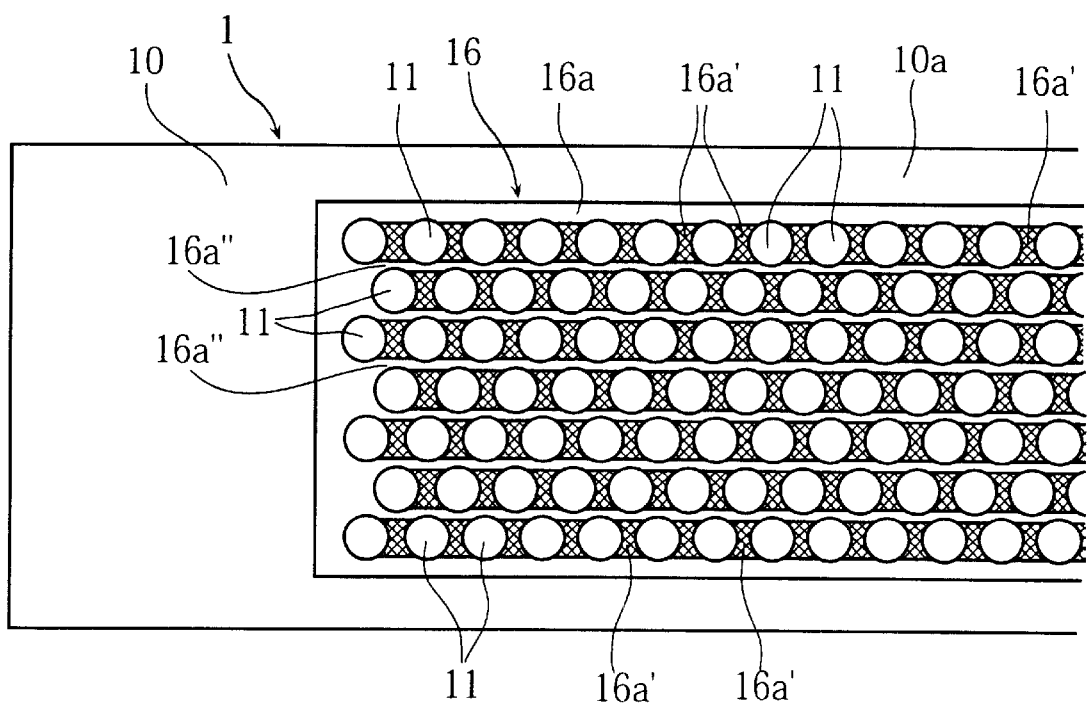
Figure 33:
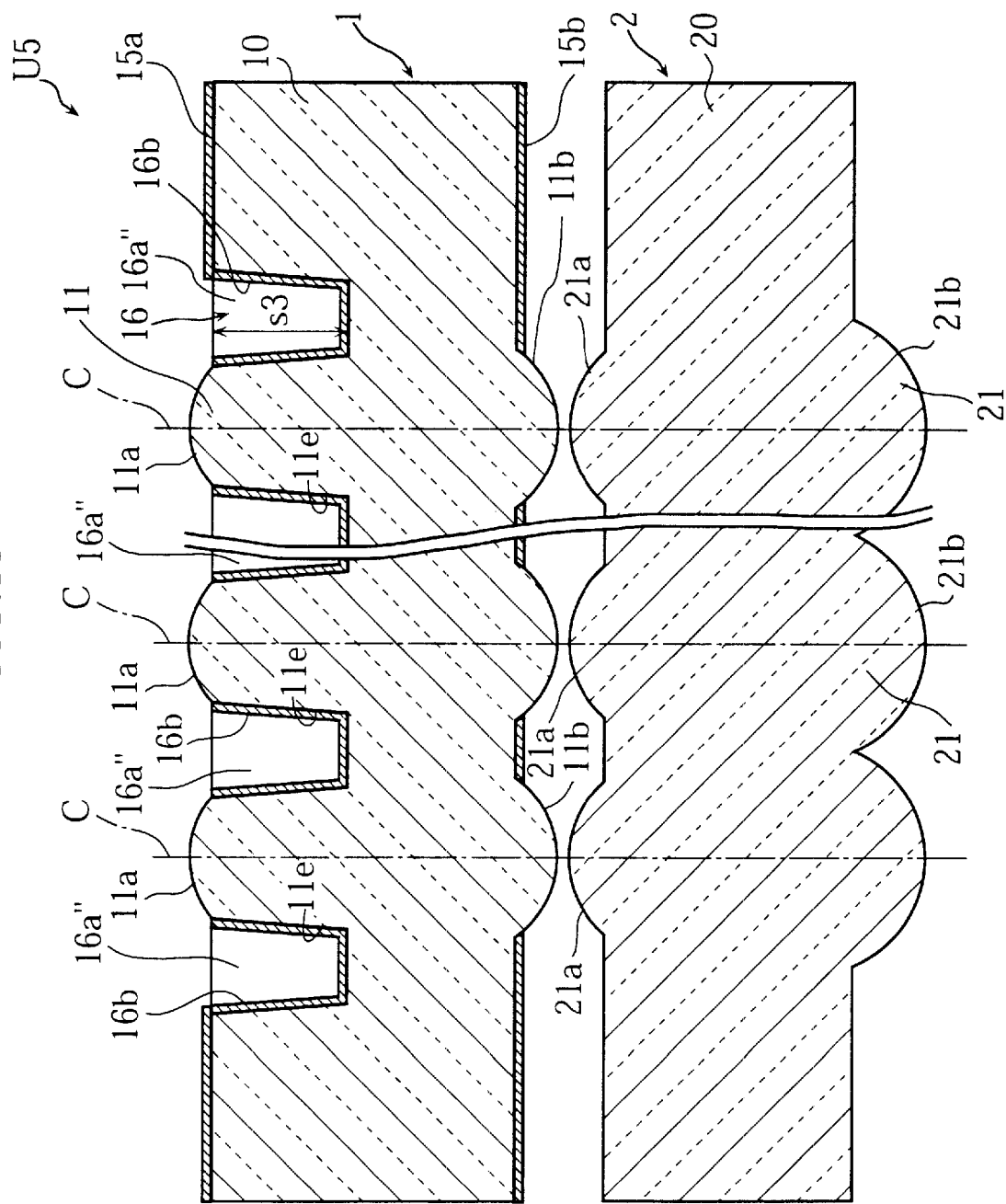

As clearly shown in FIG. 30, the second lenses 21 are disposed in the same way as the first lenses 11.

A light shield 16 is provided in the surface 10a of the first support of the first lens array 1. The light shield 16 includes a recess 16a and a black coating 16b which covers a surface that defines the recess 16a. The recess 16a can be roughly classified into a first recesses 16a' and second recesses 16". A crosshatched region in FIG. 32b corresponds to the first recesses 16a'. Each of the first recesses 16a' is located between a pair of first lenses 11 mutually adjacent in the longitudinal direction of the first support 10. On the other hand, the second recesses 16a" fill widthwise spaces among mutually adjacent first lenses 11 in the first support 10. These first and second recesses 16a', 16a" are connected together into the recess 16a, and enclose the first lenses entirely. Therefore, as clearly shown in FIG. 29 and FIG. 30, each of the first lenses 11 has an outer circumferential surface 11e rising from the bottom surface of the recess 16a.

The first and the second recesses 16a', 16a" have different depths respectively. More specifically, the first recess 16a' has a depth s2 as shown in a sectional view in FIG. 31, which is deeper than the second recess 16a" which has a depth s3 shown in a sectional view in FIG. 33. The recess 16a having such a structural feature can be formed easily by primary and secondary laser processing as follows: In the primary laser processing, a mask having the same pattern as the overall pattern of the recess 16a is used. The laser beam is applied, in the mask pattern projected at a reduced scale on the first support 10. This operation yields a predefined pattern of a recessed region of a predetermined depth surrounding the first lenses 11 (a recess as a prototype of the recess 16a). Then, in the secondary laser process, a mask different from the above described is used, and the laser beam is applied only to regions to become the first recesses 16a', giving more depth to these regions. By these operations, the recess 16a, which includes the first and the second recesses 16a', 16a" differing from each other in the depth, can be formed.

The coating 16b is provided to cover the bottom surface of the recess 16a, and the outer circumferential surface 11e of each first lens 11. The second lens array 2 is not provided with means corresponding to the light shield 16 in the first lens array 1.

Figure 34:
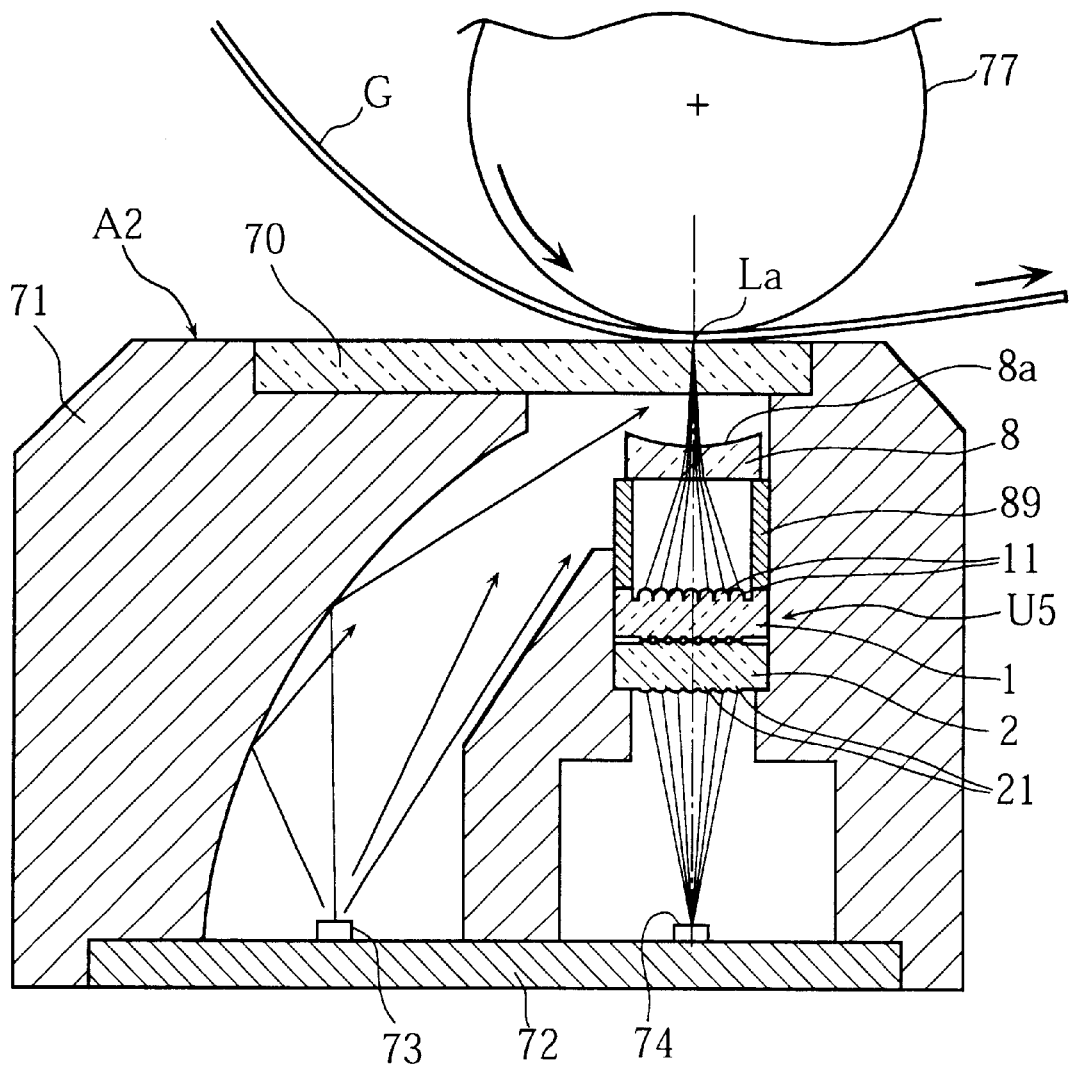
FIG. 34 is a sectional view of a second embodiment of the optical device according to the present invention.

FIG. 34 shows an example of an optical device which utilizes the lens array unit U5. This optical device A2 is essentially the same as the optical device A1 shown in FIG. 23, differing from the optical device A1 however in that the optical device A2 uses the lens array unit U5 as the image forming means, and a divergent lens 8.

The divergent lens 8 is made for example of PMMA or PC, into a long, plate-like shape extending longitudinally of the first and the second lens arrays 1, 2 of the lens array unit U5. However, the divergent lens 8 has its one or both surfaces formed with a concave surface 8a having a constant curvature longitudinally of the divergent lens 8. The divergent lens 8 is supported by a supporting member 89 disposed for example on the first lens array 1, thereby placed between the image reading region La and the lens array unit U5. The divergent lens 8 has a center axis which is aligned with a center axis of the fourth row $N_4$ of the first lenses 11.

Next, function of the optical device A2 will be described.

According to the optical device A2, when light is emitted from the light sources 73 to the image reading region La, the light reflected by the document G travels through the divergent lens 8 and then to the lens array unit U5. Then, the light passes each of the seven rows of the first and the second lenses 11, 21 arranged widthwise of the first and the second lens arrays 1, 2, then focuses on the light receiving elements 74, forming images of the document G overlapped on the light receiving elements 74. Therefore, the image formed on the light receiving elements 74 is brighter than in the case that uses a lens array unit provided with only one row of the first and the second lenses 11, 21. However, when seven sets of rows of the first and the second lenses 11, 21 are used as for the image formation as in the above case, the angle of incidence at which the light enters the first lens surface 11a is different in each of the seven rows. For this reason, if all of the lens surfaces in the first and the second lenses 11, 21, are shaped identically, it is sometimes difficult to accurately focus the light from the image reading region onto the light receiving elements 74. Therefore, in order to solve such a problem, for example, the shape of the first, the second, the third and the fourth lens surfaces 11a, 11b, 21a, 21b, may be differed for each of the first row $N_1$ through the seventh row $N_7$.

Figure 35:
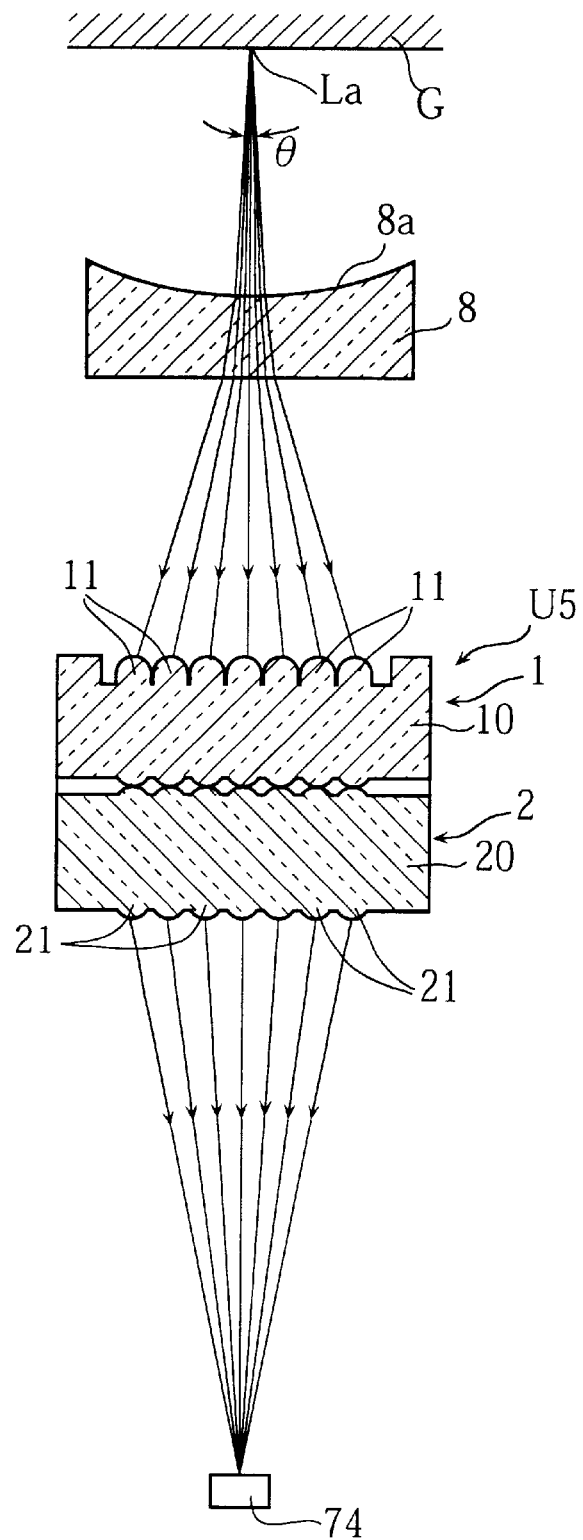
FIG. 35 is a diagram illustrating a function of the optical device shown in FIG. 34.

As clearly shown in FIG. 35, the light which starts from the image reading region La is diverged by the divergent lens 8 at an appropriate angle before reaching the lens array unit U5. Therefore, flux of the light focused on the light receiving elements 74 by the lens array unit U5 has a narrow divergent angle θ between the image reading region La and the divergent lens 8. As a result, the lens array unit U5 has a greater depth of focus, providing such an advantage that the image formed on the light receiving elements 74 is not easily brought out of focus even if the document G happens to be raised, for example, on the transparent plate 70.

The divergent lens 8 does not diverge the light in the longitudinal direction of the first and the second lens arrays 1, 2 (the direction perpendicular to the section shown in FIG. 34 and FIG. 35). Therefore, a non-inverted, non-magnified image of the document G can be formed in the longitudinal direction of the first and the second lens arrays 1, 2, following the same principle that works in each of the lens array units U1 through U4 described earlier.

When the document image is formed by the lens array unit U5, optical cross talk between the first lenses 11 is appropriately prevented by the coating 16a of the light shield 16. Especially, the light shield 16 prevents not only the optical cross talk between longitudinally adjacent first lenses 11 of the first lens array 1, but also the optical cross talk between mutually adjacent pairs of the first row $N_1$ through the seventh row $N_7$. Further, the light shield 16 also prevents the optical cross talk between the second lenses 21 of the second lens array 2. Therefore, a clear image of the document G can be formed on the light receiving elements 74, and a high quality read image can be obtained.

According to the recess 16a as part of the light shield 16 of the lens array unit U5, the first recess 16a' has the depth s2 which is deeper than the depth s3 of the second recess 16a". With this arrangement, the first recess 16a' tends to block a greater amount of light than the second recess 16a". Thus, an image produced on the light receiving element 74 by a pair of the first and the second lenses 11, 21 that share a same optical axis is shorter in the longitudinal direction of the first and the second lens arrays 1, 2 and longer in the direction perpendicular thereto. Such an arrangement offers an advantage in forming a clearly focused image in the longitudinal direction of the first and the second lens arrays 1, 2. On the other hand, in the widthwise direction of the first and the second lens arrays 1, 2 shown in FIG. 34 and FIG. 35, it becomes possible to increase the amount of light that reaches the light receiving elements 74, thereby forming a bright image. As a result, achieving two conflicting goals, i.e. clarity in focus and brightness of the image can be facilitated further.

Figure 36:
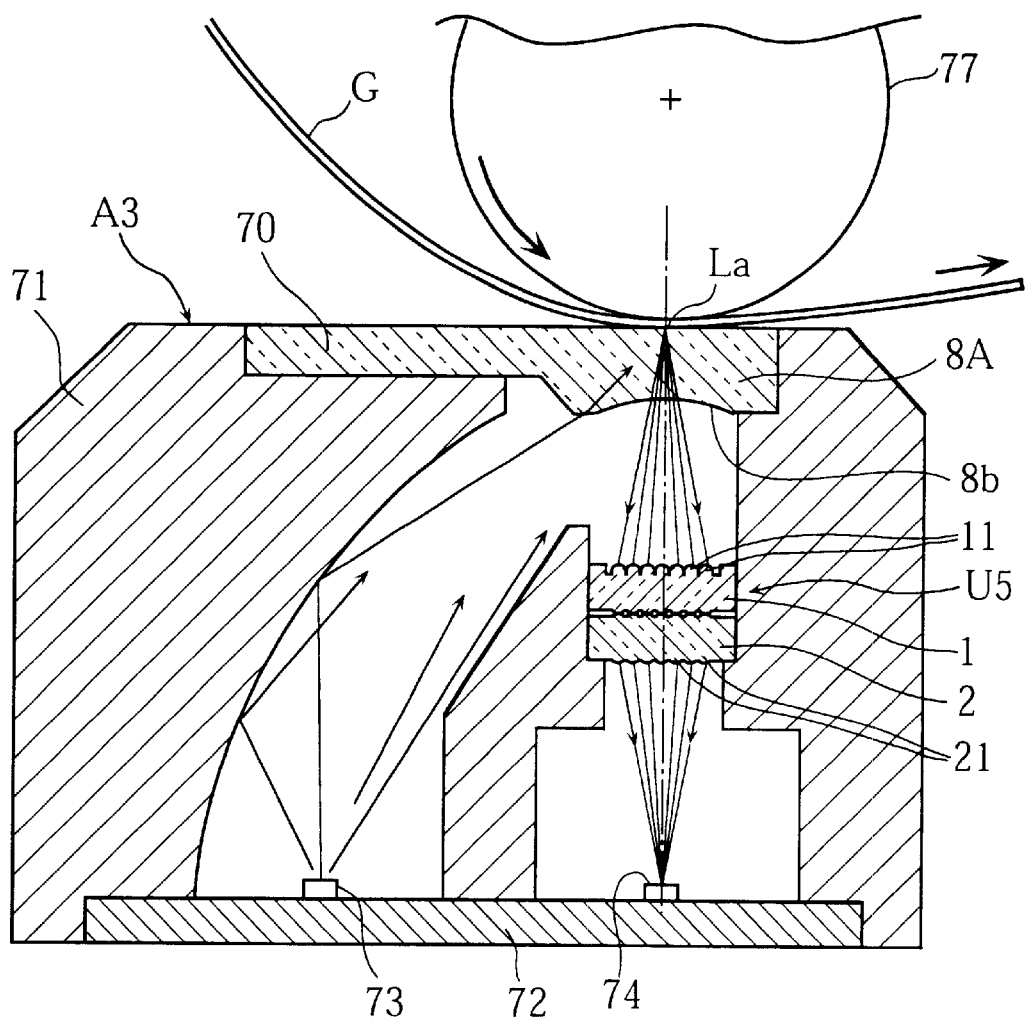
FIG. 36 is a sectional view of a third embodiment of the optical device according to the present invention.
Figure 37:
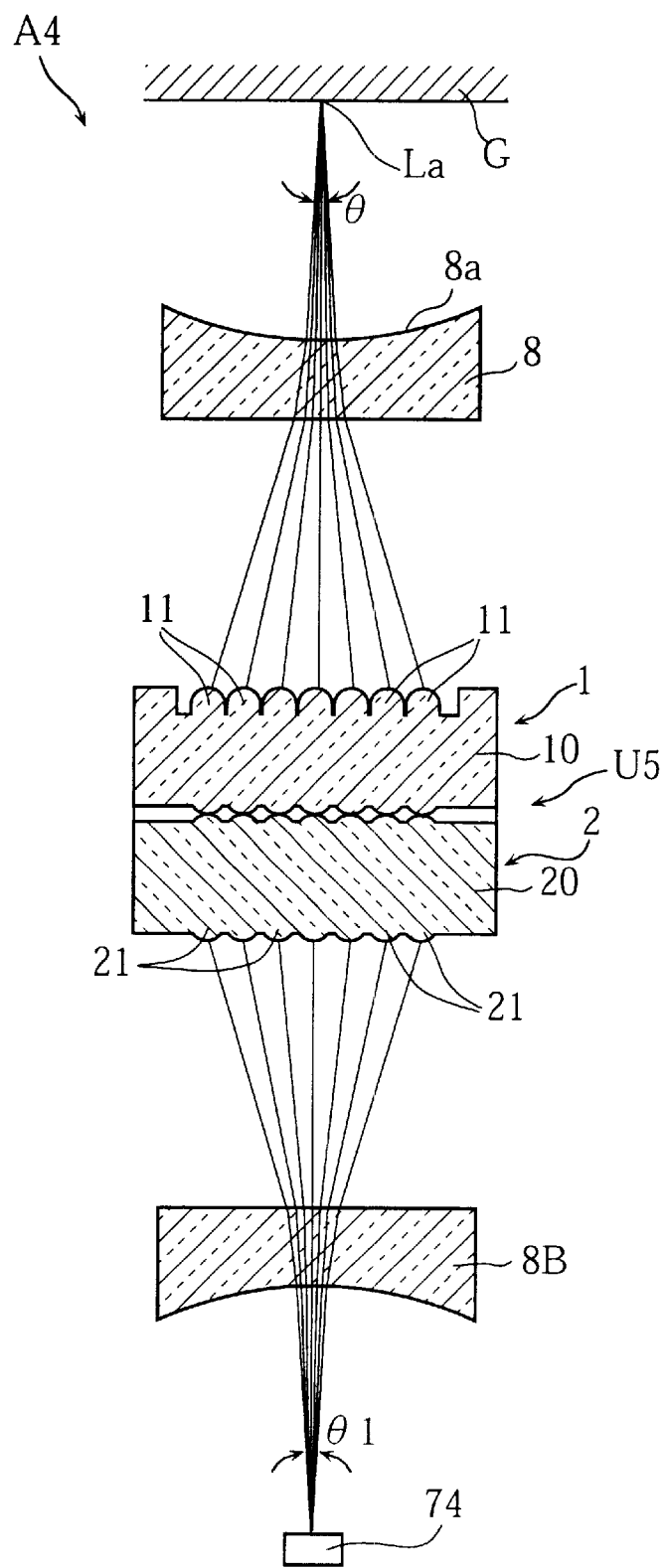
FIG. 37 is a diagram showing a fourth embodiment of the optical device according to the present invention.

FIG. 36 and FIG. 37 show a third and the fourth embodiments respectively of the optical device according to the present invention.

An optical device A3 shown in FIG. 36 has part of the transparent plate 70 formed as the divergent lens 8A. More specifically, the transparent plate 70 has a back surface (lower surface) formed with a concave surface 8b, and this region formed with the concave surface 8b provides the divergent lens 8A facing the lens array unit U5. According to such an arrangement, it becomes possible to reduce the total number of parts necessary for the optical device A3 than that of the optical device A2. According to an optical device A4 shown in FIG. 37 (Note that the figure only shows a principal portion.), in addition to the divergent lens 8 provided between the image reading region La and the lens array unit U5, another divergent lens 8B is provided between the lens array unit U5 and the light receiving elements 74. According to such an arrangement, the light that comes out of the lens array unit U5 toward the light receiving elements 74 can also be diverged by the divergent lens 8B in the widthwise direction of the first and the second lens arrays 1, 2, making it possible to narrow the divergent angle θ 1 as viewed from the light receiving elements 74. Therefore, according to the optical device A4, even if there is a distance error between the lens array unit U5 and the light receiving elements 74, it is still possible to form a clearly focused image. As exemplified, the present invention may take whichever of the arrangements, i.e. a case in which a divergent lens is used only at one location, and the other case in which two divergent lenses are disposed in two locations respectively.

Figure 38:
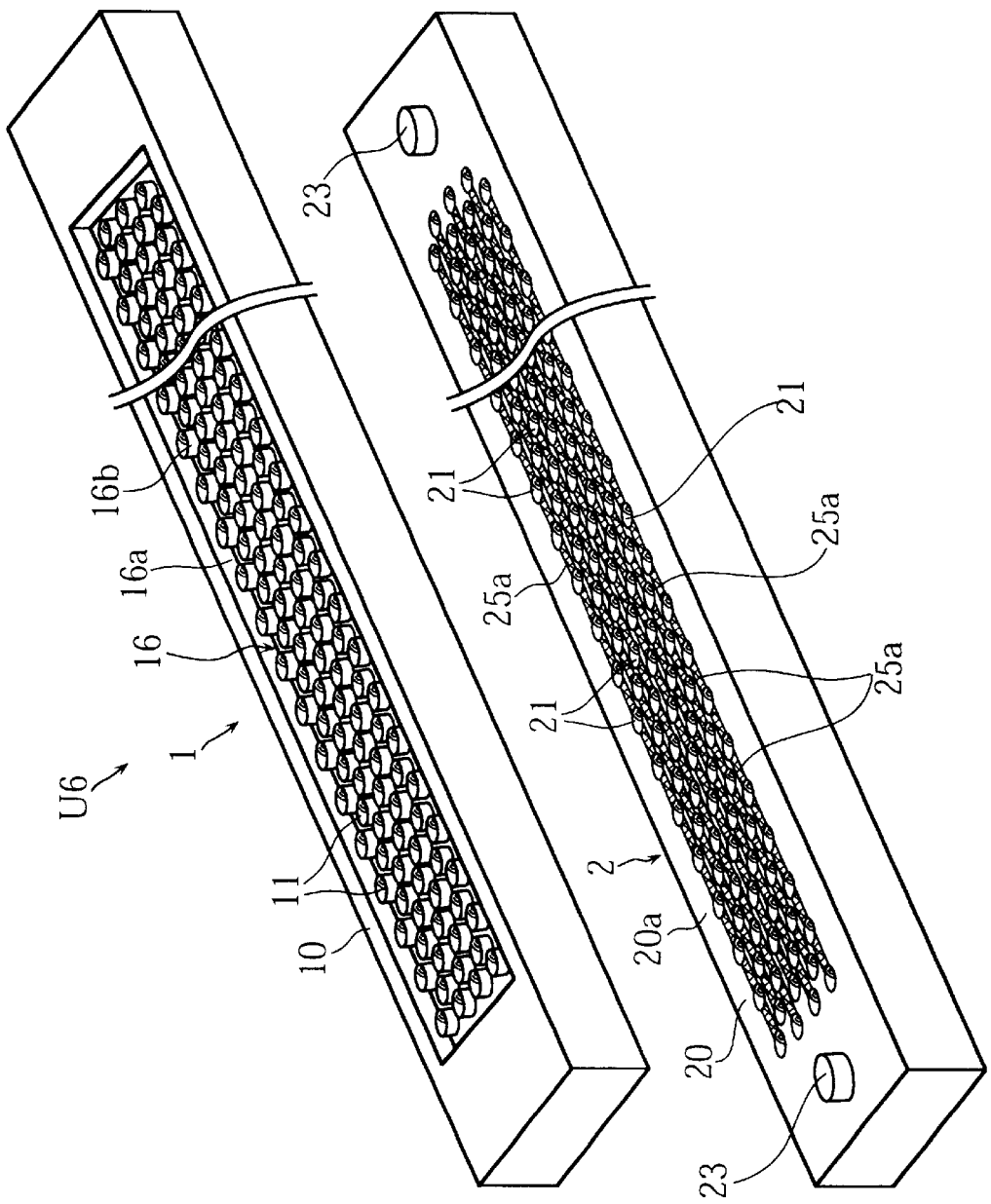
FIG. 38 is an exploded perspective view of a sixth embodiment of the lens array unit according to the present invention.

FIG. 38 shows a sixth embodiment of the lens array unit according to the present invention.

A lens array unit U6 according to the present embodiment differs from the lens array unit U5 according to the fifth embodiment, in that the recess 16a which provide the light shield 16 have a uniform depth, and that the second lens array 2 is provided with light shielding films 25a. The light shielding films 25a are formed by applying a black coating on the surface 20a of the second support 20, and are limited to regions crosshatched in the figure, or only in the regions between second lenses 21 adjacent longitudinally of the second support 20.

According to the lens array unit U6, the light shield films 25a can block light that has passed the first lens 11, traveled toward the second lens 21 and reached between two second lenses 21 which are mutually adjacent longitudinally of the first and the second lens arrays 1, 2. On the other hand, no light shielding films 25a are provided between the second lenses 21 which are mutually adjacent widthwise of the first and the second lens arrays 1, 2. Thus, light that has reached this particular region keeps traveling into the second lens array 2. Therefore, according to such an arrangement, again, an image produced by the first and the second lenses 11, 21 is shorter in the longitudinal direction of the first and the second lens arrays 1, 2 and longer in the direction perpendicular thereto. As a result, as achieved in the lens array unit U5 according to the fifth embodiment, it becomes possible to form a clearly focused image in the longitudinal direction of the first and the second lens arrays 1, 2, and at the same time, it becomes possible to increase the amount of light in the crossing direction, thereby forming a clear and bright image.

Figure 39:
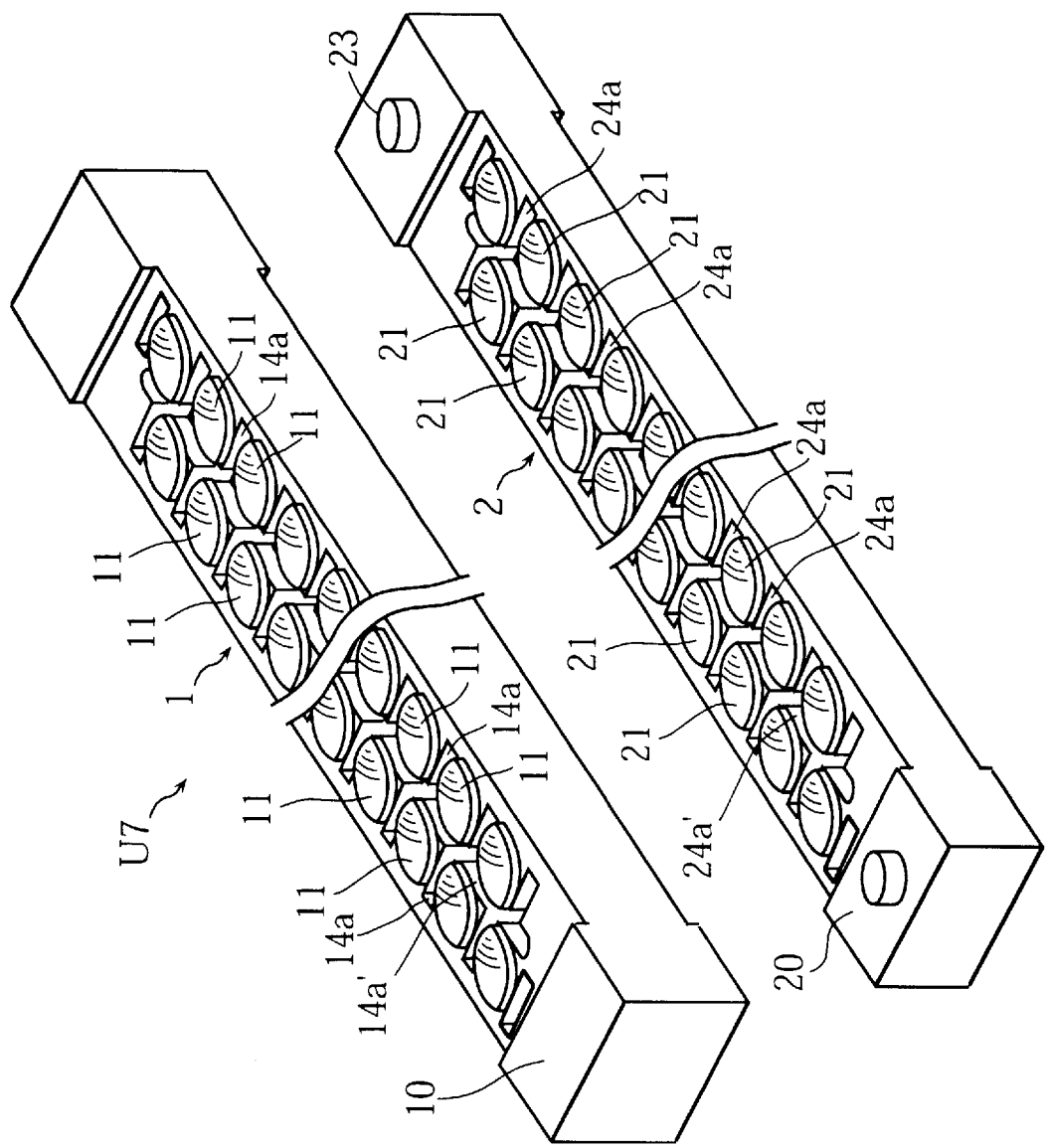
FIG. 39 is an exploded perspective view of a seventh embodiment of the lens array unit according to the present invention.

FIG. 39 shows a seventh embodiment of the lens array unit according to the present invention. A lens array unit U7 according to the present embodiment comprises the first and the second lenses 11, 21 each disposed in two rows. The first lens array 1 is provided with first recesses 14a for separating first lenses 11 adjacent longitudinally of the first support 10, and second recesses 14a' for separating two adjacent first lenses 11 widthwise of the first support 10. Surfaces defining these recesses are covered by a black coating (not illustrated). Likewise, the second lens array 2 is provided with first and second recesses 24a, 24a' for separating the second lenses 21, and these recesses are covered by a black coating (not illustrated).

According to the lens array unit U7, because of the two rows of the first and the second lenses 11, 21, as achieved in the lens array units U5 and U6 according to the fifth and the sixth embodiments, it is possible to form a brighter image than in the case in which only a single row of the first and the second lenses is provided. As understood from the present embodiment, there is no limitation in the number of rows when the first and the second lenses 11, 21 are provided in a plurality of rows, according to the present invention. Greater the number of rows of the lenses, brighter can be the non-inverted, non-magnified image. As understood from the shape of the recesses 14a, 14a' shown in FIG. 39, according to the present invention, the recesses 14a, 14a' that provide the light shield can be formed as grooves, even in the case where the first and the second lenses 11, 21 are provided in a plurality of rows. In other words, the recesses 14a, 14a' can be made not like the recess 16a in the lens array unit U5 according to the fifth embodiment which enclose the first lenses 11 entirely.

Figure 40:
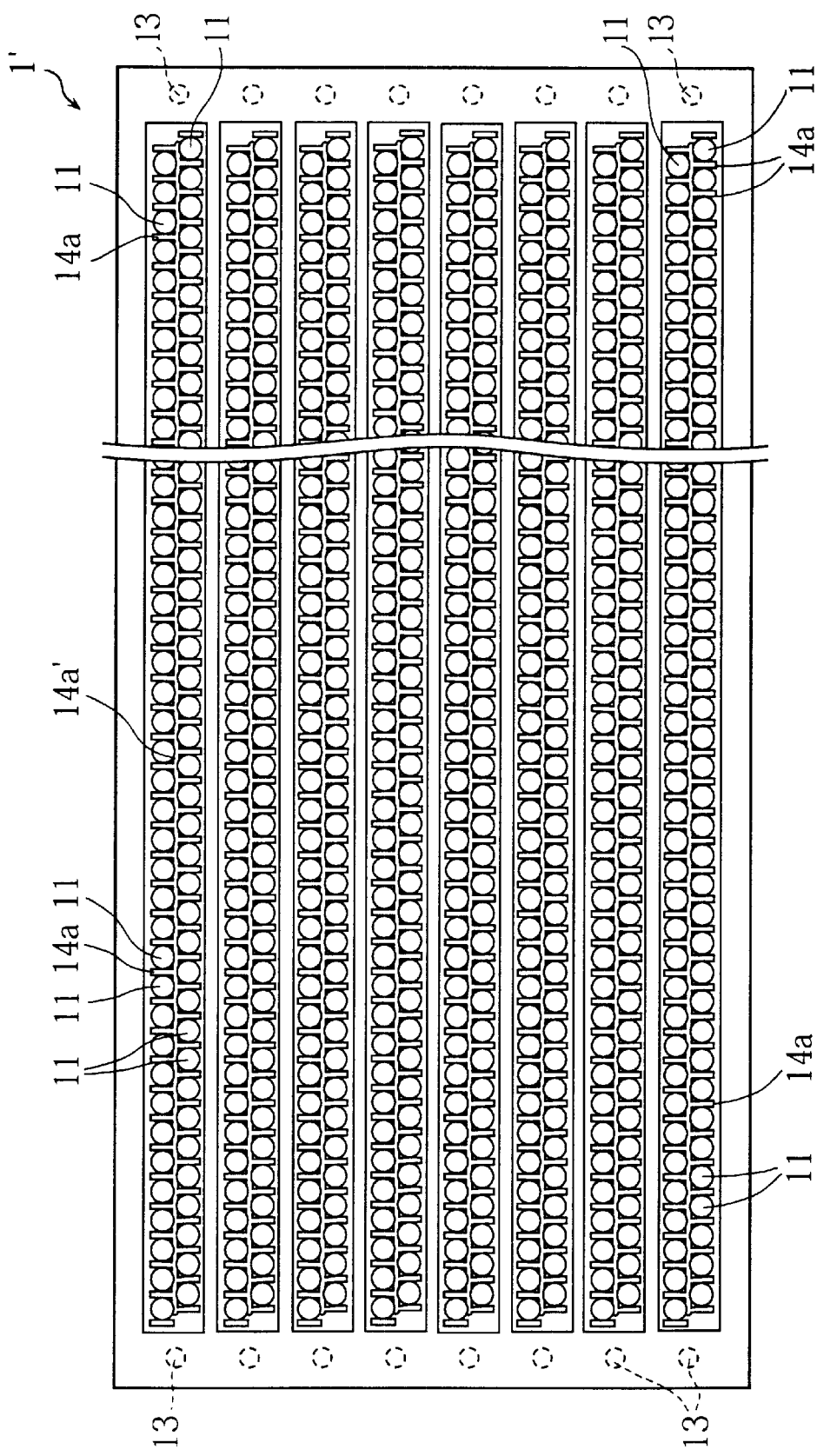
FIG. 40 is a plan view of a resin component block used in manufacture of the lens array unit shown in FIG. 39.
Figure 41:
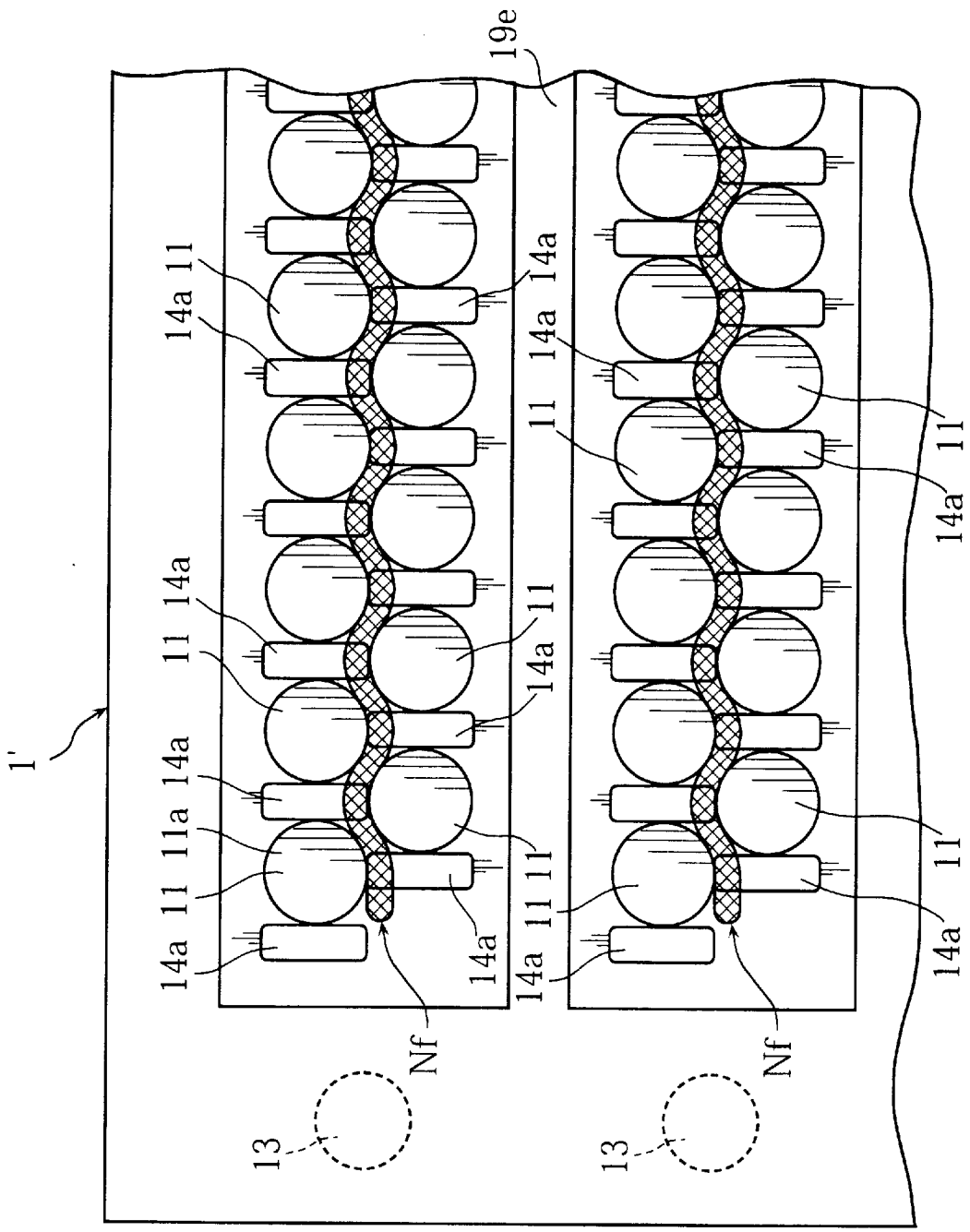
FIG. 41 is a plan view showing a principal portion, illustrating an example step of forming recesses in the resin component blocks.

Even if the first and the second lenses 11, 21 are provided in a plurality of rows, the first and the second lenses 11, 21 can be manufactured by essentially the same method as has been described earlier. Specifically, when manufacturing the first lens array which includes two rows of the first lenses 11, a resin component block 1' shown in FIG. 40 for example, may be formed and then the resin component block 1' may be divided into a plurality of the first lens arrays 1. In this case, the first recesses 14a may be formed when the resin component block 1' is formed, and the second recesses 14a' may be formed thereafter. More specifically, as shown in FIG. 41, after forming the resin component block 1' which is provided with the first recesses 14a, crosshatched regions in the figure, indicated by reference numeral Nf if formed by mechanical or laser processing, whereby the second recesses 14a' can be provided appropriately. In this case, it is easy to give the first and the second recesses 14a, 14a' different depth from each other.

FIG. 42 through FIG. 46 show an eighth embodiment of the lens array unit according to the present invention.

Figure 42:
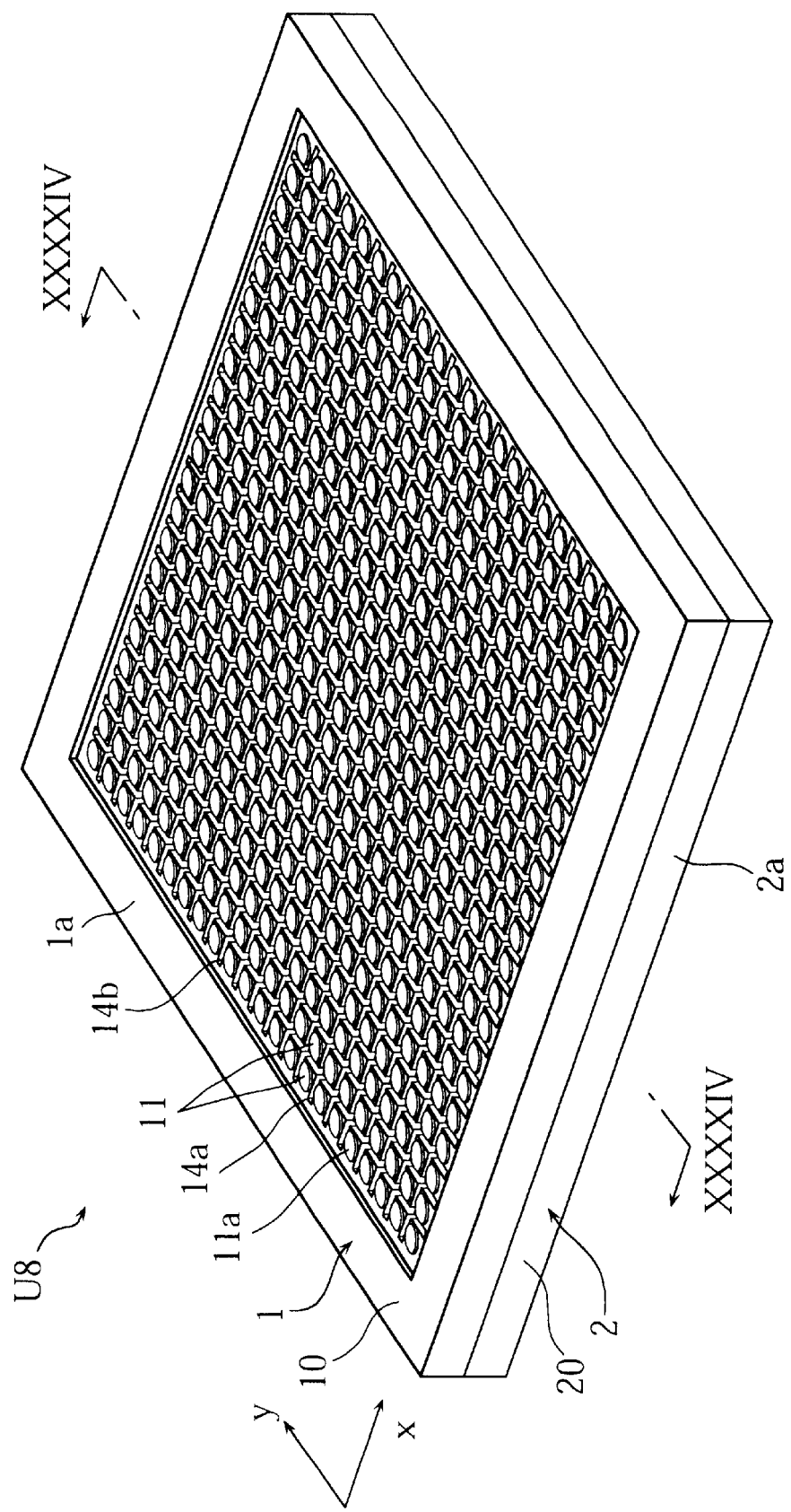
FIG. 42 is a perspective view of an eighth embodiment of the lens array unit according to the present invention.
Figure 43:
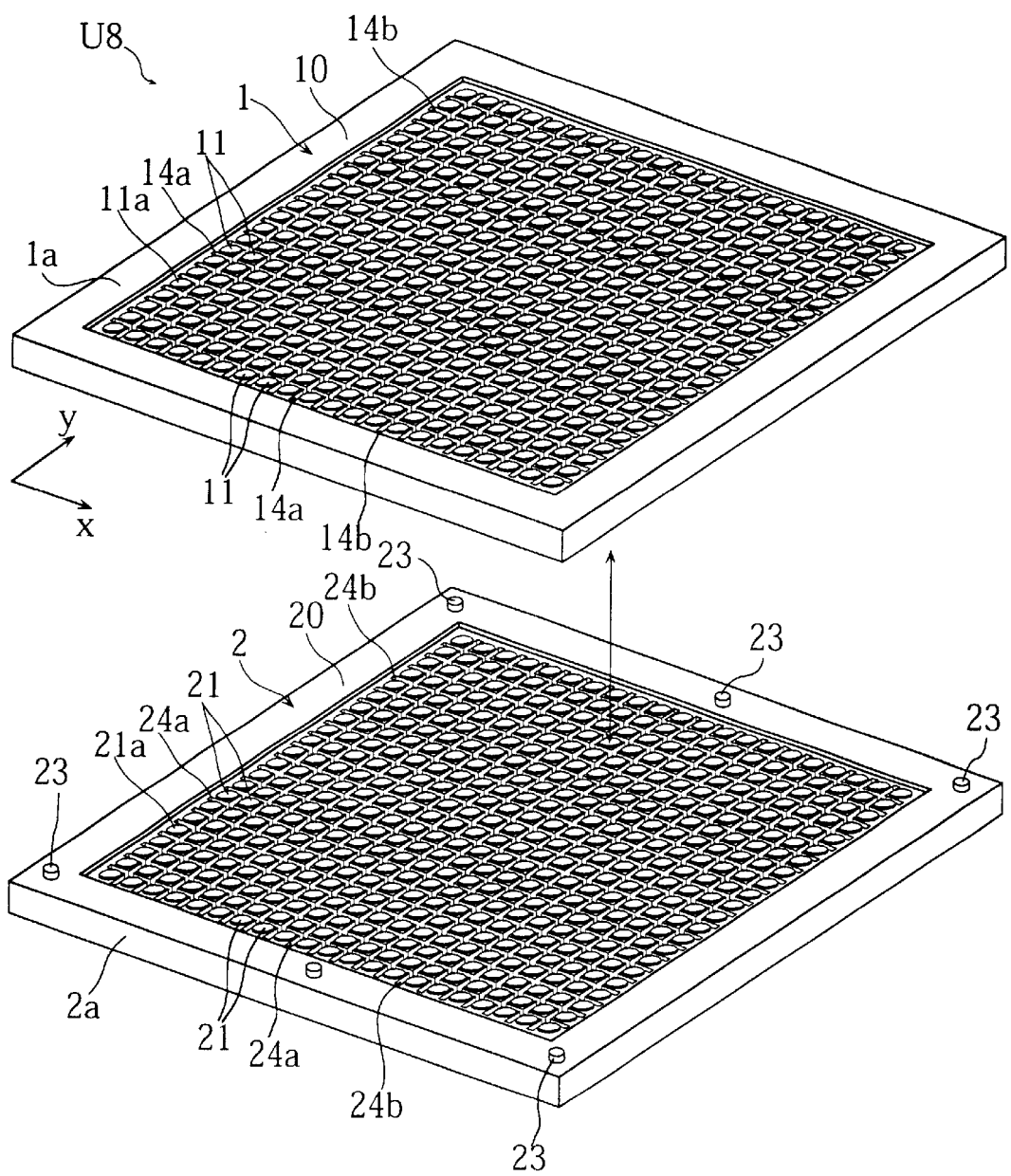
FIG. 43 is an exploded perspective view of the lens array unit shown in FIG. 42.
Figure 44:
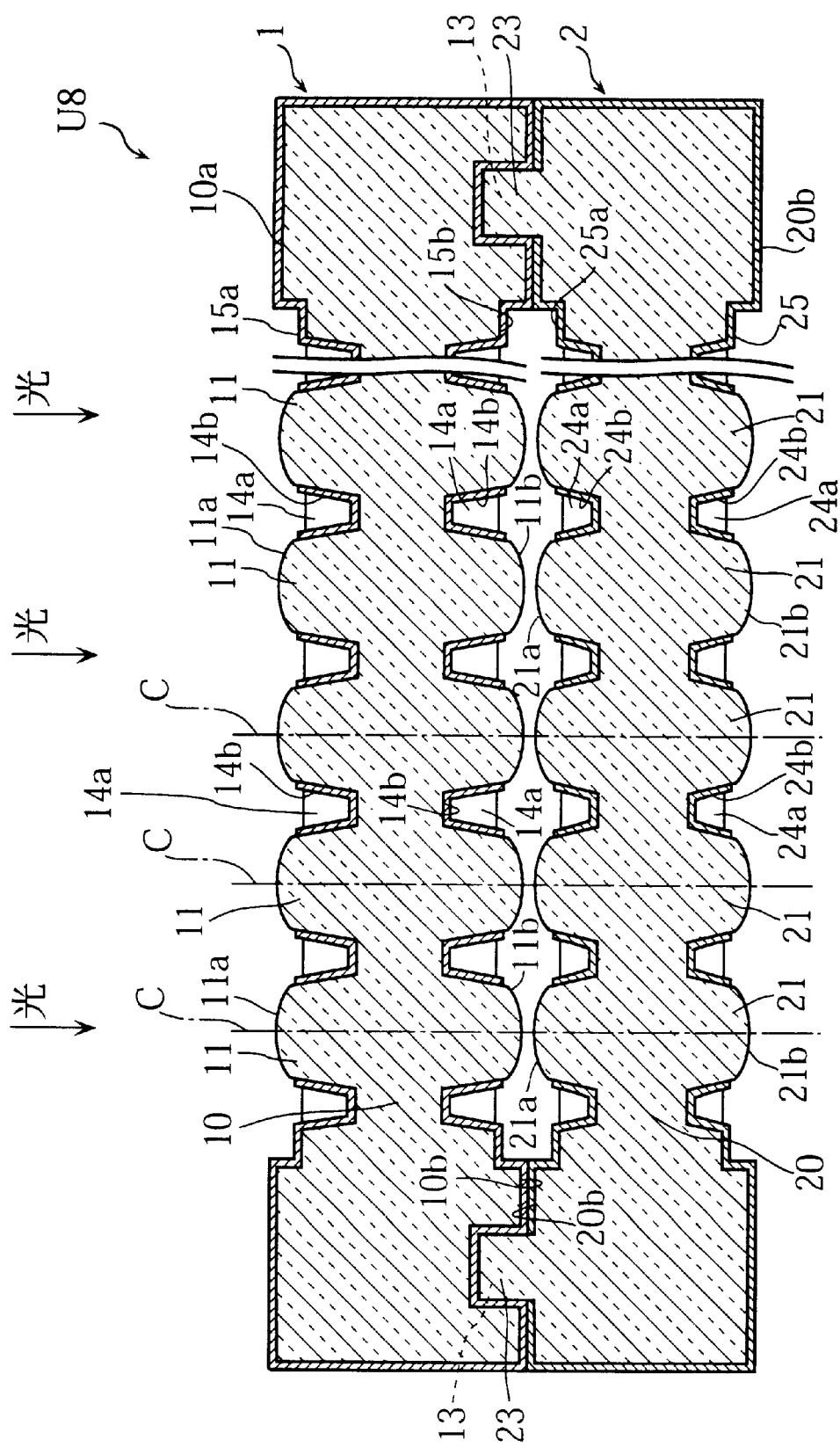
FIG. 44 is a sectional view taken in lines XXXXVI—XXXXVI in FIG. 42.
Figure 45:
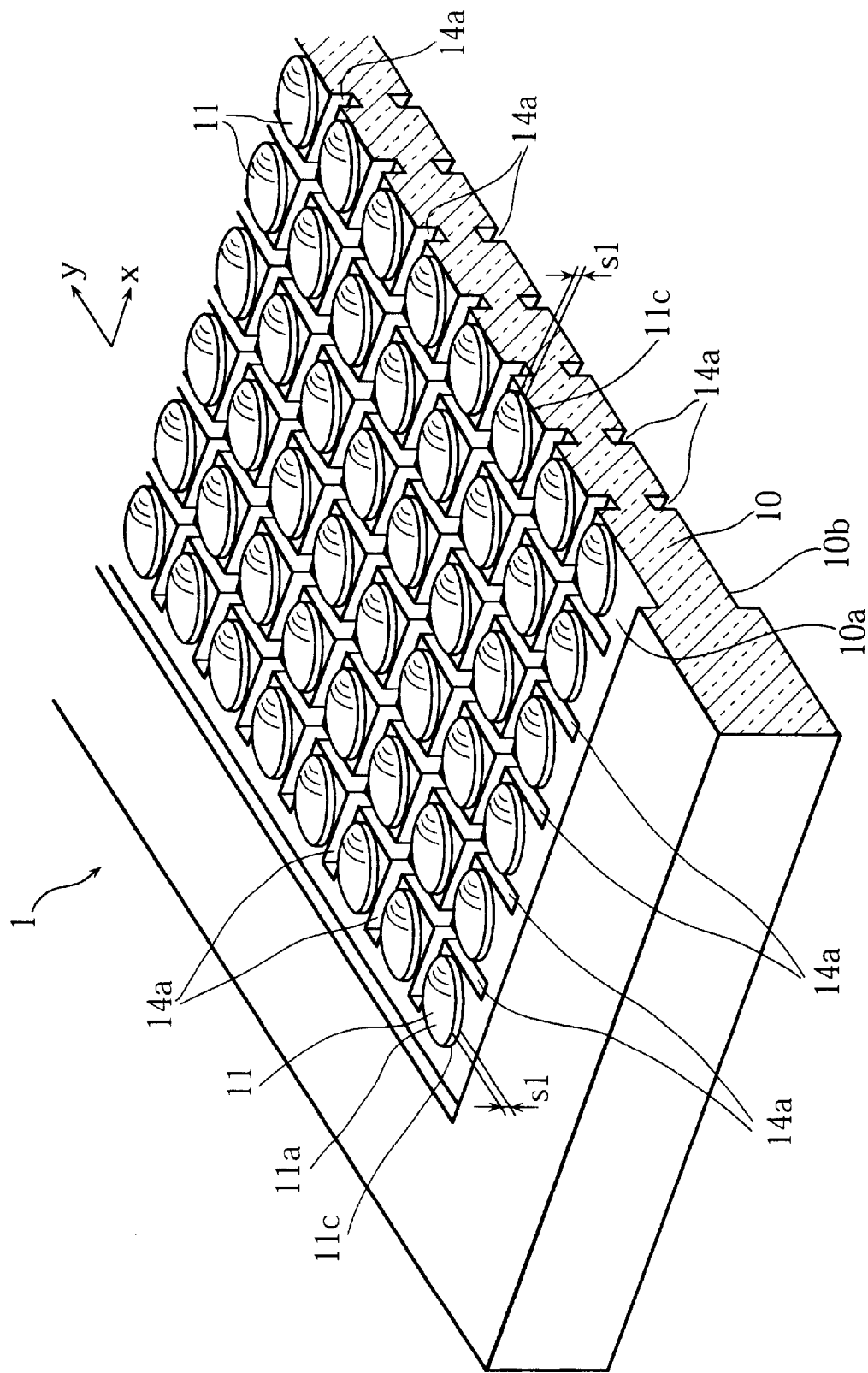
FIG. 45 is a perspective view, with partial section, of the lens array unit shown in FIG. 42.
Figure 46:
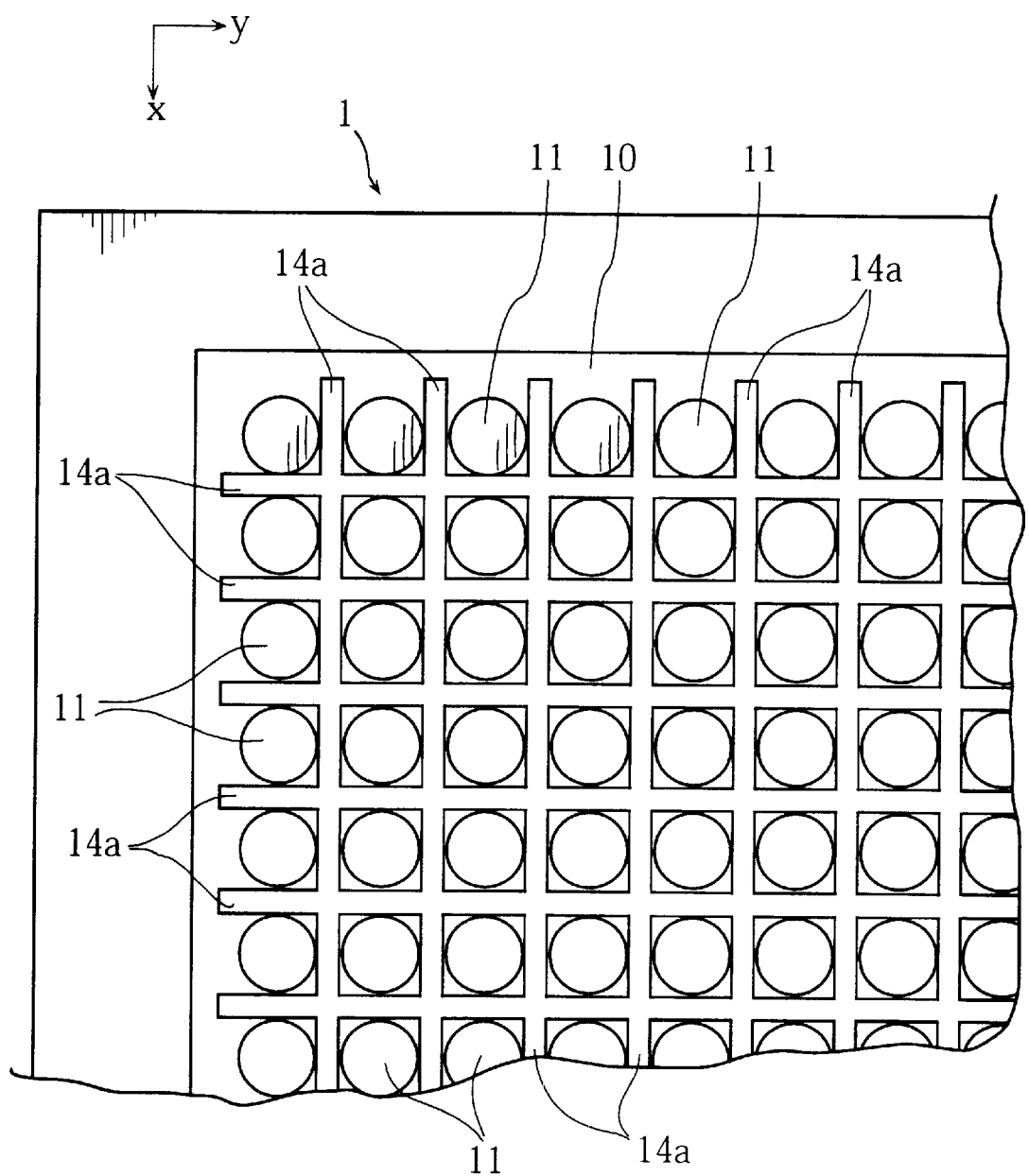
FIG. 46 is a plan view showing a principal portion of the lens array unit shown in FIG. 42.

As shown clearly in FIG. 42 and FIG. 43, a lens array assembly U8 according to the present embodiment differs from the lens array units U1 through U7, in that each of the main bodies 1a, 2a of the first and the second lens arrays 1, 2 is generally square and plate-like, and that the first lenses 11 and the second lenses 21 are disposed in a matrix, in a direction x and in a direction y which are perpendicular to each other, at an interval. FIG. 44 shows a section of the lens array unit U8, which is generally the same as e.g. the lens array unit U1 according to the first embodiment shown in FIG. 1.

In the lens array unit U8, as the means for optically separating the lenses, recesses 14a provided by a plurality of grooves extending in the x and y directions are formed in each of the surfaces 10a, 10b of the first support 10. As clearly shown in FIG. 45 and FIG. 46, these recesses 14a are formed as a grid. The recesses 14a extending in the x direction separate the first lenses 11 from each other in the y direction. On the other hand, the recesses 14a extending in the y direction separate the first lenses 11 from each other in the x direction. As a result, each of the first lenses 11 is surrounded by a plurality of the recesses 14a. Essentially the same recesses 24a as the recesses 14a are provided in each of the surfaces 20a, 20b of the second support 20 of the second lens array 2. Surfaces defining each of the recesses 14a, 24a are covered by black coatings 14b, 24b respectively. Each of the recesses 14a, with the coatings 14b, provides the light shield for the first lens array 1. Each of the recesses 24a, with the coatings 24b, provides the light shield for the second lens array 2. Although the first and the second lens arrays 1, 2 in this lens array unit U8 are plate-like, manufacture can be made easily by essentially the same manufacturing method used for the first and the second lens arrays of the above described lens array units U1 through U7.

According to the lens array unit U8 offered by the present embodiment, since each plurality of the first and the second lenses 11, 21 are disposed in a matrix, an image having a predetermined amount of area can be formed as a non-inverted, non-magnified image. The coatings 14b, 24b covering all of the recesses 14a, 24a respectively, prevent optical cross talk between the first lenses 11 and between the second lenses 21. Particularly, since each of the first and the second lenses 11, 21 is surrounded by the respective recesses 14a, 24a, the crossing of light between mutually adjacent lenses can be prevented in both of the x direction and they direction. In addition, crossing of light between mutually adjacent lenses in a diagonal direction can also be prevented. Therefore, a clear image can be formed at a predetermined image formation point.

According to the present embodiment, each of the first and the second lens arrays 1, 2 is provided with means for preventing the optical cross talk between the lenses. However, like in the other lens array unit according to the above described embodiments, again in the lens array unit U8, by setting the depth of the recesses 14a of the first lens array 1, it becomes possible to prevent the optical cross talk between the second lenses 21 without providing such a means. Further, if the recesses 14a are to be formed in the first lens array 1, the recesses 14a may not be formed in both of the two surfaces 10a, 10b of the first support 10, but only in one of the surfaces 10a and 10b.

Figure 47:
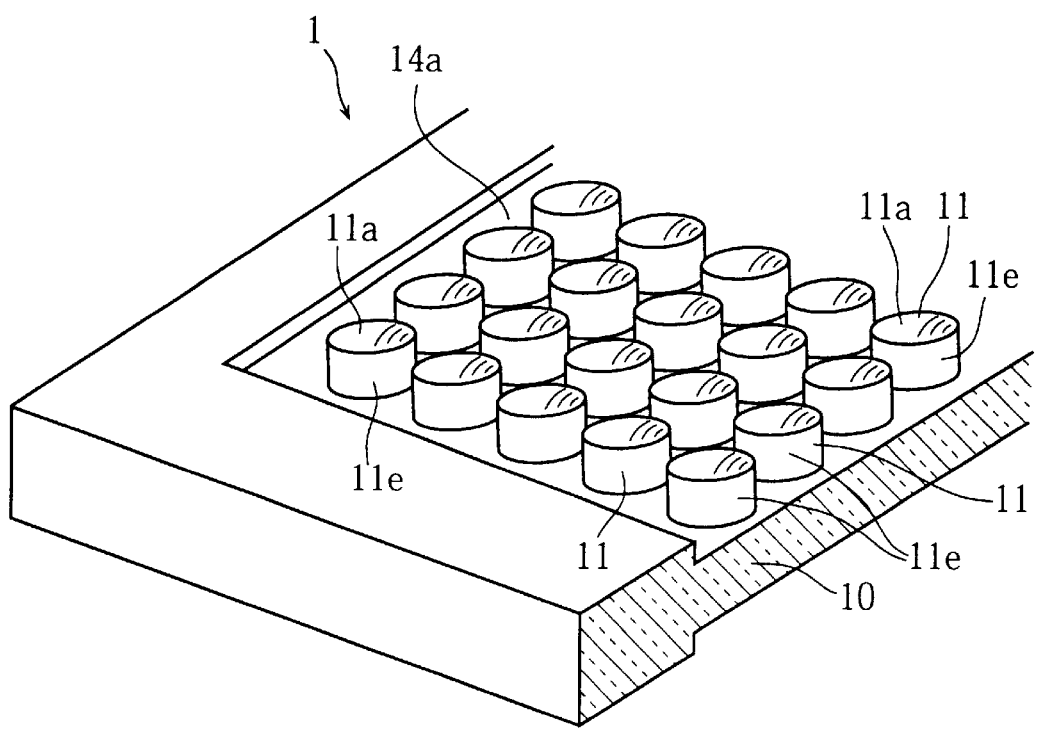
FIG. 47 is a perspective view, with partial section, of a principal portion, showing another example of the recess formed in the lens array unit.

The recess 14a formed in the first lens array 1 may be as shown in FIG. 47. Specifically, the outer circumferential surface 11e of each first lens 11 may be raised from the bottom surface of the recess 14a. The light shield in this case is provided by the coating 11e that covers the bottom surface of the recess 14a and each of the outer circumferential surfaces 11e.

Figure 48:
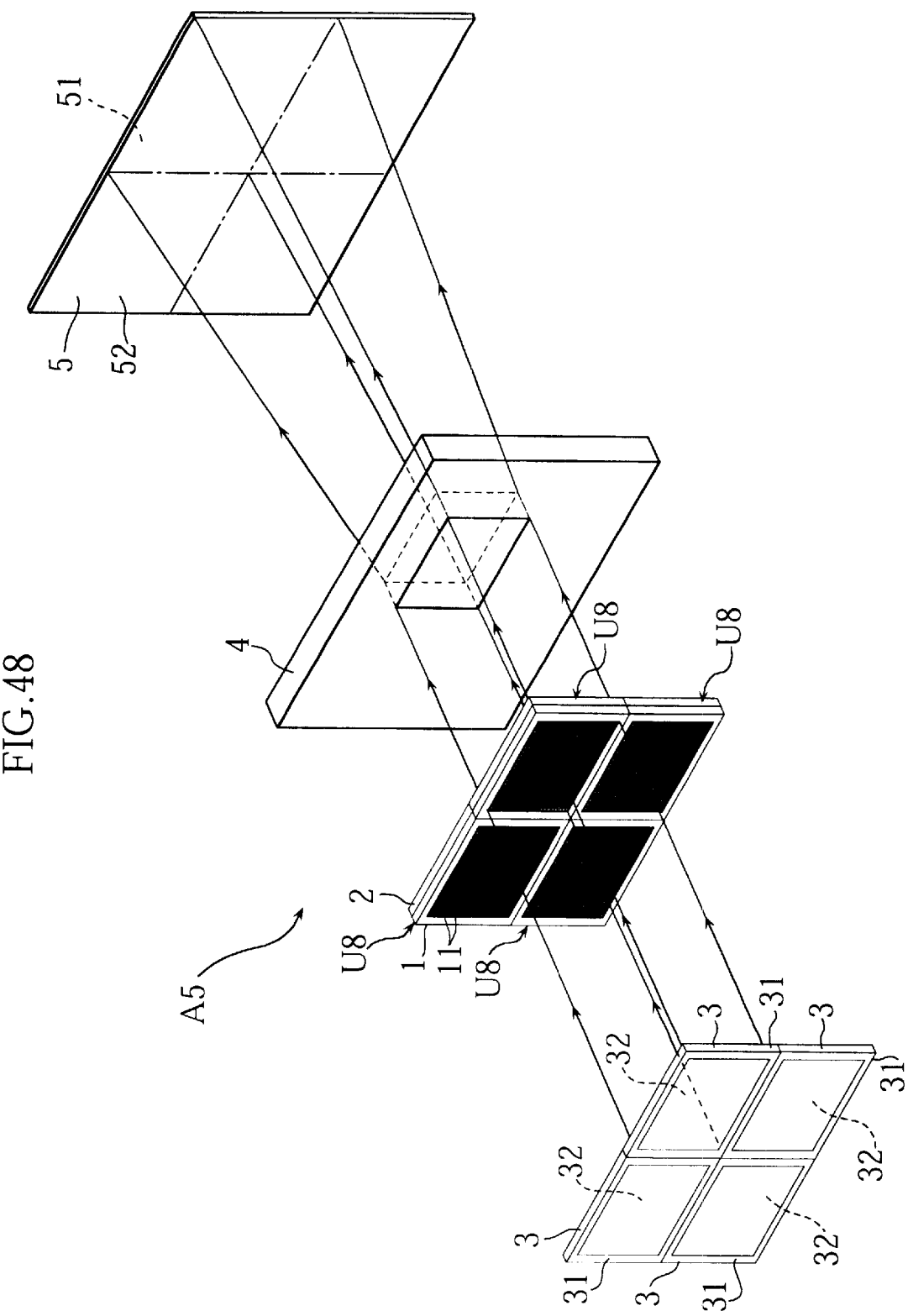
FIG. 48 is a sectional view of a fifth embodiment of the optical device according to the present invention.

FIG. 48 and FIG. 47 show an optical device utilizing the above lens array unit U8.

An optical device A5 according to the present embodiment comprises a plurality (e.g. four) of liquid crystal displays 3, the same number of the lens array units U8, a concave lens 4 as an auxiliary lens (divergent lens), and a color filter 5 as a translucent screen.

Figure 49:
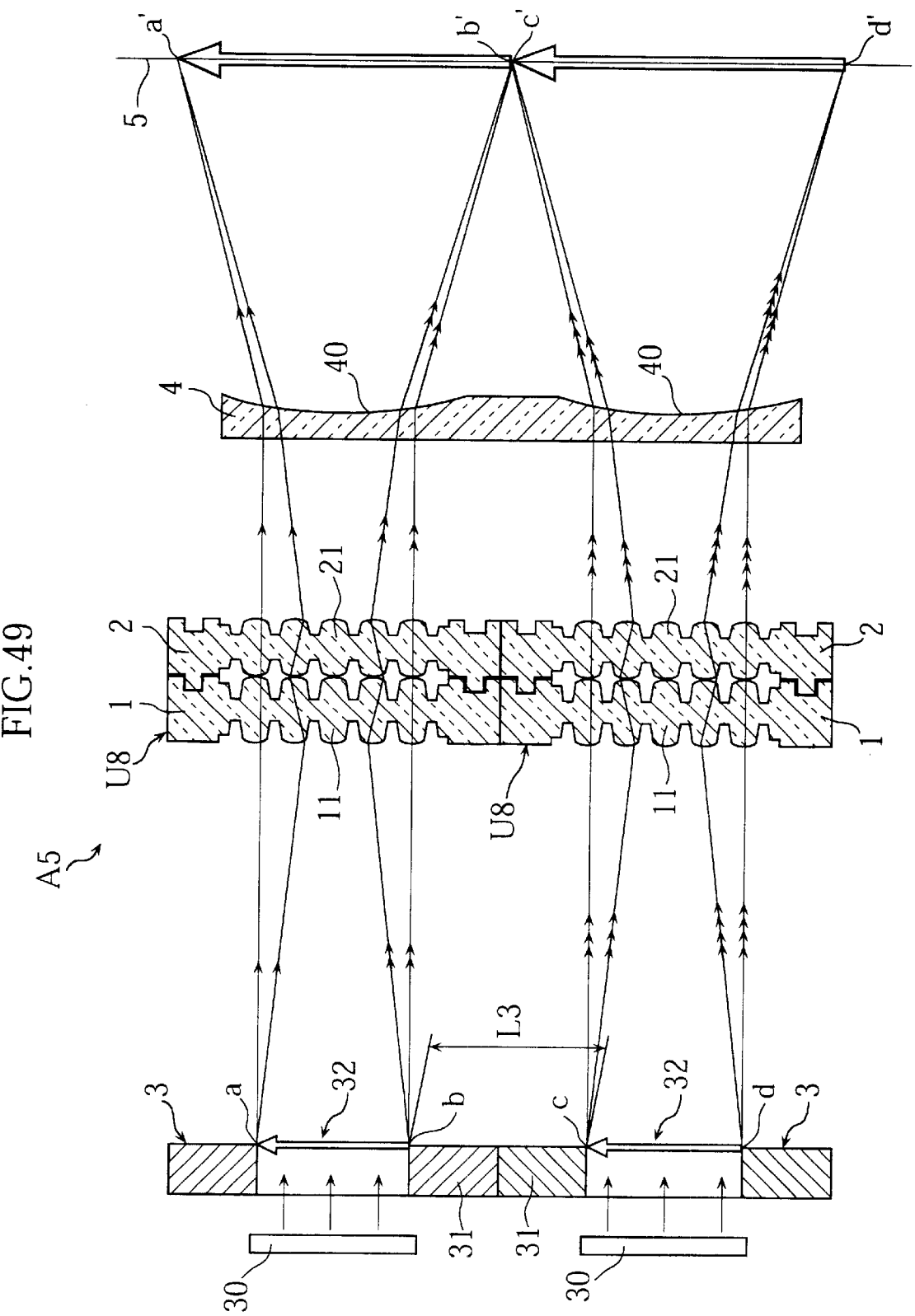
FIG. 49 is a sectional view of the optical device shown in FIG. 48.

Each liquid crystal display 3, corresponding to the image display according to the present invention, has an essentially the same structure as an ordinary color display that uses a liquid crystal panel. However, the liquid crystal panel (not illustrated) of the liquid crystal displays 3 is not provided with a color filter for color display. Therefore, the liquid crystal displays 3 display on their respective screens 32 black-and-white images corresponding to given color image data. Pixels in the screen 32 have one-to-one correspondence to pixels in the color image. Specifically, a total of three dots respectively for red, green and blue (hereinafter abbreviated as R, G, B) provide one pixel. As clearly shown in FIG. 49, behind the liquid crystal display 3, an illuminator 30 is disposed which emits generally parallel light toward the liquid crystal panel. After passing the liquid crystal panel, the light travels to the front surface of the corresponding liquid crystal displays 3. All of the liquid crystal displays 3 are faced in the same direction, and disposed so that the screens 32, each surrounded by a frame 31, are abutted on or closely to each other.

The lens array units U8 are faced one-to-one respectively with the screens 32 of the liquid crystal displays 3. In each of the lens array units U8, a region provided with the first and the second lenses 11, 21 has an area which is generally equal to an area of the screen 32 in each of the liquid crystal displays 3. The lens array unit U8 are disposed closely with each other. To facilitate this, therefore, the lens array units U8 may be provided in advance with means for connecting each other.

The concave lens 4, which enlarges the non-inverted, non-magnified image to be formed by each of the lens array units U8, is disposed between the lens array units U8 and the color filter 5. The concave lens 4 is formed with a plurality of concave surfaces 40 correspondingly to the respective lens array units U8. Although the present embodiment uses only one concave lens 4, a plurality of concave lenses may be used correspondingly to the respective lens array units U8, according to the present invention. In order to increase the rate of magnification, each of the concave surfaces 40 must have a large depth, which means the concave lens has to be thick. Therefore, according to the present invention, as means for decreasing the thickness of the concave lens, for example, a plurality of concave lenses may be disposed on a common optical axis. Further, according to the present invention, the concave lens 4 serving as the divergent lens may be replaced by a Fresnel lens.

Figure 50:
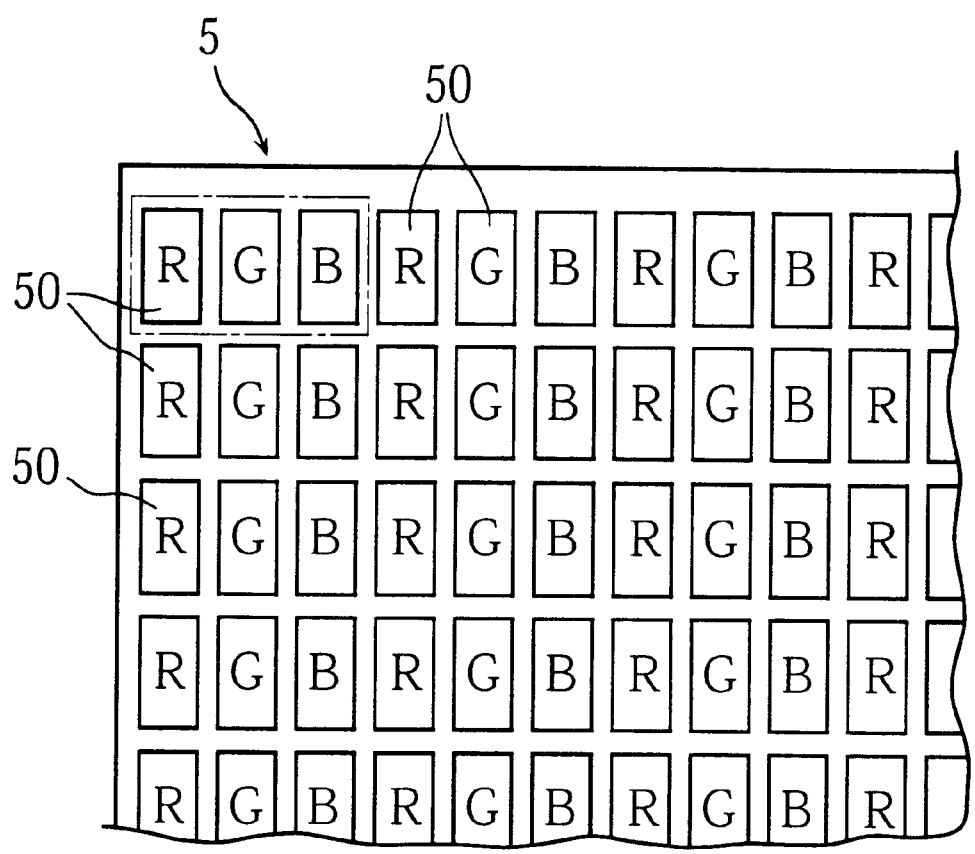
FIG. 50 is a front view showing a principal portion of a color filter used in the optical device shown in FIG. 48.
Figure 51:
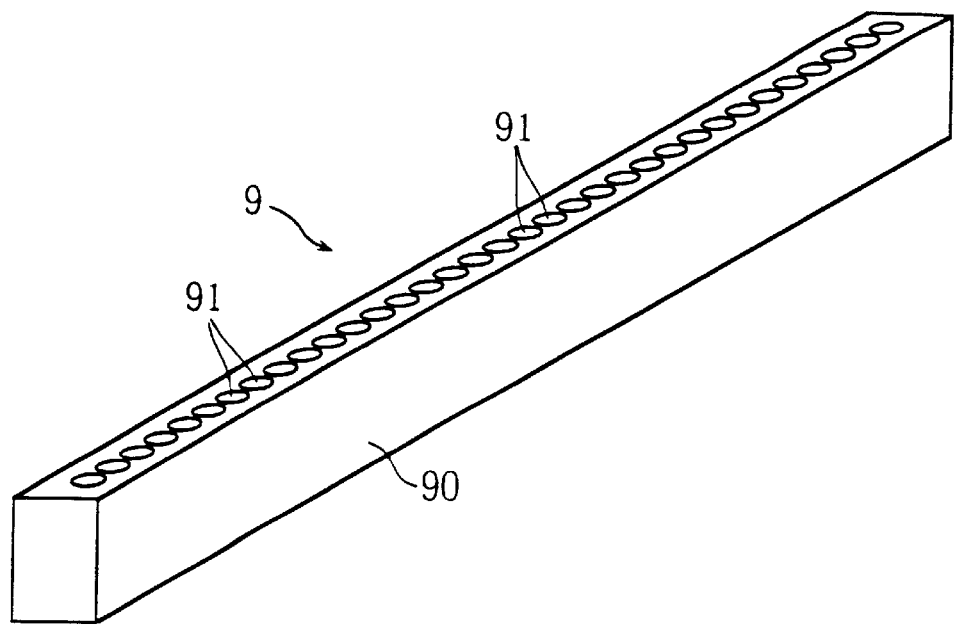
FIG. 51 is a perspective view of a prior art.
Figure 52:
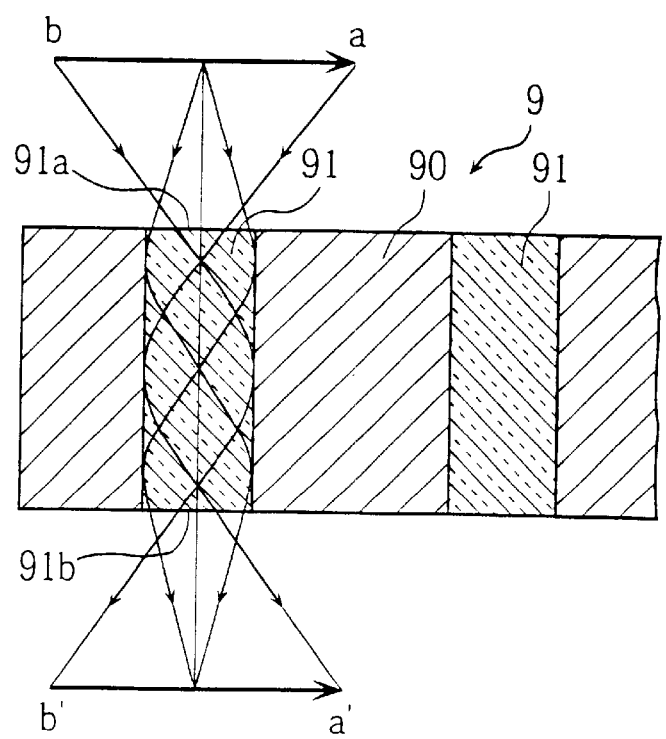
FIG. 52 is a diagram illustrating a function of the prior art.

The color filter 5 is disposed at a distance at which each of the lens array units U8 and the concave lens 4 form images of what are displayed in the screen 32 of the liquid crystal displays 3. The color filter 5 has essentially the same structure as a color filter utilized in an ordinary color liquid crystal display. Specifically, as shown in FIG. 50, the color filter 5 includes a matrix of three kinds of filter elements 50 disposed in a regular pattern, corresponding to the three colors R, G, B. According to this color filter 5, a total of three filter elements 50 respectively for R, G and B represent one pixel. Each of the dots that represents one of the three colors R, G, B in the liquid crystal panel of the liquid crystal display 3 is related to one of the filter elements 50 of the corresponding R, G, B at a corresponding location in the color filter 5. The color filter 5 has a light outgoing surface 51. The light outgoing surface 51 is the surface away from a surface 52 facing the concave lens 4, and is curved into a gentle concave or convex surface though not so illustrated in the figure.

Next, description will cover a function of the optical device A5.

First, as shown in FIG. 47, desired images (a→b) and (c→d) are displayed respectively in the screens 32 of the liquid crystal displays 3. Then, light emitted from the illuminator 31 and having passed the respective liquid crystal displays, passes the lens array units U8 and the concave lens 4. The lens array units U8 refract the light for formation of non-inverted, non-magnified images of the respective images (a→b) and (c→d). However, the concave lens 4 disposed on the next stage forms non-inverted, magnified images (a'→b') and (c'→d') on the surface of color filter 5. The screens 32 of the liquid crystal displays 3 are spaced from each other by an appropriate distance L3. However, by the magnification performed to the image displayed on the screens 32, it becomes possible to connect the images (a'→b') and (c'→d') together on the surface of the color filter 5.

When the images (a'→b') and (c'→d') are formed on the color filter 5, each of the filter elements 50, serving for one of the colors R, G, B, illuminates at a brightness corresponding to an amount of the light received. Therefore, a color image is formed on the color filter 5, which can be viewed from a side facing the light outgoing surface 51. With such an arrangement, unlike in an arrangement where a white screen is used and a variety of colors are displayed on the white background, reproducibility of the color black and similar colors for example is improved, making it possible to increase contrast of the formed image. Further, a curved surface 51 of the color filter 5 increases an angle of view.

According to the present invention, the color filter 5 may be replaced by an ordinary white screen. Further, in place of the liquid crystal display 3, the image display may be provided by a CRT for example. Further, according to the present invention, the concave lens 4 may be replaced by a convex lens, whereby the images on the screens of the image display can be projected as a reduced image. In this case too, the images on each of the screens of the image displays can be connected together into one. According to the present invention, certainly, there may not be a plurality of the image displays. Instead, the present invention may be embodied in such a way that a single image display displays an image, which is then magnified and projected on a screen.

The scope of the present invention is not limited to the embodiments so far described.

The lens array unit according to the present invention may further include another lens array, in addition to the convex lens arrays as provided by the first and the second lens arrays. More specifically, the present invention may be embodied as a so-called achromatic lens which can eliminate or reduce chromatic aberration, by placing a third lens array serving as a concave lens array.

Further, each of the dark material and the light shielding member which provide the separating means according to the present invention is not necessarily be a coating formed by paint application, but may alternatively be provided by a sheet or a film material.

What is claimed is:

1. A lens array unit comprising:
    a first lens array including a plurality of first lenses each serving as a convex lens, and a first support holding the first lenses, the first lenses and the first support being formed integrally of a translucent resin;
    a second lens array including a plurality of second lenses each serving as a convex lens, and a second support holding the second lenses, the second lenses and the second support being formed integrally of a translucent resin;
    characterized that the first and the second lens arrays are placed, one on the other, with each of the first lenses in alignment with a corresponding one of the second lenses on a same axis, for formation of a non-inverted, non-magnified image.

2. The lens array unit according to claim 1, wherein the separating means is provided only in the first lens array.

3. The lens array unit according to claim 2, wherein the light shield is capable of absorbing light received.

4. The lens array unit according to claim 1, wherein the separating means includes a light shield isolating the first lenses from each other.

5. The lens array unit according to claim 4, wherein the light shield includes at least one recess provided in the first support for the isolation of the first lenses from each other.

6. The lens array unit according to claim 5, wherein the light shield further includes a dark material covering a surface which defines the recess.

7. The lens array unit according to claim 6,
    wherein the first support includes a first surface, and a second surface away from the first surface at a distance in a direction of the axis's of the first lenses and faced to the second lens array, and
    wherein the recess is provided in at least one of the first and the second surfaces, without penetrating the first support.

8. The lens array unit according to claim 7, wherein the recess is provided in each of the first and the second surfaces.

9. The lens array unit according to claim 7, wherein the recess is provided only in one of the first and the second surfaces.

10. The lens array unit according to claim 7, wherein the separating means further includes a light shielding member covering the first surface of the first support.

11. The lens array unit according to claim 10, wherein the separating means further includes a light shielding member covering the second surface of the first support.

12. The lens array unit according to claim 4, wherein each of the first lenses has an outer circumferential surface rising from the first support, the light shield including a dark material covering the outer circumferential surface.

13. The lens array unit according to claim 1, wherein each plurality of the first and the second lenses are disposed in a straight row.

14. The lens array unit according to claim 1, wherein each plurality of the first and the second lenses are disposed in a plurality of rows having a narrow width and extending in a predetermined direction.

15. The lens array unit according to claim 14, wherein the separating means includes: a first recess provided in the first support for separation of the first lenses from each other in the predetermined direction; a second recess provided in the first support for separation of the first lenses from each other in a direction across the predetermined direction; and a dark material covering surfaces which respectively define the first and the second recesses.

16. The lens array unit according to claim 15, wherein the first and the second recesses communicate with each other.

17. The lens array unit according to claim 15, wherein the first recess has a depth axially of the first lenses, deeper than a depth of the second recess.

18. The lens array unit according to claim 15, wherein the second support is provided with means for optical separation of the second lenses from each other only in the predetermined direction.

19. The lens array unit according to claim 1, wherein each plurality of the first and the second lenses are disposed in a matrix, for formation of an image having a predetermined area.

20. The lens array unit according to claim 19, wherein the separating means includes at least one recess surrounding each of the first lenses, and a dark material covering a surface which defines the recess.

21. The lens array unit according to claim 1, wherein one of the first and the second lens arrays is provided with a recess while the other of the first and the second lens arrays is provided with a projection corresponding in shape and position to the recess, the first and the second lens arrays being joined together by fitting the projection into the recess.

22. The lens array unit according to claim 1, wherein the first lenses have a longer axial length than the second lenses.

23. The lens array unit according to claim 1, wherein the second lenses have a larger diameter than the first lenses.

24. The lens array unit according to claim 23,
wherein each of the first lenses includes a first lens surface and a second lens surface away from the first lens surface, and each of the second lenses includes a third lens surface closely facing the second lens surface and a fourth lens surface away from the third lens surface;
wherein the second lens surface has a larger diameter than the first lens surface;
wherein the third lens surface has a diameter equal to or larger than that of the second lens surface; and
wherein the fourth lens surface has a larger diameter than the third lens surface.

25. The lens array unit according to claim 23, wherein the fourth lens surfaces are connected together.

26. The lens array unit according to claim 23, wherein the second lens array is provided with a recess isolating the fourth lens surfaces from each other.

27. A method of manufacturing a lens array, comprising:
a resin-component-block forming step of forming a resin component block of a translucent resin, the resin component block integrally including a plurality of rows of lenses and supports holding the lenses; and
a dividing step of dividing the resin component block into a plurality of lens arrays each including a row of the lenses.

28. The method according to claim 27, wherein the resin component block has an outer edge surrounding a region formed with the lenses, the outer edge having at least a portion thicker than the region formed with the lenses.

29. The method according to claim 27, further comprising a light shield forming step of providing a light shield isolating the lenses from each other.

30. The method according to claim 29, wherein the light shield forming step includes a step of providing a recess isolating the lenses from each other in the resin component block, and a coating step of coating a surface which defines the recess, with a dark material.

31. The method according to claim 30, wherein the recess is formed in the resin-body forming step.

32. The method according to claim 30, wherein the recess is formed by a mechanical machining performed to the resin body.

33. The method according to claim 30, wherein the recess is formed by a laser machining performed to the resin body.

34. The method according to claim 30, wherein the coating step includes: a step of applying a dark paint to the surface of the resin body which defines the recess and a lens surface adjacent to the recess, of each lens; and a step of removing the paint from the lens surface before the paint applied to the lens surface dries and hardens.

35. The method according to claim 34, wherein each lens has an outer circumferential surface rising from the first support.

36. An optical device comprising image forming means which forms an image of an object at a predetermined place by focusing light from the object, characterized
that the image forming means is provided by a lens array unit, and
that the lens array unit comprises:
a first lens array unit including a plurality of first lenses each serving as a convex lens, and a first support holding the first lenses, the first lenses and the first support being formed integrally of a translucent resin;
a second lens array unit including a plurality of second lenses each serving as a convex lens, and a second support holding the second lenses, the second lenses and the second support being formed integrally of a translucent resin; and
that the first and the second lens arrays are placed, one on the other, with each of the first lenses in alignment with a corresponding one of the second lenses on a same axis, for formation of a non-inverted, non-magnified image.

37. The device according to claim 36, further comprising a transparent plate capable of guiding the document, the transparent plate being formed integrally with the divergent lens.

38. The device according to claim 36, further comprising a divergent lens disposed between the lens array unit and the light receiving elements for divergence of light having passed the lenses of the lens array in a direction across the predetermined direction.

39. The device according to claim 36, comprising:
- at least one image display disposed in front of the lens array unit;
- a translucent screen disposed behind the lens array unit; and
- an auxiliary lens disposed between the screen and the lens array unit;
- wherein an image displayed in the image display is enlarged or reduced into a non-inverted image on the screen by the lens array unit and the auxiliary lens.

40. The device according to claim 39, comprising a plurality of the image displays, the auxiliary lens being provided by a divergent lens, images displayed in the respective image displays being enlarged into an integrated non-inverted image on the screen.

41. The device according to claim 39, wherein the screen is provided by a color filter including a filter element for each color of red, green and blue.

42. The device according to claim 39, wherein a screen surface away from the auxiliary lens is convex or concave.

43. An optical device comprising image forming means which forms an image of an object at a predetermined place by focusing light from the object,
- wherein the image forming means is provided by a lens array unit which comprises: a first lens array unit including a plurality of first lenses each serving as a convex lens, and a first support holding the first lenses, the first lenses and the first support being formed integrally of a translucent resin; and a second lens array unit including a plurality of second lenses each serving as a convex lens, and a second support holding the second lenses, the second lenses and the second support being formed integrally of a translucent resin; the first and the second lens arrays being placed, one on the other, with each of the first lenses in alignment with a corresponding one of the second lenses on a same axis, for formation of a non-inverted, non-magnified image;
- wherein the optical device further comprises: at least one image display disposed in front of the lens array unit; a translucent screen disposed behind the lens array unit; and an auxiliary lens disposed between the screen and the lens array unit; and
- wherein an image displayed in the image display is enlarged or reduced into a non-inverted image on the screen by the lens array unit and the auxiliary lens.

* * * * *